United States Patent
You et al.

(10) Patent No.: US 9,812,640 B2
(45) Date of Patent: Nov. 7, 2017

(54) COMPLEMENTARY RESISTANCE SWITCH, CONTACT-CONNECTED POLYCRYSTALLINE PIEZO- OR FERROELECTRIC THIN-FILM LAYER, METHOD FOR ENCRYPTING A BIT SEQUENCE

(71) Applicant: Helmholtz-Zentrum Dresden-Rossendorf e. V., Dresden (DE)

(72) Inventors: Tiangui You, Chemnitz (DE); Heidemarie Schmidt, Dresden (DE); Nan Du, Chemnitz (DE); Danilo Buerger, Dresden (DE); Ilona Skorupa, Dresden (DE); Niveditha Manjunath, Chemnitz (DE)

(73) Assignee: Helmholtz-Zentrum Dresden-Rossendorf e.V, Dresden (DE)

( * ) Notice: Subject to any disclaimer, the term of this patent is extended or adjusted under 35 U.S.C. 154(b) by 56 days.

(21) Appl. No.: 14/800,785

(22) Filed: Jul. 16, 2015

(65) Prior Publication Data
US 2015/0358151 A1    Dec. 10, 2015

Related U.S. Application Data

(63) Continuation of application No. 14/761,319, filed as application No. PCT/EP2014/050829 on Jan. 16, 2014, now Pat. No. 9,583,704.

(51) Int. Cl.
H04L 9/00 (2006.01)
H01L 45/00 (2006.01)
(Continued)

(52) U.S. Cl.
CPC .............. *H01L 45/147* (2013.01); *G09C 1/00* (2013.01); *G11C 13/0007* (2013.01);
(Continued)

(58) Field of Classification Search
CPC ... H01L 45/147; H01L 45/08; H01L 45/1233; H01L 45/1641; H01L 45/165;
(Continued)

(56) References Cited

U.S. PATENT DOCUMENTS

| 2005/0012568 A1 | 1/2005 | Aigner et al. |
| 2006/0028247 A1 | 2/2006 | Hara et al. |

(Continued)

FOREIGN PATENT DOCUMENTS

| DE | 102005004593 A1 | 8/2006 |
| DE | 102011056951 A1 | 6/2013 |

(Continued)

OTHER PUBLICATIONS

Notice of Allowance received for U.S. Appl. No. 14/761,319 (5 pages) dated Dec. 6, 2016.
German Search Report based on application No. 10 2013 200 615.2 (1 Page).
U.S. Office Action based on U.S. Appl. No. 14/761,319 (8 pages) dated Jul. 6, 2016.
(Continued)

*Primary Examiner* — Long Pham
(74) *Attorney, Agent, or Firm* — Viering, Jentschura & Parner mbB

(57) ABSTRACT

Disclosed is a complementary resistor switch (3) comprising two outer contacts, between which two piezo- or ferroelectric layers (11a and 11b) having an inner common contact are situated. At least one region (11', 11") of the layers is modified, either the outer contacts are rectifying (S) and the inner contact is non-rectifying (0), or vice versa, the modified regions are formed at the rectifying contacts, the layers have different strain-dependent structural phases with different band gaps and/or different polarization charges, and the electrical conductivity of the layers is different. Also
(Continued)

disclosed are a connectable resistor structure having at least one Schottky contact at two adjoining piezo- or ferroelectric layers, a polycrystalline piezo- or ferroelectric layer comprising modified crystallites, and a method and circuits for encrypting and decrypting a bit sequence.

17 Claims, 19 Drawing Sheets

(51) Int. Cl.

| | |
|---|---|
| *H01L 31/0749* | (2012.01) |
| *H01L 27/24* | (2006.01) |
| *G09C 1/00* | (2006.01) |
| *H04L 9/06* | (2006.01) |
| *H03K 19/08* | (2006.01) |
| *G11C 13/00* | (2006.01) |

(52) U.S. Cl.
CPC ...... *H01L 27/2472* (2013.01); *H01L 31/0749* (2013.01); *H01L 45/065* (2013.01); *H01L 45/08* (2013.01); *H01L 45/1233* (2013.01); *H01L 45/165* (2013.01); *H01L 45/1641* (2013.01); *H03K 19/08* (2013.01); *H04L 9/00* (2013.01); *H04L 9/065* (2013.01); *H04L 2209/12* (2013.01); *Y02E 10/541* (2013.01)

(58) Field of Classification Search
CPC ............. H01L 45/0749; H01L 27/2472; H01L 45/065; G09C 1/00; H04L 9/065; H04L 9/00; H03K 19/08; G11C 13/0007
See application file for complete search history.

(56) References Cited

U.S. PATENT DOCUMENTS

| | | | |
|---|---|---|---|
| 2006/0092691 A1 | 5/2006 | Shiimoto et al. | |
| 2007/0231927 A1 | 10/2007 | Yamakawa et al. | |
| 2008/0273365 A1 | 11/2008 | Kang et al. | |
| 2008/0273370 A1 | 11/2008 | Keller et al. | |
| 2010/0135061 A1 | 6/2010 | Li et al. | |
| 2010/0271859 A1 | 10/2010 | Osano et al. | |
| 2012/0087173 A1 | 4/2012 | Linn et al. | |
| 2012/0195105 A1 | 8/2012 | Wang et al. | |
| 2013/0092895 A1 | 4/2013 | Tada et al. | |
| 2013/0181180 A1 | 7/2013 | Tada et al. | |
| 2014/0312400 A1 | 10/2014 | Schmidt et al. | |

FOREIGN PATENT DOCUMENTS

| | | |
|---|---|---|
| DE | 102012102326 A1 | 9/2013 |
| EP | 0660412 A1 | 6/1995 |
| WO | 2010136007 A2 | 12/2010 |
| WO | 2011158887 A1 | 12/2011 |
| WO | 2012043502 A1 | 4/2012 |
| WO | 2013017131 A2 | 7/2013 |

OTHER PUBLICATIONS

International Search Report baes on Application No. PCT/EP2014/050829 (8 pages) dated Jul. 11, 2014.
Lee et al.: "Polarity control of carrier injection at ferroelectric/metal interfaces for electrically switchable diode and photovoltaic effects"; Physical Review B; Sep. 8, 2011; 10 pages.
Shuai et al.: "Nonvolatile Multilevel Resistive Switching in Ar+ Irradiated BiFeO3 Thin Films"; Ieee Electron Device Letters; Dec. 13, 2012; 4 pages.
Lin et al.: "Image encryption based on chaos with PWL memristor in Chua's circuit", International Conference on communications, circuits and systems (ICCCAS); Jul. 23, 2009; 6 pages.
Driscoll et al.: "Chaotic memristor"; Applied Physics A; Feb. 5, 2011; 6 pages.
Rose et al.: "Hardware security strategies exploiting nanoelectronic circuits"; 18th Asia and South Pacific Design Automation Conference; Jan. 22, 2013; 6 pages.
Yao et al.: "Multi-state resistive switching memory with secure information storage in Au7BiFe0.95Mn0.0503 / La5 / 8Ca3 / 8Mn03 heterostructure"; Applied Physics Letters; May 7, 2012; 4 pages.
Du et al: "Novel implementation of memristive systems for data encryption and obfuscation", Journal of applied Physics; Mar. 25, 2014; 8 pages.
You Tiangui et al.: "Exploiting Memristive BiFeO3 Bilayer Structures for Compact Sequential Logics"; Advanced Functional materials; Feb. 24, 2014; p. 3357-3365; Wiley-VCH Verlag GmbH & Co. KGaA; Weinheim; Germany.
European Search Report based on Application No. EP 15 16 6520 (9 Pages) dated Oct. 7, 2015.
E Linn et al., Beyond von Neumann—logic operations in passive crossbar arrays alongside memory operations, Nanotechnology 2012, vol. 23, pp. 305205.
Benjamin C Lee et al., Phase-Change Technology and the Future of Main Memory, IEEE Micro, Jan./Feb. 2010, vol. 30, pp. 131-141.
Pice Chen et al., Nonlinearity in the high-electric-field piezoelectricity of epitaxial BiFeO3 on SrTiO3, Applied Physics Letters, 2012, vol. 100, pp. 062906.
K.C. Park et al., Electric field dependence of ferroelectric phase transition in epitaxial SrTiO3 films on SrRuO3 and La0.5Sr0.5Co03, Applied Physics Letters, Jul. 17, 2012, vol. 77, No. 3, pp. 435.
M.K. Teng et al., Pressure induced ferroelectric phase transition in potassium nitrate, Solid State Communication, 1971, vol. 9, pp. 465-469.
R. Van De Krol et al., Electroceramics—the role of interfaces, Solid State Ionics 2002, vol. 150, pp. 167-179.
G.Blatter et al., Carrier transport through grain boundaries in semiconductors, Physical Review B, Mar. 15, 1986, vol. 33, No. 6, pp. 3952-3966.
F. Greuter et al., Conduction mechanism in ZnO varistors: an overview, Ceramic Transactions, Advances in Varistor technology, American Ceramic Society1989, vol. 3, pp. 31-35.
Makoto Aoki et al. Solute Segregation and Grain-Boundary Impedance in High-Purity Stabilized Zirconia, J. Am. Ceram. Soc., 1996, vol. 79, No. 5, pp. 1169-1180.
M. Green et al., Solar Cell Efficiency Tables (Version 25), Research and Applications 2005, vol. 13 pp. 49-54.

COMPLEMENTARY RESISTANCE SWITCH, CONTACT-CONNECTED POLYCRYSTALLINE PIEZO- OR FERROELECTRIC THIN-FILM LAYER, METHOD FOR ENCRYPTING A BIT SEQUENCE

This application is a continuation of U.S. patent application Ser. No. 14/761,319 which is a 371 National Stage Entry of international Patent Application PCT/EP2014/050829 filed Jan. 16, 2014, which claims priority to German Patent Application Serial No. 2013 200 615.2, which was filed Jan. 16, 2013, and to German Patent Application Serial No. 2013 201 443.0, which was filed Jan. 29, 2013, all of which are incorporated herein by reference in its entirety.

The invention relates to a complementary resistance switch (also referred to as complementary resistor switch), the production of a complementary resistance switch, the use of a complementary resistance switch, a resistance structure, a method for operating a resistance structure, a contact-connected polycrystalline piezo- or ferroelectric thin-film layer and the production and use thereof, a layer structure, a method for processing a layer structure, a method for encrypting a bit sequence and a method for decrypting an encrypted bit sequence.

In general, a thin layer or a plurality of thin layers of different materials can be deposited on a substrate or a carrier by means of suitable production methods. In this case, production methods such as, for example, physical vapor deposition (PVD) and chemical vapor deposition (CVD) can be used, wherein these methods can be used in a multiplicity of different embodiments, for example as pulsed laser deposition (PLD), sputtering, electron beam evaporation, molecular beam epitaxy, plasma enhanced chemical vapor deposition (PECVD), and other methods.

Ferroelectric and/or piezoelectric materials, layers or layer systems can have a multiplicity of chemical or physical properties which can be made useable in different areas of application. In this case, ferroelectric materials, ferroelectric layers or ferroelectric layer systems can also be pyroelectric and thus also piezoelectric. In contrast to piezo- and pyroelectric substances, the electrical polarization in ferroelectrics can be permanently reversed by means of a voltage being applied.

By way of example, the electrical polarization of the ferroelectric materials, or else the direct piezo-effect and/or the inverse piezo-effect can be used in conventional mechanical, electronic or electromechanical applications.

In accordance with various embodiments, a memristor arrangement (a resistance switch or a memristive resistance switch arrangement) and/or corresponding production methods for producing (or processing) a memristor arrangement and/or methods for operating a memristor arrangement are provided.

A so-called memristor (referred to as memory resistor) can comprise or be a passive electrical component whose electrical resistance can be dependent on the past. In this case, the respective present resistance of a memristor can be dependent on how many charges (or how much electric current) flowed and in what direction they flowed; and/or how much electrical voltage was applied to the memristor and with what polarity the electrical voltage was applied to the memristor.

In accordance with various embodiments, a complementary resistance switch (3) (e.g. a memristor arrangement) can comprise the following: two outer contacts (T1, T2), between which two piezo- or ferroelectric layers (11a and 11b) are situated, which are separated from one another by an inner common contact, characterized in that at least one region of the piezo- or ferroelectric layer (11a and 11b) is modified at least once in such a way that in the piezo- or ferroelectric layer (11a and 11b) in each case between the inner contact and the associated outer contact a region (11') having the thickness (d') arises, which can be modified at least additionally in a region (11") having the thickness (d"), wherein a) the outer contacts are surface contacts ($S_a$) and ($S_b$) and the inner contact is a common associated counter-contact (O) or the outer contacts are counter-contacts ($O_a$) and ($O_b$) and the inner contact is a common associated surface contact (S), b) the surface contacts (S), ($S_a$) and ($S_b$) are rectifying and the counter-contacts (O) or ($O_a$) and ($O_b$) are non-rectifying, c) the modified regions in the piezo- or ferroelectric layer (11a) and (11b) form at the surface contacts (S) or ($S_a$) and ($S_b$), d) the piezo- or ferroelectric layers (11, 11', 11") have different strain-dependent structural phases having different band gaps and/or different polarization charges, and e) the electrical conductivity of the piezo- or ferroelectric layers (11, 11', 11") is different.

Furthermore, in the case of the complementary resistance switch (3) it can be provided that different threshold voltages ($U_{crit}$) are necessary for changing the structural phase in at least one of the regions (11, 11', 11") when a write voltage ($U_{write}$) is applied between the outer contacts ($S_a$) and ($S_b$) or ($O_a$) and ($O_b$), wherein a pulse length of the write voltage ($U_{write}$) is preferably on the pico- to milliseconds timescale, particularly preferably on the nano- to microseconds timescale.

Furthermore, the crystallites of the polycrystalline piezo- or ferroelectric material of the layer (11a) or (11b) or the structure sizes of monocrystalline piezo- or ferroelectric material of the layer (11a) or (11b) can be smaller than the lateral extent of the outer contacts ($S_a$, $S_b$) or ($O_a$, $O_b$).

Furthermore, a plurality of outer contacts (T1($m$), T2($n$)) where (m,n)≥1 can be arranged in an array, wherein in the piezo- or ferroelectric materials (11, 11', 11") at each surface contact ($S_a$(m), $S_b$(n)) or S(m,n) the regions (11') and/or (11") can be individually modified, and wherein the number of outer contacts (m,n) can be different.

Furthermore, a low-voltage source and/or a high-voltage source can be connected to at least one of the outer contacts (T1, T2), as a result of which the piezo- or ferroelectric materials between the outer contacts correspond to anti-series-interconnected bipolar resistors (a, b).

Furthermore, as a result of a high voltage being applied to one or to both outer contacts (T1, T2), a state pair ({LRSa, HRSb}) or ({HRSa, LRSb}) can be written to the antiseries-interconnected bipolar resistors (a, b).

Furthermore, as a result of a low, positive or negative read voltage ($U_{reada}$) being applied, the state pair ({LRSa, HRSb}) or ({HRSa, LRSb}) can be read out.

In accordance with various embodiments, production of the complementary resistance switch (3) with common rectifying contact (S) can comprise the following:

a) forming the outer contact ($O_b$) by metallization and/or structuring, b) growing and optionally modifying a layer composed of an undoped piezo- or ferroelectric material (11b) on the outer contact ($O_b$), c) subsequently forming the common contact (S) on the layer (11b) by metallization, d) subsequently growing and optionally modifying the layer (11a) on the common contact (S) composed of a doped or undoped piezo- or ferroelectric material, e) finally forming the outer contact ($O_a$) by metallization and/or structuring.

In accordance with various embodiments, production of the complementary resistance switch (3) with common non-rectifying contact (O) can comprise the following:

a) forming the outer contact ($S_b$) by metallization and/or structuring, b) growing and optionally modifying a layer composed of a doped piezo- or ferroelectric material (11b) on the outer contact ($S_b$), c) subsequently forming the common contact (O) on the layer (11b) by metallization and/or structuring; or by diffusion of the dopants in the layer (11b) to the surface of the layer (11b), d) subsequently growing and optionally modifying the layer (11a) on the common contact (O) composed of an undoped piezo- or ferroelectric material, e) finally forming the outer contact ($S_a$) by metallization.

Furthermore, the regions (11a, 11b, 11'a) and/or (11'b) of the piezo- or ferroelectric layers can be modified with laser, ion, thermal and/or electron beams (2), wherein the piezo- or ferroelectric layer (11) is preferably modified over a large area by means of laser and/or ion beams, and the regions (11') are preferably modified locally by means of ion and/or electron beams.

In accordance with various embodiments, the piezo- or ferroelectric material of the layers (11a) and (11b) can have a residual electrical conductivity and the concentration of the free charge carriers can be in the range of approximately $10^{14}$ to approximately $10^{19}$ cm$^{-3}$, preferably in the range of $10^{15}$ to $10^{18}$ cm$^{-3}$.

Furthermore, the residual electrical conductivity of the modified regions (11') and (11") can be changed in comparison with the residual electrical conductivity of the layer (11) and the concentration of the free charge carriers of the modified regions (11') and (11") can vary between approximately $10^{12}$ and approximately $10^{23}$ cm$^{-3}$.

Furthermore, the undoped piezo- or ferroelectric material of the layer (11) can consist of BiFeO$_3$ and the doped piezo- or ferroelectric material of the layer (11) can consist of Ti-doped BiFeO$_3$, preferably with a titanium concentration of approximately 0.05 at % (atom percent).

In accordance with various embodiments, the complementary resistance switch (3) can be used as a logic gate in a logic circuit for realizing nonvolatile Boolean functions or as an analog block with a logic gate for realizing filters and amplifiers.

In accordance with various embodiments, the complementary resistance switch (3) can be used as a programmable logic gate, characterized in that the complementary resistance switch (3):

a) is initialized by a high voltage being applied to one or to both outer contacts (T1, T2), b) as a result of a high voltage dependent on the Boolean input parameters being applied to one or to both outer contacts (T1, T2) the Boolean functions (each of the for example 16 Boolean functions) is written or programmed, c) as a result of a low voltage dependent on the Boolean input parameters being applied to one or to both outer contacts (T1, T2) the Boolean function is read, wherein the state pair ({LRSa, HRSb}) or ({HRSa, LRSb}) of the complementary resistance switch is not changed during reading.

In accordance with various embodiments, the complementary resistance switch (3) can be used as a programmable analog block with a programmable logic gate, characterized in that the complementary resistance switch:

a) is initialized by a high voltage being applied to one or to both outer contacts (T1, T2), b) as a result of a high voltage—dependent on the Boolean input parameters and the value of the analog parameter—in the range of between ($U_{min}$) and ($U_{max}$) being applied to one or to both outer contacts (T1, T2) the Boolean function of the logic gate and the analog value of the analog block in the state pair ({LRSia, HRSb}) or ({HRSa, LRSib}) are written or programmed, c) as a result of a low voltage dependent on the Boolean input parameters being applied to one or to both outer contacts (T1, T2) the Boolean functions is read, d) as a result of a low positive or negative voltage dependent on the written state pair ({LRSia, HRSb}) or ({HRSa, LRSib}) being applied to one or to both outer contacts (T1, T2) the analog value (LRSia) or (LRSib) is read, wherein the state pair of the complementary resistance switch (3) is not changed during reading.

In accordance with various embodiments, a resistance structure (3) (e.g. a memristor arrangement) can comprise the following: a first electrically conductive contact (T1); a second electrically conductive contact (T2); a first ferroelectric layer (11a); a second ferroelectric layer (11b); wherein the first ferroelectric layer (11a) and the second ferroelectric layer (11b) are in physical contact with one another and are arranged between the first electrical contact (T1) and the second electrical contact (T2); and wherein the first contact (T1) together with the first ferroelectric layer (11a) forms a Schottky contact and/or the second contact (T2) together with the second ferroelectric layer (11b) forms a Schottky contact.

Furthermore, the first ferroelectric layer (11a) and the second ferroelectric layer (11b) can have mutually different dopings and/or spatial doping distributions.

Furthermore, the first ferroelectric layer (11a) can comprise at least one first layer region (11'a, 11"a), wherein the properties of the first layer region (11'a, 11"a) differ from those of the rest of the first ferroelectric layer (11a). Furthermore, the second ferroelectric layer (11b) can comprise at least one second layer region (11'b, 11"b), wherein the properties of the second layer region (11'a, 11"a) differ from those of the rest of the second ferroelectric layer (11a).

Furthermore, the first ferroelectric layer (11a) and/or the second ferroelectric layer (11b) can have an n-type doping (e.g. on account of vacancies, e.g. oxygen vacancies). In accordance with various embodiments, the doping based on the vacancies can be altered or influenced by means of an electrical voltage and/or by means of an electric current; by way of example, the spatial distribution of oxygen vacancies can be altered.

In this case, the first ferroelectric layer (11a) and/or the second ferroelectric layer (11b) can have a doping gradient in the n-type doping.

Furthermore, the first ferroelectric layer (11a) and/or the second ferroelectric layer (11b) can have an additional n-type doping (e.g. by means of impurity atoms being introduced into the material of at least one of the ferroelectric layers, e.g. metal atoms). In accordance with various embodiments, the additional n-type doping can remain uninfluenced by an applied electrical voltage and/or by an applied electric current.

In accordance with various embodiments, the ferroelectric material of the ferroelectric layers can comprise or be bismuth ferrite ($BiFeO_3$). In this case, an n-type doping can occur on account of oxygen vacancies (vacancies at the provided lattice sites of the oxygen). Furthermore, an additional doping (n-type doping or p-type doping) can be achieved by the iron atoms being partly replaced (substituted) with atoms of different valency (e.g. higher than $3^+$ for an n-type doping or lower than $3^+$ for a p-type doping).

Furthermore, the first ferroelectric layer (11a) and/or the second ferroelectric layer (11b) can have a doping gradient in the n-type doping.

In this case, the first ferroelectric layer (11a) and the second ferroelectric layer (11b) can have an n-type doping on account of oxygen vacancies. Furthermore, the second ferroelectric layer (11b) can have an additional n-type doping, e.g. titanium (4+) at lattice sites of the iron (3+).

In other words, the second ferroelectric layer (11b) can be doped with at least one metal; e.g. based on partial substitution of $FE^{3+}$ ions by means of suitable AII/BIV dopings of metal atoms.

In accordance with various embodiments, the first ferroelectric layer (11a) can comprise bismuth ferrite ($BiFeO_3$) and the second ferroelectric layer (11b) can comprise titanium-doped bismuth ferrite ($Bi(Fe,Ti)O_3$).

In accordance with various embodiments, the first ferroelectric layer (11a) and the second ferroelectric layer (11b) can be designed in such a way that at the (e.g. common) interface at which the first ferroelectric layer (11a) is in physical contact with the second ferroelectric layer (11b), has a high doping and electrical conductivity. Illustratively, the first ferroelectric layer (11a) and the second ferroelectric layer (11b) can adjoin one another in an electrically conductive contact region.

In accordance with various embodiments, the first ferroelectric layer (11a) and the second ferroelectric layer (11b) can be oxidic and have an oxygen defect n-type doping. In this case, the electrically conductive contact region can have a high n-type doping, e.g. based on the titanium doping and/or at least on a portion of the oxygen defects.

In accordance with various embodiments, the contact region can in each case comprise the layer material of the first ferroelectric layer (11a) and/or of the second ferroelectric layer (11b) with a concentration of free charge carriers of more than $10^{19}$ $cm^{-3}$ (e.g. more than $10^{20}$ $cm^{-3}$, e.g. more than $10^{21}$ $cm^{-3}$, e.g. more than $10^{22}$ $cm^{-3}$, e.g. more than $10^{23}$ $cm^{-3}$).

Furthermore, the first contact (T1) and the second contact (T2) can in each case comprise at least one metal, e.g. titanium, aluminum, copper, platinum, gold, or some other material suitable as electrode or contact.

In accordance with various embodiments, a resistance structure can comprise the following: a first electrically conductive contact (T1); a second electrically conductive contact (T2); a first piezoelectric layer (11a); a second piezoelectric layer (11b); wherein the first piezoelectric layer (11a) and the second piezoelectric layer (11b) are in physical contact with one another and are arranged between the first electrically conductive contact (T1) and the second electrically conductive contact (T2); and wherein the first electrically conductive contact (T1) together with the first piezoelectric layer (11a) forms a Schottky contact and/or the second electrically conductive contact (T2) together with the second piezoelectric layer (11b) forms a Schottky contact.

In accordance with various embodiments, the first piezoelectric layer (11a) and/or the second piezoelectric layer can comprise at least one material from the following group of materials: lead zirconate titanate, barium titanate, lead magnesium niobate, aluminum orthophosphate, a material from the tourmaline group, and potassium sodium tartrate tetrahydrate.

In accordance with various embodiments, by means of a first voltage having a first polarity being applied between the first electrical contact (T1) and the second electrical contact (T2), the resistance arrangement (3) can be influenced or set in such a way that the first ferroelectric layer (11a) together with the first electrical contact (T1) forms an ohmic junction and the second ferroelectric layer (11b) together with the second electrical contact (T2) forms a Schottky contact. This can illustratively be realized by the fact that the electrical conductivity (e.g. the doping distribution of the oxygen vacancies) in the two ferroelectric layers can be altered or set by means of the voltage and the resultant flowing current. Consequently, by way of example, the electrical conductivity of the first ferroelectric layer (11a) in the contact region with the metallic first electrical contact (T1) can be high enough (e.g. the first ferroelectric layer (11a) in the contact region with the metallic first electrical contact (T1) can have a concentration of free charge carriers in a range of approximately $10^{19}$ $cm^{-3}$ to approximately $10^{23}$ $cm^{-3}$, or more than $10^{23}$ $cm^{-3}$) that an ohmic junction (ohmic contact) forms or is established between the first ferroelectric layer (11a) and the first electrical contact (T1). Furthermore, by way of example, the electrical conductivity of the second ferroelectric layer (11b) in the contact region with the metallic second electrical contact (T2) can be low enough (e.g. the second ferroelectric layer (11b) in the contact region with the metallic second electrical contact (T2) can have a concentration of free charge carriers in a range of approximately $10^{14}$ $cm^{-3}$ to approximately $10^{19}$ $cm^{-3}$) such that a semiconductor-metal junction (Schottky contact) forms or is established between the second ferroelectric layer (11b) and the second electrical contact (T2).

In accordance with various embodiments, by means of a second voltage having a polarity opposite to the first polarity being applied between the first electrical contact (T1) and the second electrical contact (T2), the resistance arrangement (3) can be influenced or set in such a way that the first ferroelectric layer (11a) together with the first electrical contact (T1) forms a Schottky contact and the second ferroelectric layer (11b) together with the second electrical contact (T2) forms an ohmic junction. This can illustratively be realized by virtue of the fact that the electrical conductivity (e.g. the doping distribution of the oxygen vacancies) in the two ferroelectric layers can be altered or set by means of the voltage and the resultant flowing current. Consequently, by way of example, the electrical conductivity of the second ferroelectric layer (11b) in the contact region with the metallic second electrical contact (T2) can be high enough (e.g. the second ferroelectric layer (11b) in the contact region with the metallic second electrical contact (T2) can have a concentration of free charge carriers in a range of approximately $10^{19}$ $cm^{-3}$ to approximately $10^{23}$ $cm^{-3}$, or more than $10^{23}$ $cm^{-3}$) that an ohmic junction (ohmic contact) forms or is established between the second ferroelectric layer (11b) and the second electrical contact (T2). Furthermore, by way of example, the electrical conductivity of the first ferroelectric layer (11a) in the contact region with the metallic first electrical contact (T1) can be low enough (e.g. the first ferroelectric layer (11a) in the contact region with the metallic first electrical contact (T1) can have a concentration of free charge carriers in a range of approximately $10^{14}$ $cm^{-3}$ to approximately $10^{19}$ $cm^{-3}$) such that a semiconductor-metal junction (Schottky contact)

forms or is established between the first ferroelectric layer (11a) and the first electrical contact (T1).

In accordance with various embodiments, the concentration of free charge carriers can be dependent on the n-type doping or result from the n-type doping.

Illustratively, the ferroelectric layers can be semiconducting and have a charge carrier density (e.g. of free charge carriers or of the electrons) that is displaceable (for example spatially in the respective layer or in both layers), such that both a Schottky contact and an ohmic contact with a metal can be provided, for example by the ferroelectric layers being switched in an electrically conducting or electrically semiconducting fashion partly in the region at the metallic contacts.

The displaceable charge carrier density or the displaceable doping can be influenced, set or generated for example by means of mobile doping atoms (which can diffuse, or drift, or move for example in the material of the layer) and by means of fixed doping atoms (fixedly incorporated into the crystal lattice of the material of the layer). In accordance with various embodiments, an asymmetrical distribution of fixed dopants can be provided for example in each of the piezo- or ferroelectric layers (for example titanium atoms as fixed doping atoms for BFO), such that the diffusivity or the drift of the mobile dopants (for example oxygen vacancies for BFO) is correspondingly asymmetrical. By way of example, in regions having a relatively high concentration of fixed doping atoms (e.g. titanium atoms in BFO) the diffusivity of the mobile doping atoms (e.g. oxygen vacancies for BFO) can be less than in regions having a relatively low (or no) concentration of fixed doping atoms. Illustratively, the mobile doping atoms can be spatially localized (or trapped) by means of the fixedly incorporated doping atoms, such that a permanent displaceable doping can be set.

In accordance with various embodiments, a method for operating a resistance structure (3) (memristor arrangement) can comprise the following: providing a first voltage having a first polarity between the first electrical contact (T1) and the second electrical contact (T2), such that the first ferroelectric layer (11a) together with the first electrical contact (T1) forms an ohmic junction and the second ferroelectric layer (11b) together with the second electrical contact (T2) forms a Schottky contact.

In accordance with various embodiments, a method for operating a resistance structure (3) (memristor arrangement) can comprise the following: providing a second voltage having a second polarity between the first electrical contact (T1) and a second electrical contact (T2), such that the first ferroelectric layer (11a) together with the first electrical contact (T1) forms a Schottky contact and the second ferroelectric layer (11b) together with the second electrical contact (T2) forms an ohmic junction.

In accordance with various embodiments, an (e.g. contact-connected) polycrystalline, piezo- or ferroelectric thin-film layer (a layer or a thin film) can comprise at least one piezo- or ferroelectric crystallite having (a plurality of) regions (11"), (11') and (11), wherein at least two outer contacts are fitted to the crystallite or to the crystallites and the crystallites of the modified polycrystalline piezo- or ferroelectric thin-film layer are electrically isolated from one another in the region of the grain boundaries (GB"); wherein the physical and/or chemical properties of the regions (11") differ from the physical and/or chemical properties of the regions (11), and isolating strained regions (11') form between (11") and the remaining unstrained region (11) of the crystallites.

Furthermore, the boundary between strained phase (11') and unstrained phase (11) in each crystallite can be shifted within the crystallite by a voltage being applied between the contacts.

In accordance with various embodiments, the production of a piezo- or ferroelectric thin-film layer (of a layer) can be characterized in that a metal film (a metal layer) is applied to a carrier material (substrate), a polycrystalline piezo- or ferroelectric material is applied to the metal layer, the regions (11") and the grain boundaries (GB") are formed at the outer surface of the crystallites by modification of the polycrystalline thin-film layer, a metal film (metal layer) is applied to the polycrystalline thin-film layer, wherein the modification of the polycrystalline thin-film layer leads to the formation and subsequent drift and/or diffusion of vacancies to the outer surface of the individual crystallites and to a change in the valence of the vacancies in the outer surface of the crystallites and thus to the formation of the regions (11") and the grain boundaries (GB").

In accordance with various embodiments, the production of a piezo- or ferroelectric thin-film layer can comprise the fact that the modification is effected by means of ion implantation, by means of plasma based ion implantation (PIII), by means of laser irradiation or by means of electron beams.

In accordance with various embodiments, a contact-connected polycrystalline piezo- or ferroelectric thin-film layer (in other words a polycrystalline piezo- or ferroelectric thin-film layer that is contacted) can be used for transporting charge carriers between two outer contacts, wherein charge carriers are transported through the mutually electrically isolated crystallites of the polycrystalline thin-film layer and in the grain boundaries (GB"), wherein the proportion of the current which flows through the grain boundaries (GB") determines the order of magnitude of the current signal in contact-connected polycrystalline, piezo- or ferroelectric thin-film layers.

In accordance with various embodiments, a contact-connected polycrystalline piezo- or ferroelectric thin-film layer can be used as a resistance switch (e.g. memristor) having high retention and endurance and a high current signal, wherein the two contacts are preferably a rectifying contact (S) and a non-rectifying contact (O).

In accordance with various embodiments, a contact-connected polycrystalline piezo- or ferroelectric thin-film layer can be used in a solar cell for separating photogenerated charge carriers in the polycrystalline thin-film layer having crystallites electrically isolated from one another, wherein the separation (of the charge carriers) takes place in each case in the crystallite in which the electron-hole pairs were generated by absorption of light, and wherein the two contacts (S) and (O) are preferably two non-rectifying contacts.

In accordance with various embodiments, a non-rectifying contact can be an ohmic contact, e.g. if the conductivity difference or the charge carrier difference between the metal contact and the ferroelectric layer is low, as described above. Furthermore, a rectifying contact can be a Schottky contact (semiconductor-conductor contact or semiconductor-metal contact), e.g. if the conductivity difference or the charge carrier difference between the metal contact and the ferroelectric layer is high, that is to say that the ferroelectric layer is semiconducting, as described above.

In accordance with various embodiments, a layer structure (e.g. a polycrystalline piezo- or ferroelectric layer contact-connected by means of at least two contacts) can comprise the following: two electrically conductive contact elements (e.g. a first electrically conductive contact and a second electrically conductive contact); and a layer having a plurality of ferroelectric crystallites (e.g. a polycrystalline ferroelectric layer) embodied such that they are at least partly electrically isolating at the boundaries between the ferroelectric crystallites (at the grain boundaries), such that a current flow between ferroelectric crystallites through the boundaries is inhibited, wherein the layer is arranged between the two electrically conductive contact elements.

In accordance with various embodiments, the layer can also be regarded as a region comprising ferroelectric material, wherein this region is arranged between the two electrically conductive contact elements.

Furthermore, the layer can be structured, e.g. subdivided or separated into individual layer regions.

In accordance with various embodiments, the plurality of ferroelectric crystallites can comprise an electrically conductive region, a metallic region or a metal layer at the boundaries between the ferroelectric crystallites. Furthermore, the plurality of ferroelectric crystallites can comprise at least one Schottky contact or at least one semiconductor-conductor junction at the boundaries between the ferroelectric crystallites.

Illustratively, a barrier layer or a barrier region can form or be provided between the plurality of ferroelectric crystallites. In this case, the barrier region can be formed in each case in the material of the plurality of ferroelectric crystallites. By way of example, by means of sputtering (ion bombardment, irradiation with particles or the like) the grain boundary can be modified in such a way that preferably light atoms such as oxygen are sputtered from the ferroelectric material, such that the remaining material composed of the heavier atoms, such as bismuth and iron, for example, has a metallic character or forms a metallic region. This metallic regions at the grain boundaries together with the semiconducting ferroelectric material of the crystallites can then form a Schottky contact or a conductor-semiconductor contact.

In accordance with various embodiments, a method for processing a layer structure can comprise the following: irradiating a layer comprising a plurality of ferroelectric crystallites adjoining one another in grain boundary regions, as a result of which the grain boundary regions are influenced in such a way that the electric conductivity is reduced along a path through the grain boundary regions.

Furthermore, the irradiating can be carried out by means of ions, by means of ion implantation, by means of plasma immersion ion implantation (PIII), by means of laser irradiation, by means of thermal radiation and/or by means of electron beams. In accordance with various embodiments, the irradiating (e.g. by means of ions) can modify the crystallites in such a way that the chemical composition thereof is altered (e.g. locally at the grain boundaries or at the exposed surface).

In accordance with various embodiments, the plurality of ferroelectric crystallites can comprise oxygen, and the irradiating can be carried out in such a way that oxygen vacancies are formed at the surface of the layer and/or in the grain boundary regions.

A vacancy can relate here to the correspondingly ideal crystal lattice (a vacancy in the otherwise fully occupied lattice) of the ferroelectric material of the crystallites, for example to atom positions in the crystal lattice.

Furthermore, the plurality of ferroelectric crystallites can be n-conducting (semiconducting with electrons as dominant free charge carriers), wherein the irradiating can be carried out in such a way that a metallic or electrically conductive material having metallic character (e.g. having a substantially free electron gas) is formed at least in the grain boundary regions.

In accordance with various embodiments, the plurality of piezoelectric or ferroelectric crystallites can furthermore comprise at least one material from the following group of materials: lead zirconate titanate, barium titanate, lead magnesium niobate, aluminum orthophosphate, a material from the tourmaline group, and potassium sodium tartrate tetrahydrate.

In accordance with various embodiments, a method for encrypting a bit sequence can comprise the following: switching a resistance element (e.g. a memristor) in accordance with a bit sequence, wherein the resistance element is switched into a first resistance state (e.g. HRS) with a first resistance value in the case of a first bit value (e.g. 0) of a bit of the bit sequence, and wherein the resistance element is switched into a second resistance state (e.g. LRS) with a second resistance value in the case of a second bit value (e.g. 1) of a bit of the bit sequence, wherein the second resistance value is different than the first resistance value (LRS≠HRS); selecting a load resistance from a plurality of load resistances having different load resistance values; generating an electrical signal (e.g. a first harmonic), wherein the generated electrical signal is fed to the selected load resistance and to the switched resistance element, such that at least one harmonic (or a higher harmonic) of the electrical signal is generated; determining a quantity that describes the at least one harmonic as a quantity describing the first bit value or the second bit value. In this case, the generated electrical signal which is fed to the selected load resistance and to the switched resistance element can be or comprise for example a temporally and/or spatially periodically varying signal, e.g. an alternating current or an AC voltage having a fundamental frequency (f1) or having a first harmonic. Furthermore, the harmonic can be a higher harmonic of the fundamental frequency (f1) (or of the first harmonic) spatially or temporally. In accordance with various embodiments, the electrical signal and/or the generated harmonic can be sinusoidal or cosinusoidal.

In accordance with various embodiments, the second harmonic, the third harmonic, and/or a higher harmonic than the third harmonic can be used for the method for encrypting a bit sequence.

In accordance with various embodiments, the resistance element can comprise at least one of the following elements: at least one memristor; and a circuit having at least two resistances, wherein at least one resistance of the at least two resistances is a nonlinear resistance. In this case, a nonlinear resistance can have a nonlinear U-I characteristic curve.

Furthermore, the plurality of load resistances can be a plurality of ohmic resistances, e.g. having a linear U-I characteristic curve.

In accordance with various embodiments, at least one of the following quantities can be determined as quantity that describes the at least one harmonic: a quantity that represents the electrical power of the harmonic (or of the higher harmonic); a quantity that represents the electrical power of the harmonic (or of the higher harmonic) in relation to the electrical power of the electrical signal that generates the harmonic. Illustratively, the electrical signal can have a first generated harmonic (fundamental frequency) having a first power ($p_{f1}$), wherein the generated higher harmonics respectively have a second power ($p_{f2}$, $p_{f3}$, $p_{f4}$, etc. for the second, third and fourth harmonics), wherein the quantity can be or can take account of the power ratio of the harmonics ($p_{f2}/p_{f1}$, $p_{f3}/p_{f1}$, $p_{f4}/p_{f1}$).

In accordance with various embodiments, the phase shift between voltage and current can be taken into account in the case of the power or the power ratio. Furthermore, the power ratio of the harmonics can be normalized to a predefined power ratio range (e.g. by means of a so-called mapper), such that the quantity can be a percentage quantity between zero and one (e.g. 0% to 100% or a real number or a complex number).

In accordance with various embodiments, selecting a load resistance for encrypting a bit can comprise the following: checking for a provisionally selected load resistance whether its load resistance value is in a predefined load resistance value of a plurality of load resistance values which is assigned to a resistance state assigned to the bit value of the bit to be encrypted, and selecting the provisionally selected load resistance as the (actually used) load resistance if this is the case.

Illustratively, by way of example, a higher harmonic can be generated for the first bit value only if the load resistance value is in a corresponding first load resistance value range, and a higher harmonic can be generated for the second bit value only if the load resistance value is in a corresponding second load resistance value range. The load resistance values for encrypting the first bit value (by means of the first resistance state) can form a first set and load resistance values for encrypting the second bit value (by means of the second resistance state) can form a second set, wherein the first set and the second set are disjoint.

Furthermore, the plurality of load resistance value ranges can comprise a first load resistance value range and a second load resistance value range, wherein the first load resistance value range and the second load resistance value range are predefined relative to one another in such a way that the quantity (e.g. the power ratio) for the first load resistance value range for the first resistance state (e.g. for the first bit value) and the quantity for the second load resistance value range for the second resistance state (e.g. for the second bit value) are in a predefined range of values (e.g. power ratio range) for the quantity (e.g. power ratio).

Illustratively, the load resistance value ranges can be chosen in such a way that the power ratio of the harmonics in each case for the first bit value is in the same power ratio range as the power ratio of the harmonics in each case for the second bit value. Here each of the load resistance value ranges can have a plurality of different load resistance values. Thus, illustratively, on the basis of the power ratios of the harmonics it is no longer possible to identify which bit value has been encrypted without knowing the load resistance values of the load resistance value ranges and the properties of the resistance element.

In accordance with various embodiments, the provisionally selected load resistance can be chosen in accordance with a predefined sequence of load resistances having different load resistance values. In this case, illustratively, load resistance values can be discarded until a provisional load resistance value from the sequence is chosen which matches the bit value respectively to be encrypted (e.g. until a load resistance value from the first load resistance value range is provisionally selected for a first bit value and/or until a load resistance value from the second load resistance value range is provisionally selected for a second bit value).

In accordance with various embodiments, the predefined sequence of load resistances can comprise random load resistance values from at least the first and second load resistance value ranges.

In accordance with various embodiments, a method for decrypting an encrypted bit sequence can comprise the following: generating a first reference quantity, comprising, for a respective bit of the encrypted bit sequence, selecting a load resistance in accordance with a predefined sequence composed of a plurality of load resistances having different load resistance values and feeding an electrical signal to a resistance element and to the selected load resistance, wherein the resistance element is in a first resistance state, in which it represents a first bit value; generating a second reference quantity, comprising feeding an electrical signal to a further resistance element and to the selected load resistance, wherein the further resistance element is in a second resistance state, in which it represents a second bit value; determining an associated bit quantity from the encrypted bit sequence for each bit; comparing the first reference quantity with the respective bit quantity; comparing the second reference quantity with the respective bit quantity; determining a bit value for the respective bit taking account of the comparison results.

Illustratively, a reference quantity can in each case be generated for a first bit value and for a second bit value by means of the resistance elements, using the load resistances having the load resistance values in accordance with the sequence, and the reference quantity can be compared with the actual quantity describing the encrypted bit value (bit quantity).

In accordance with various embodiments, the bit quantity can be a received quantity (e.g. a power ratio or normalized power ratio of the harmonics) which was previously encrypted.

Furthermore, the sequence composed of a plurality of load resistances having different load resistance values for decryption can be the same as for encryption. Comparing the first reference quantity with the respective bit quantity and comparing the second reference quantity with the respective bit quantity can be carried out in such a way that reference quantities are generated until the comparison yields a result which allows a bit value to be assigned to the respective bit quantity.

In accordance with various embodiments, the resistance element and/or the further resistance element can comprise at least one of the following elements: at least one memristor; and a circuit having at least two resistances, wherein at least one resistance of the at least two resistances is a nonlinear resistance.

Furthermore, the predefined sequence composed of a plurality of load resistances having different load resistance values can be used as a key or key sequence for the encryption and decryption.

Exemplary embodiments of the invention are illustrated in the figures and are explained in greater detail below.

In the figures:

FIGS. 1A and 1B in each case show a complementary resistance switch or a resistance structure in a schematic view, in accordance with various embodiments;

FIGS. 1C to 1E in each case show a schematic view of a reading scheme and/or writing scheme for a complementary resistance switch or a resistance structure, in accordance with various embodiments;

FIGS. 2A to 2D in each case show an arrangement of a plurality of complementary resistance switches or a resistance structure in a schematic view, in accordance with various embodiments;

Figure 6A:
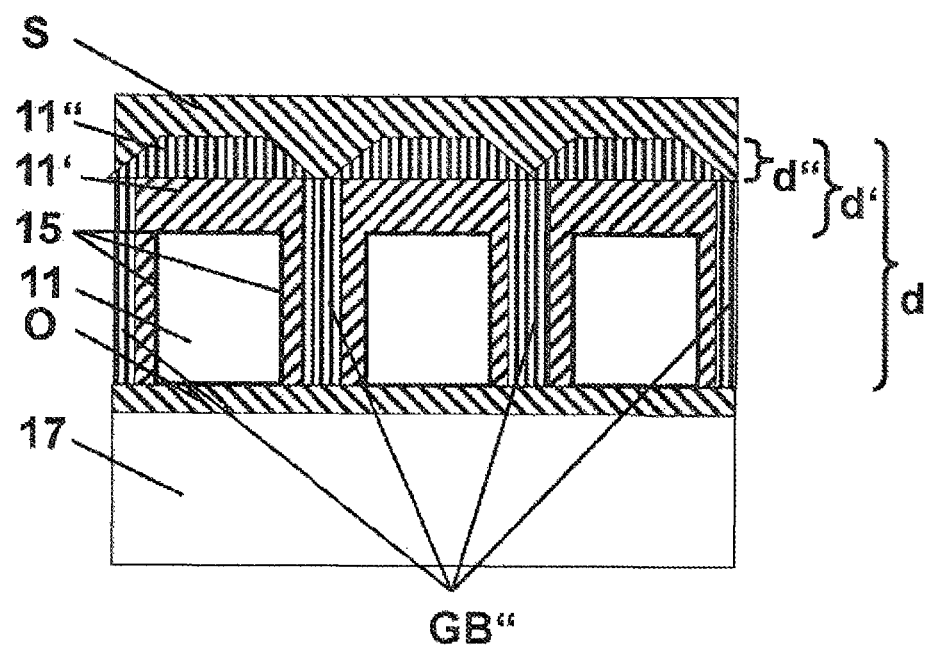
Figure 6B:
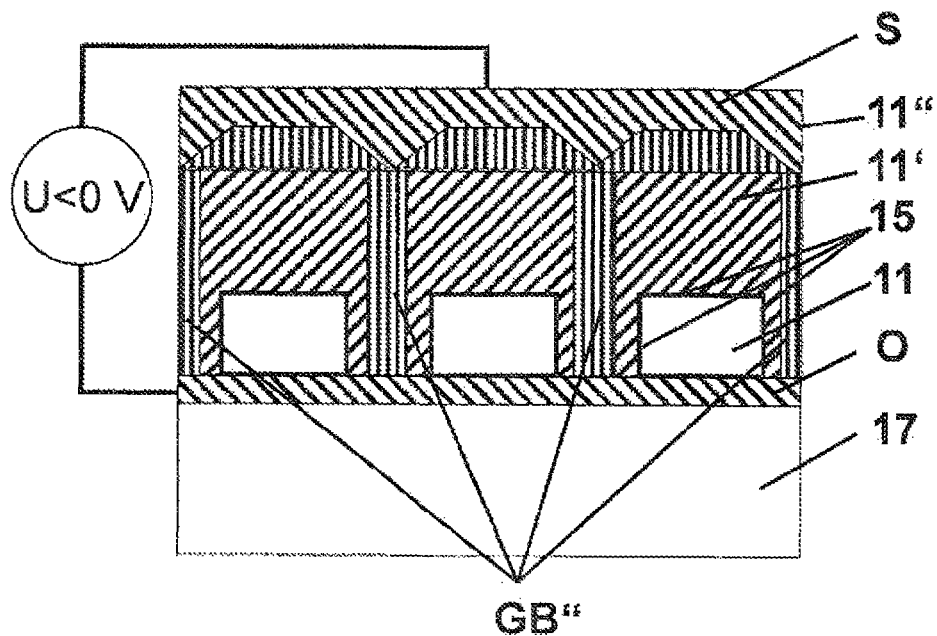
Figure 6C:
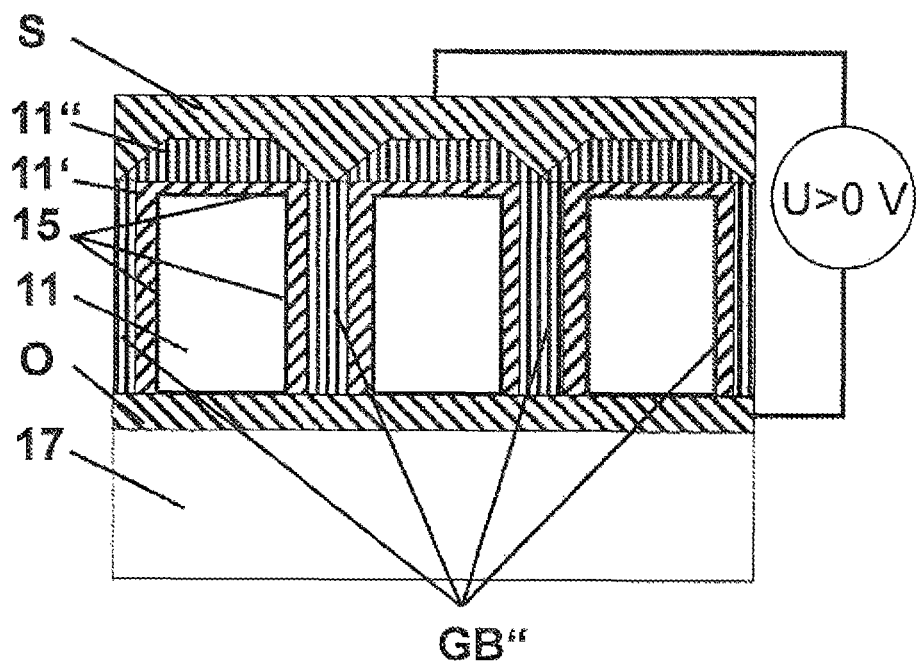
Figure 7A:
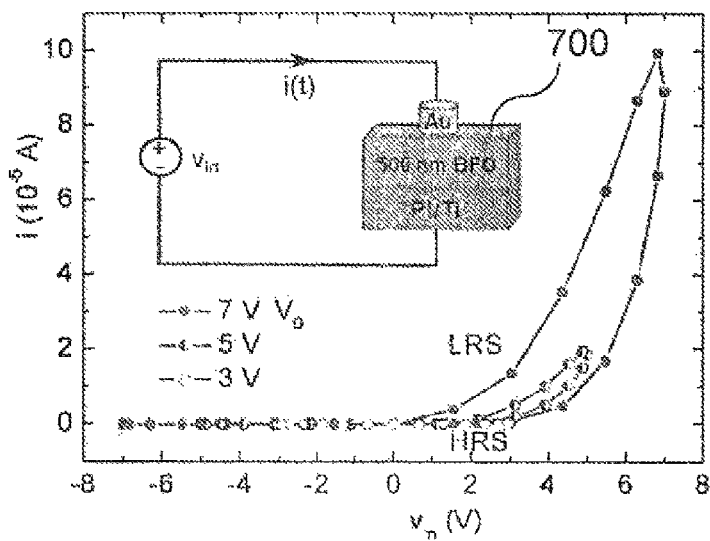
Figure 7B:
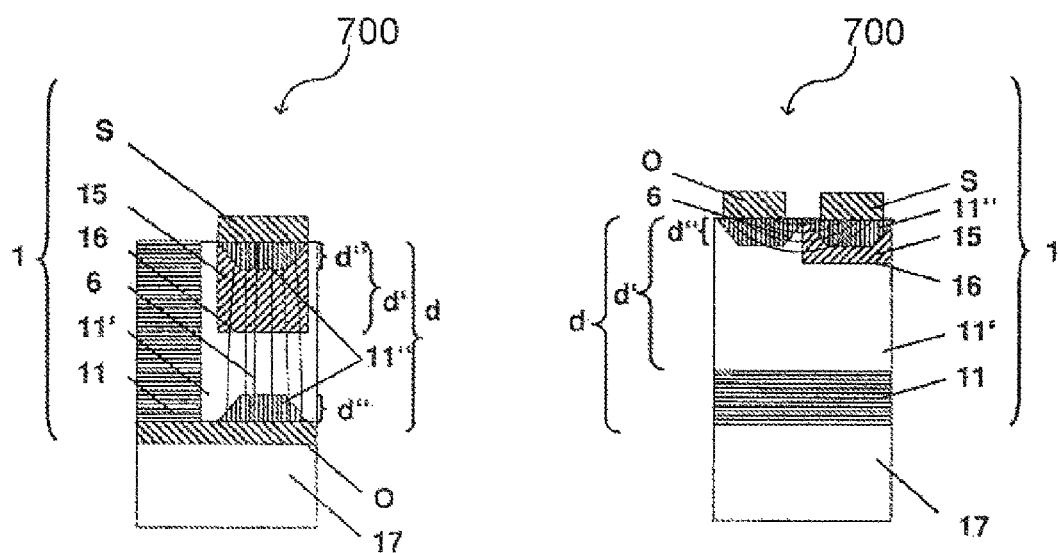
Figure 7C:
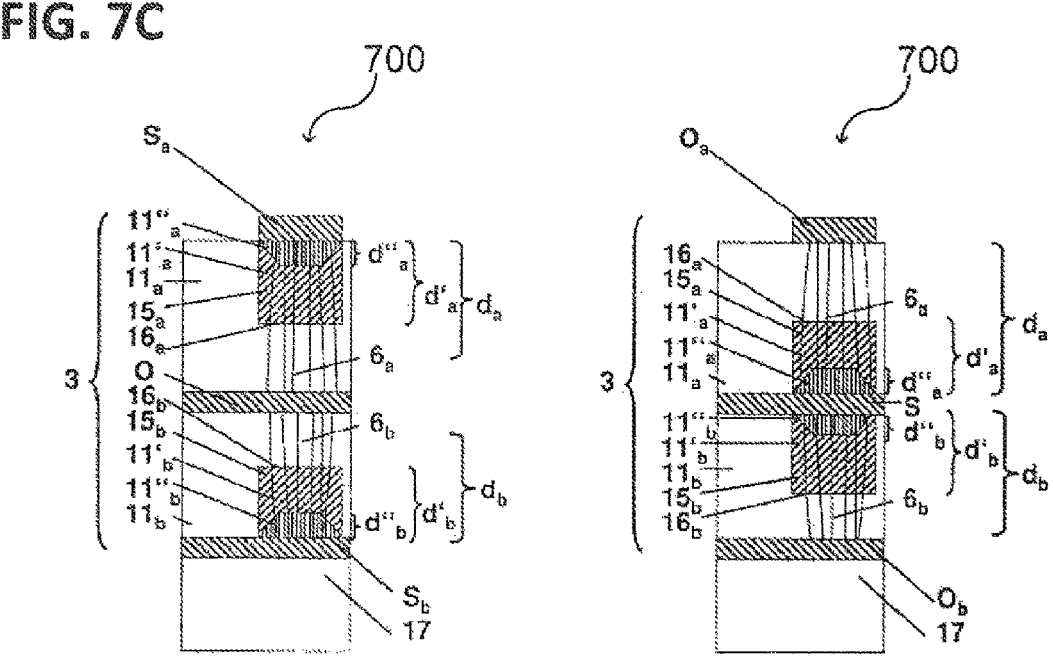
Figure 7D:
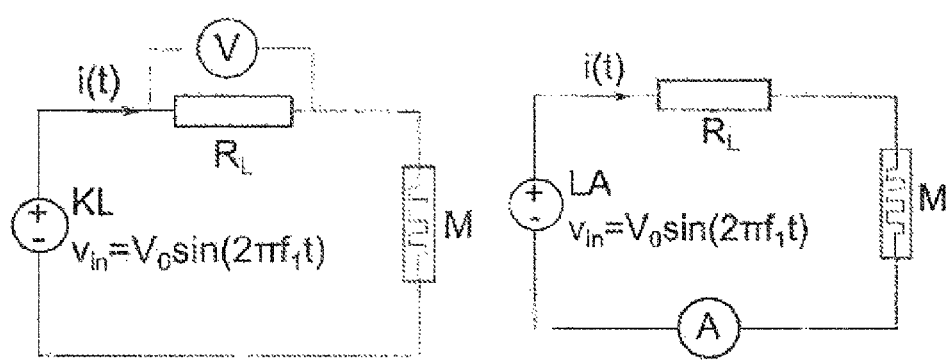
Figure 9:
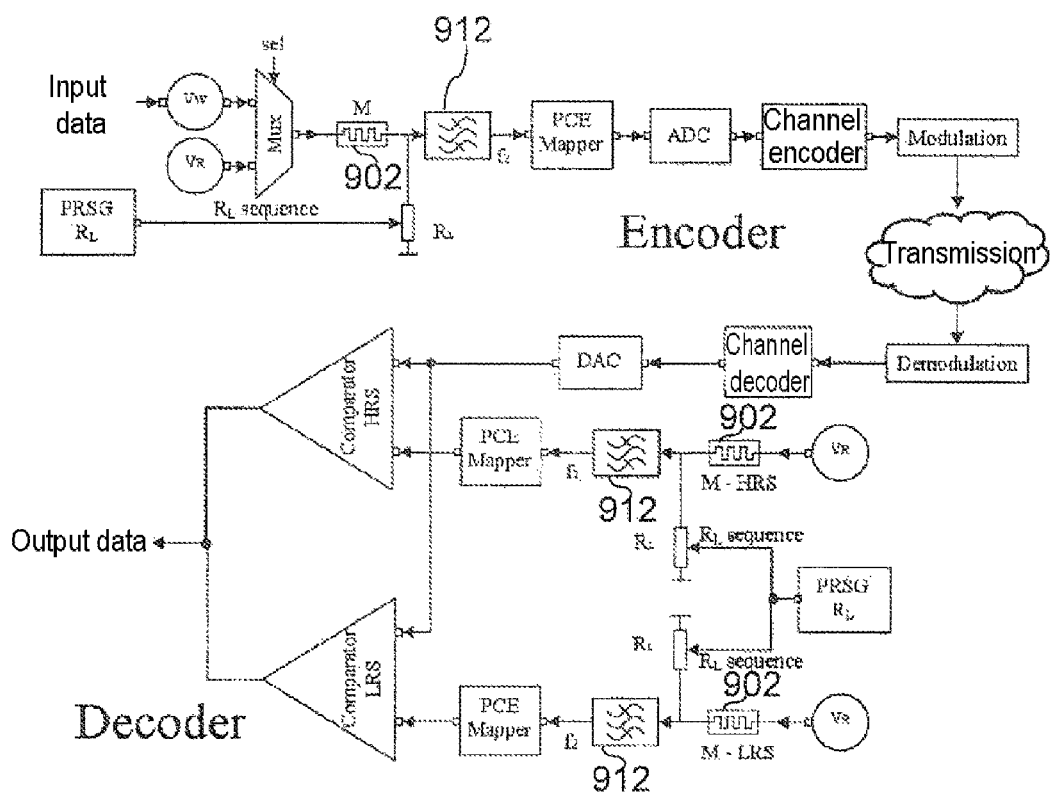
Figure 10A:
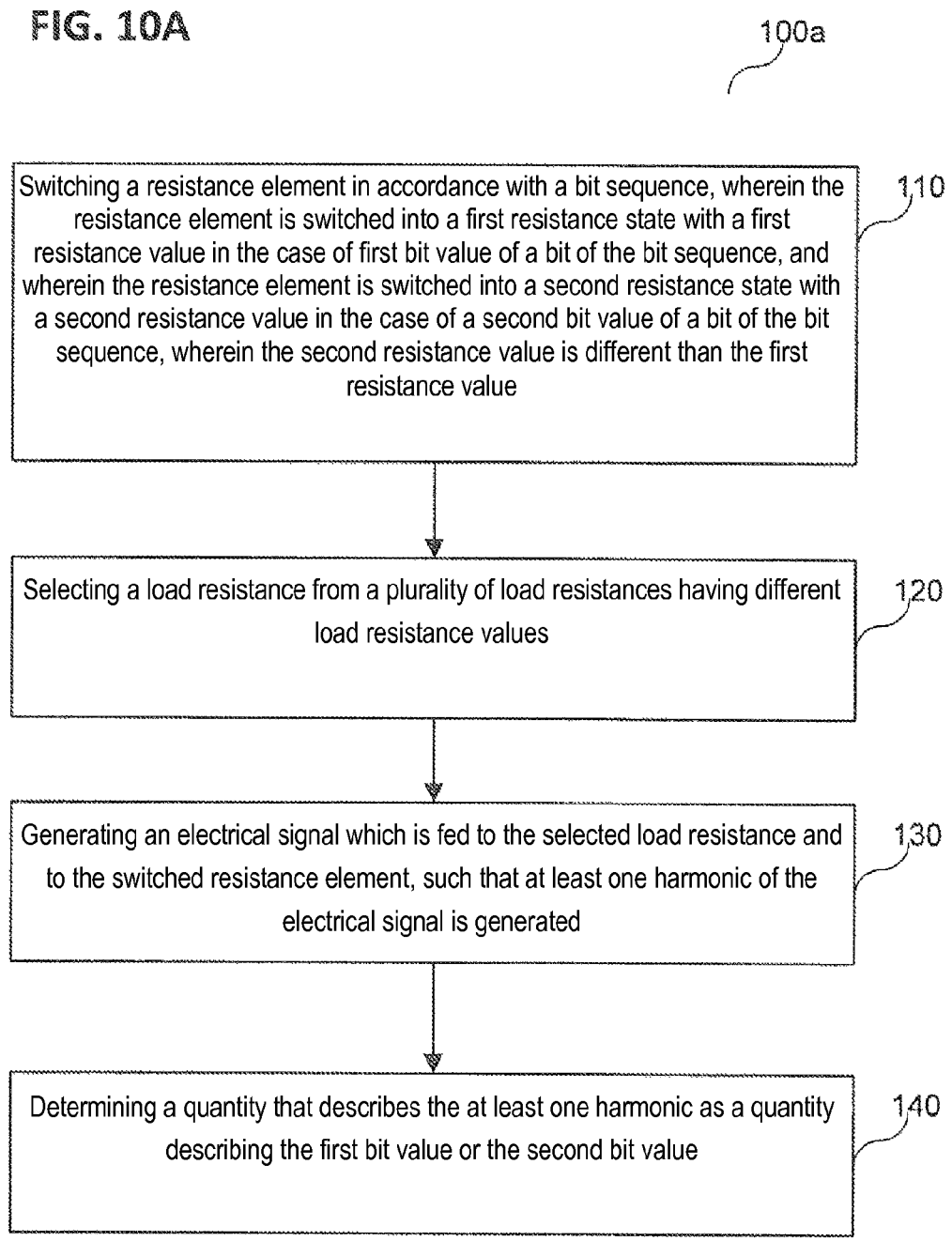
Figure 10B:
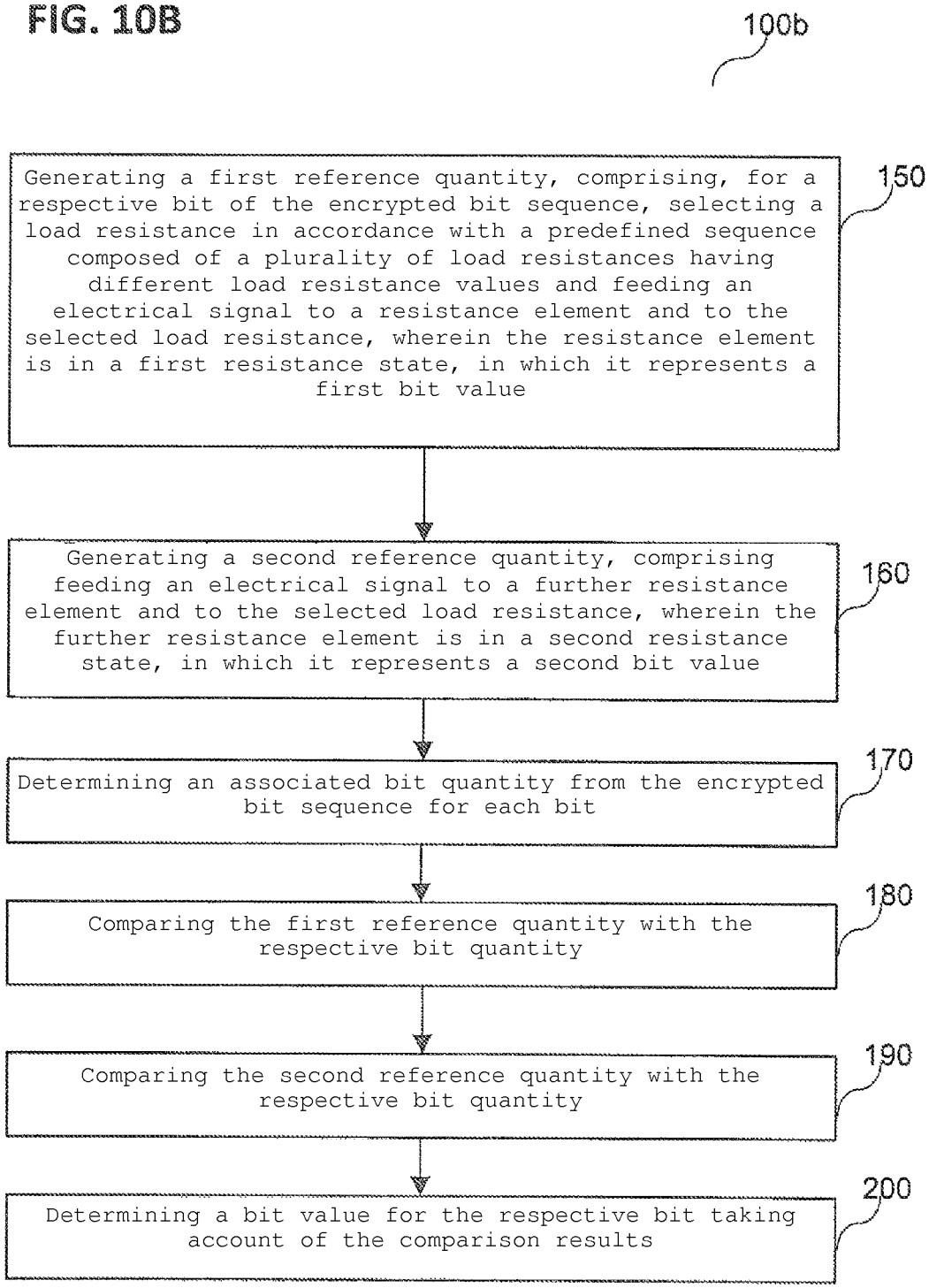

FIGS. 5A to 5D in each case show a polycrystalline piezo- or ferroelectric thin-film layer or a layer structure in a schematic view, in accordance with various embodiments;

FIGS. 6A to 6C in each case show a contact-connected polycrystalline piezo- or ferroelectric thin-film layer or a layer structure in a schematic view, in accordance with various embodiments;

FIG. 7A schematically illustrates the functioning of a resistance switch or of a resistance structure or of a memristor or resistance element, in accordance with various embodiments;

FIGS. 7B and 7C schematically illustrate a resistance switch or a resistance structure or a memristor or a resistance element, in accordance with various embodiments;

FIG. 7D schematically shows the feeding of an electrical signal to a load resistance and to a resistance element, in accordance with various embodiments;

FIGS. 8A to 8E in each case schematically illustrate an aspect of the method for encrypting and/or decrypting a bit sequence, in accordance with various embodiments;

FIG. 9 illustrates a method for encrypting a bit sequence and/or decrypting an encrypted bit sequence, in accordance with various embodiments; and FIGS. 10A and 10B in each case illustrate a flowchart for a method for encrypting a bit sequence and/or decrypting an encrypted bit sequence, in accordance with various embodiments.

In the following detailed description, reference is made to the accompanying drawings, which form part of this description and show for illustration purposes specific embodiments in which the invention can be implemented. In this regard, direction terminology such as, for instance, "at the top", "at the bottom", "at the front", "at the back", "front", "rear", etc. is used with respect to the orientation of the figure(s) described. Since component parts of embodiments can be positioned in a number of different orientations, the direction terminology serves for illustration and is not restrictive in any way whatsoever. It goes without saying that other embodiments can be used and structural or logical changes can be made, without departing from the scope of protection of the present invention. It goes without saying that the features of the various exemplary embodiments described herein can be combined with one another, unless specifically indicated otherwise. Therefore, the following detailed description should not be interpreted in a restrictive sense, and the scope of protection of the present invention is defined by the appended claims.

In the context of this description, the terms "connected" and "coupled" are used to describe both a direct and an indirect connection and a direct or indirect coupling. In the figures, identical or similar elements are provided with identical reference signs, insofar as this is expedient.

The invention describes the production of a complementary resistance switch having two terminals $T_1$ and $T_2$ (e.g. a first terminal $T_1$ and a second terminal $T_2$), to which each Boolean basic function (e.g. each of the 16 Boolean functions for two quantities $y=f(x_1, x_2)$ or each two-digit Boolean function) can be written in a nonvolatile manner by a write voltage being applied in the two-step method. The state of the complementary resistance switch can be read out by the application of a constant, low positive or negative read voltage (referred to as "level read") depending on the input parameters of the Boolean function. Furthermore, a description is given hereinafter of an integration of the complementary resistance switch at the crossover points of a grid structure (array) as a logic gate (also designated hereinafter as gate) in a logic circuit for realizing nonvolatile Boolean functions or as an analog block having a logic gate for realizing filters and amplifiers.

The following reference signs are used hereinafter and in the figures:

bipolar resistance switch a, b or first bipolar resistance switch a and second bipolar resistance switch b, wherein a and b can also serve in each case as additional indices for other reference signs, which can then respectively assign the latter to the first or second bipolar resistance switch;

surface contact S, $S_a$, $S_b$;

associated counter-contact O, $O_a$, $O_b$;

terminal T1, T2 for input and output parameters of the integrated, nonvolatile logic component 3;

thickness d, $d_a$, $d_b$ of the piezo- or ferroelectric layer before a modification;

regions 11, 11', 11" of the piezo- or ferroelectric layer;

thickness d', $d'_a$, $d'_b$, d", $d"_a$, $d"_b$ of modified ferroelectric, conductive regions 11' (for d') and 11" (for d");

voltage U, $U_1$, $U_2$, $U_{ij}$ (wherein i,j can be integral counting indices);

current I, $I_1$, $I_2$, $I_{ij}$ (wherein i,j can be integral counting indices);

resistance R, $R_1$, $R_2$, $R_{ij}$ (wherein i,j can be integral counting indices);

modifying beams 2, e.g. laser, thermal, plasma, ion or electron beams;

complementary resistance switch 3;

region 6, $6_a$, $6_b$ (e.g. a field region) between two contacts, in which region an electric field forms and current can flow when voltage U is applied to the (corresponding) two contacts;

piezo- or ferroelectric layer 11, $11_a$, $11_b$ in the strain-free phase or regions 11, $11_a$, $11_b$ of the piezo- or ferroelectric layer in the strain-free phase or piezo- or ferroelectric crystallite of a piezo- or ferroelectric layer, wherein the piezo- or ferroelectric crystallite can be in an unstrained phase;

modified, ferroelectric region (e.g. a first modified, ferroelectric region) 11', $11'_a$, $11'_b$ of the piezo- or ferroelectric layer 11 or piezo- or ferroelectric crystallite of a piezo- or ferroelectric layer, wherein the piezo- or ferroelectric crystallite can be in a strained phase;

(further) modified, ferroelectric region 11", $11"_a$, $11"_b$, (e.g. a second modified, ferroelectric region of the piezo- or ferroelectric layer 11 or an additional modified, ferroelectric region of the first modified, ferroelectric region 11', $11'_a$, $11'_b$) in contact with the surface contact S and/or with the associated counter-contact O;

region 15, $15_a$, $15_b$ (e.g. a third region of the piezo- or ferroelectric layer 11) having extremely low conductivity between surface contact S and associated counter-contact O, in which above the critical electric field strength or threshold voltage $U_{crit}$ the strained phase is set or can be set, or a boundary between the strained phase 11' and unstrained phase 11 in the crystallite;

structure boundary 16, $16_a$, $16_b$ (or structure boundary region) between two different phases of the piezo- or ferroelectric layer or end of the space charge zone in a piezo- or ferroelectric crystallite;

integrated circuit or carrier material 17;

write voltage ($U_{write}$) $U_{write}$, $U^+write$, $U^-_{write}$;
read voltage ($U_{read}$) $U_{read}$, $U^+_{read}$, $U^-_{read}$;
threshold voltage $U_{crit}$, $U_{crita}$, $U_{critb}$ for setting the strained phase of the region 15,
maximum volume of the write voltage $U_{max}$, $U_{maxa}$, $U_{maxb}$;
current $I@U_{read}$ when a read voltage $U_{read}$ is present;
one state or a plurality of states LRS, LRS', LRS", LRSi, LRSb, LRSb', LRSb", LRSbi, LRSa, LRSa', LRSa", LRSai (e.g. one first state or a plurality (e.g. i) of first states of the resistance switches a, b) having a low resistance (referred to as "low resistance state") where i=1 to n (i as counting index);
smallest value $U_{min}$, $U_{mina}$, $U_{minb}$ of the write voltage for writing the LRS1 (the first low resistance state);
maximum value $U_{max}$, $U_{maxa}$, $U_{maxb}$ of the write voltage for writing the LRSn (e.g. the n-th first state);
one state or a plurality of states HRS, HRSb, HRSb', HRSb", HRSa, HRSa', HRSa" (e.g. one second state or a plurality of second states of the resistance switches a, b) having a high resistance (referred to as "high resistance state") where i=1 to n (i as counting index);
read current $I_{LRS}$, $I_{LRSb}$, $I_{LRSb}'$, $I_{LRSb}"$, $I_{LRSbi}$, $I_{LRSa}$, $I_{LRSa}'$, $I_{LRSa}"$, $I_{LRSai}$ in the LRS when the read voltage $U_{read}$ is applied;
read current $I_{HRSb}$, $I_{HRSb}'$, $I_{HRSb}"$, $I_{HRSa}$, $I_{HRSa}'$, $I_{HRSa}"$ in HRS when the read voltage $U_{read}$ is applied;
first cycle step C.VH1 for initializing the nodes of an array;
second cycle step C.VH2 for writing to the crossover points of an array that are required for implementing a logic function;
step C.VL for reading the state of the crossover points of an array that are required for implementing a logic function;
rows m and columns n of an array;
grain boundary GB; and
vacancies V, oxygen vacancies $V_o$.

The invention relates to a complementary resistance switch for integration in electrical components, the production of the complementary resistance switch and the use thereof, for example in a logic gate or in an analog block.

A block can also be called CAB (standing for configurable analog block) (e.g. as part of a programmable analog circuit, e.g. of a field programmable analog array FPAA). Various analog basic circuits (e.g. filters and/or amplifiers) can be realized by means of such a block. In this case, a logic circuit can be used for producing the necessary connections within and between a plurality of blocks (CABs). Furthermore, analog inputs and outputs can produce a connection of the block or blocks to a peripheral environment. In this case, the block or blocks can be configured using digital inputs and outputs, wherein the inputs and outputs can be connected to memory components or microprocessors.

A logic gate or gate can have an electronic structure for realizing a Boolean function, such that input signals can be processed to form output signals. The input signals can be converted to form a single logic result for example by means of an implementation of logic operators, such as AND, OR, NOT, XOR and NOR, etc. and can be mapped by the output signals. There are various possibilities for the implementation.

In accordance with various embodiments, different voltages can be used as signals and applied for example to one input or to a plurality of inputs of the gate. The voltages can represent for example logic states (e.g. represented by "0" or "1"). Results of such gates can furthermore be used as input signals for further gates (e.g. in an array), such that diverse circuits can be created.

In general, a logic gate can be a physical device which implements one of the 16 Boolean functions, that is to say that it logically combines one or a plurality of input quantities to form an output quantity. An ideal logic gate can implement the corresponding Boolean function immediately and as often as desired. A control unit forms the central processing unit of a computer and said unit controls the operations of said computer. Control units are constructed ad hoc from logic components. Hardwired logic gates are primarily realized with the aid of diodes or transistors. Their control function is based on a fixed architecture. If the instruction set has to be modified, the wiring of these logic gates also has to be changed. Hardwired logic gates are used in reduced instruction set computers. Microprograms are organized as a sequence of microinstructions and are stored in the specific control memory. The main advantage of the microprogam control unit is the simplicity of its structure. In this regard, microinstructions can easily be replaced.

By way of example, the output variables of a CMOS circuit can be stored with a tunneling magnetoresistance (TMR) structure or some other magnetoresistance structure [US 2012/0195105 A1]. The output variable can be written to the magnetoresistance structure by means of a spin-polarized current having a high current density ($10^6$ to $10^7$ A/cm$^2$), said current being dependent on the output variable. Logic circuits include devices such as multiplexers (for short: MUX), registers, arithmetic logic units (ALUs) and computer memory through complete microprocessors which can contain more than 100 million gates. Compound logic gates AND/OR/INVERT (AOI circuits) and OR/AND/INVERT (OAI circuits) are often used in tour design (combinational logic networks) because their structure using MOSFETSs is simpler and more efficient than the sum of the individual gates.

New developments use nonvolatile bipolar resistance switches and antiseries-interconnected bipolar resistance switches, complementary resistance switches, as logic gates for implementing a Boolean function. In this case, the output variable of a logic gate composed of a bipolar resistance switch is read out with a constant low read current ("level read"). The output variable of a logic gate composed of a complementary resistance switch is read out with a large read current pulse ("spike read"). 14 of the 16 Boolean functions have been realized hitherto with a conventional complementary resistance switch [E Linn et al.: Beyond von Neumann—logic operations in passive crossbar arrays alongside memory operations. *Nanotechnology* 23, 2012, pages 305205-1 to 6]. For p OR q, p NAND q, p NOR q and p AND q, a complementary resistance switch requires 3 cycle functions. XNOR and XOR have not been able to be realized hitherto with a complementary resistance switch. Moreover, after each "spike read", the 3 cycle functions have to be iterated again. Furthermore, the first cycle function for realizing the different Boolean functions writes either a low resistance state (LRS) or a high resistance state (HRS). It is not possible, in the first cycle, to set the state for all the logic gates uniformly to HRS or to LRS. The microphysical cause of the resistive switching processes is different for resistance memory components comprising different materials.

The resistive switching in resistance memory components composed of Cu-doped $Ge_{0.3}Se_{0.7}$ solid electrolytes is based on electrochemical growth and on electrochemical dissolution of metallic, filament-type paths (filament formation)

that form in the solid electrolyte between an oxidizable electrode (Cu) and an inert electrode (Pt) when a voltage is applied. Resistance memory components with filament formation can switch between two resistance states.

The performance features of resistance memory components are the nonvolatility, operation at low voltages and currents, a large ratio $R_{off}/R_{on}$ between the resistances in the "off" ($R_{off}$) and "on" ($R_{on}$) state, fast switching times and long lifetimes. Nonvolatile resistive multi-level switching will not be possible in resistance memory components with filament formation on account of the stochastic nature of filament formation. Phase change materials change their phase from crystalline to amorphous above the phase transition temperature and are currently used principally for latent heat storage and for data storage. The very high current densities to be used are problematic; they can lead to electromigration in the metal tracks (e.g. in the metallization). Moreover, said phase change materials have to be thermally isolated. By way of example, the current densities for attaining the phase transition temperature of 600° C. in GeSbTe are more than $10^7$ A/cm$^2$ [Lee, Benjamin C. et al.: Phase Change-Technology and the Future of Main Memory. *6th Annual International Symposium on Computer Architecture Location: Austin Tex.* 2009, IEEE MICRO 30 (2010), pages: 131-141.].

In accordance with various embodiments, the production of a complementary resistance switch is described, wherein by means of the complementary resistance switch each of the sixteen Boolean basic functions can be written in a nonvolatile fashion and its state can be read out with an (e.g. constant) low read current ("level read"). Furthermore, a fixed sequence of initialization voltage and write voltage can be used for programming the logic functions.

In accordance with various embodiments, two antiseries-interconnected passive capacitor structures are used, each composed of a piezo- or ferroelectric material having locally different conductivities with a phase dependent on the electric field, with metallically conductive surface and associated rear side contacts, and the setting of a locally different voltage drop in the piezo- or ferroelectric material.

Piezo- or ferroelectric materials (PF material) can have different phases. Different phases differ with regard to their crystal structure, their electronic band structure and their band gap and also with regard to their piezo- or ferroelectric properties and their spontaneous polarization charges. For each strain state of the piezo- or ferroelectric material there is a phase of minimum energy. The strain state in piezo- or ferroelectric materials is controlled on the basis of the piezoelectric effect, i.e. the change in volume in an electric field, by means of an electric field by the application of an electrical voltage.

When a voltage is applied between opposite contacts, the majority of the voltage is dropped in the regions having the lowest conductivity on account of the different local conductivity in the PF material, such that a very high electric field can form in the regions having a low conductivity.

A voltage source (e.g. a write voltage source) for providing a write voltage is designated hereinafter as a high-voltage source. In order not to destroy the complementary resistance switches (e.g. composed of BiFeO$_3$), the voltage from the high-voltage source at the complementary resistance switch should not exceed 20 V. The voltage source for providing the read voltage at the complementary resistance switch is designated as a low-voltage source and the read voltages at the complementary resistance switch is low enough that the state (of the resistance switch) is not changed during reading, and high enough that a detectable read current is generated. Typical values for the read voltage (for BiFeO$_3$) are approximately 2 V. Consequently, the write voltage can be greater than 2 V.

The piezo- or ferroelectric material changes its phase upon a critical field strength being exceeded (within the material). By way of example, the critical electric field strength in BiFeO$_3$ is 176 MV/m [Pice Chen et al.: Nonlinearity in the high-electric-field piezoelectricity of epitaxial BiFeO$_3$ on SrTiO$_3$. *Appl. Phys. Lett.* 100, 062906 (2012)]. When this (critical) field strength is exceeded, BiFeO$_3$ changes its structure from rhombohedral to tetragonal, its band gap from 2.1 eV to 2.7 eV and its spontaneous polarization charge from 100 µC/cm$^2$ to 150 µC/cm$^2$. Strains brought about by high electric fields also lead to a structure change in other piezo- or ferroelectric materials. That has also been observed in other thin-film layers and nanostructures, e.g. in SrTiO$_3$ thin-film layers (or thin-film layers) [K. C. Park et al.: Electric field dependence of ferroelectric phase transition in epitaxial SrTiO$_3$ films on SrRuO$_3$ and La$_{0.5}$Sr$_{0.5}$CoO$_3$. *Appl. Phys. Lett.* 77, 435 (2000)] and in KNOB [M. K. Teng et al.: *Pressure induced ferroelectric phase transition in potassium nitrate*. Solid State Communication 9 (1971) 465].

A thin-film layer can have for example a layer thickness of less than 20 µm, e.g. less than 10 µm, less than 5 µm, e.g. less than 2 µm.

Spontaneous polarization charges (e.g. a macroscopic charge distribution) are localized at the structure interfaces between the piezo- or ferroelectric material of different phases. The nonvolatility of this localization depends on the band alignment, that is to say on the stepped change in the electronic band structure at the structure interface. The surface density of the spontaneous polarization charge localized at the structure interface depends on the difference in spontaneous polarization charge in the different phases.

For the nonvolatile localization of the spontaneous polarization charge at the structure interface it is expedient that the spontaneous polarization charges are kept laterally in the region between the contacts and cannot drift into other regions. The use of a polycrystalline piezo- or ferroelectric material is expedient, wherein the crystallites are smaller than the lateral extent of the surface contacts or counter-contacts. Another possibility is to use a structured, epitaxial piezo- or ferroelectric material having structure sizes smaller than the lateral extent of the surface contacts or counter-contacts.

The position of the interface and the difference in spontaneous polarization charges between different phases of the piezo- or ferroelectric material determine the value of the resistance of the piezo- or ferroelectric material between opposite contacts and thus the nonvolatile state of the resistance memory component, which are varied in a controlled manner (e.g. are controlled by open-loop or closed-loop control) by means of an externally applied voltage.

In comparison with phase change materials which require very high current densities for changing their phase from crystalline to amorphous above a phase transition temperature, the current flow in the case of phase change materials which change their phase above a critical electric field strength (PF materials) is low and depends only on the location to which the structure boundary between the different piezo- or ferroelectric phases between two opposite contacts is displaced and the magnitude of the difference in spontaneous polarization charge of the two different piezo- or ferroelectric phases. The current flow is additionally determined by the time required to change the localization location of the spontaneous polarization charge by application of an external voltage.

The small current flow (displacement current for changing the position of the spontaneous polarization charge) simultaneously makes it possible to avoid electromigration in the metal tracks of the contacts used. Moreover, there is no need for simultaneous thermal isolation of the phase change materials which change their phase above a critical electric field strength or temperature.

Figure 1A:
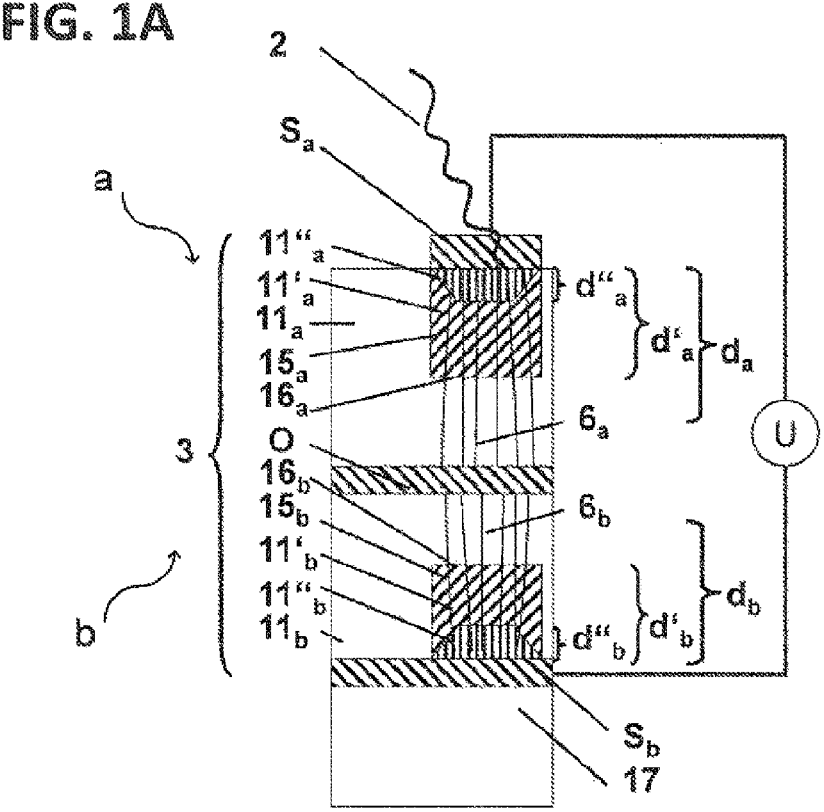
Figure 1B:
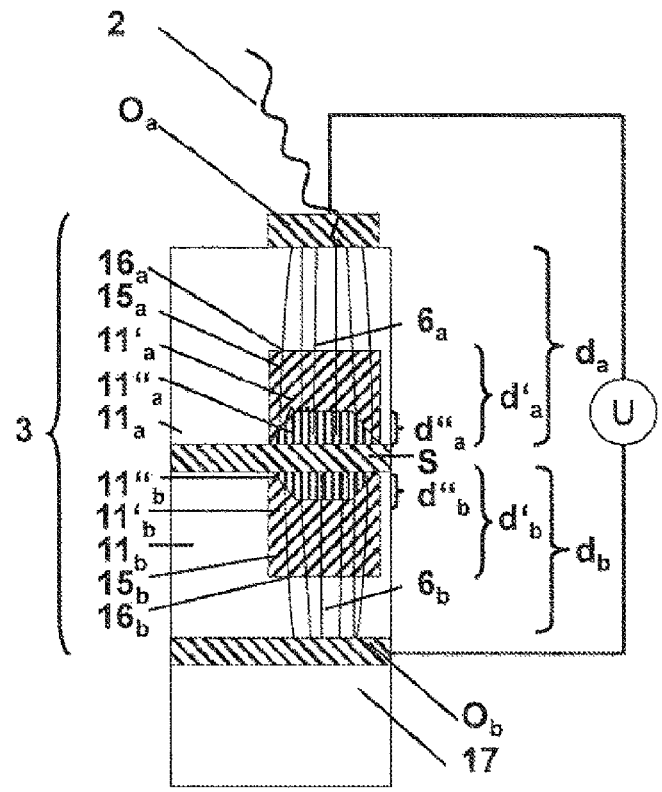
Figure 1C:
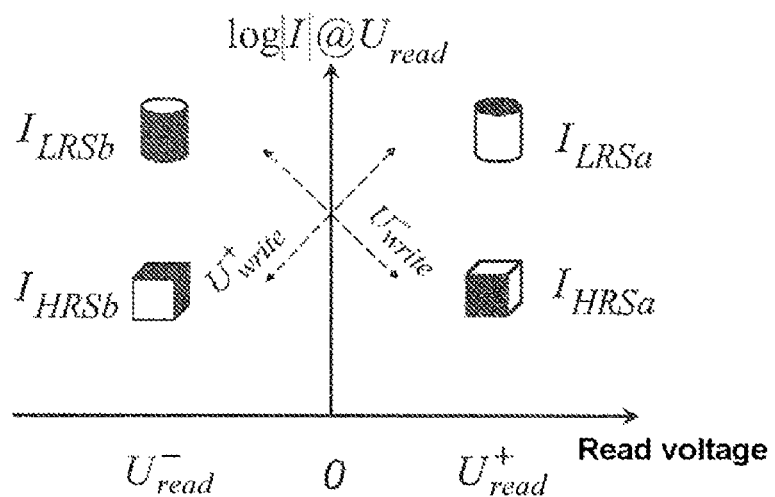
Figure 1D:
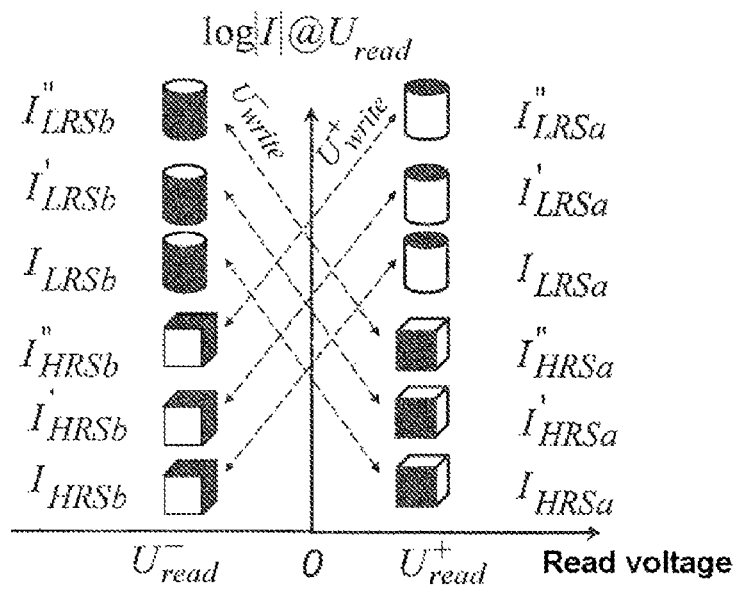
Figure 1E:
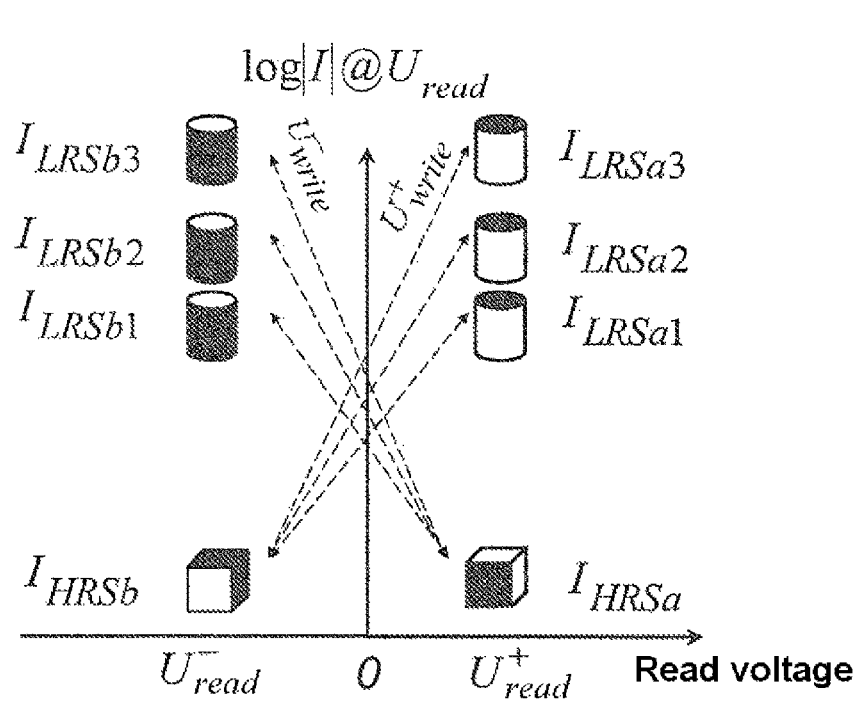

FIGS. 1A and 1B in each case show a construction of a complementary resistance switch (memristor) for integration into nonvolatile logic components. FIG. 1C schematically shows the writing of the state pair {LRSa, HRSb} with a positive write pulse and the state pair {HRSa, LRSb} with a negative write pulse. FIG. 1D schematically shows the writing of the state pairs {LRSa, HRSb} with a positive write pulse and the state pair {HRSa, LRSb} with a negative write pulse in the unmodified material, in the modified material (') and in the multiply modified material ("). FIG. 1E schematically shows the writing of the state pairs {LRSai, HRSb} with a positive write pulse and the state pairs {HRSa, LRSbi} with a negative write pulse.

Figure 2A:
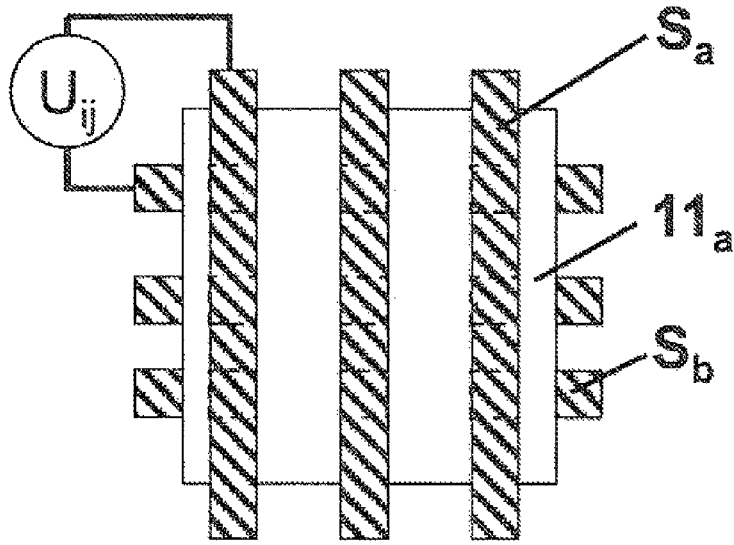
Figure 2B:
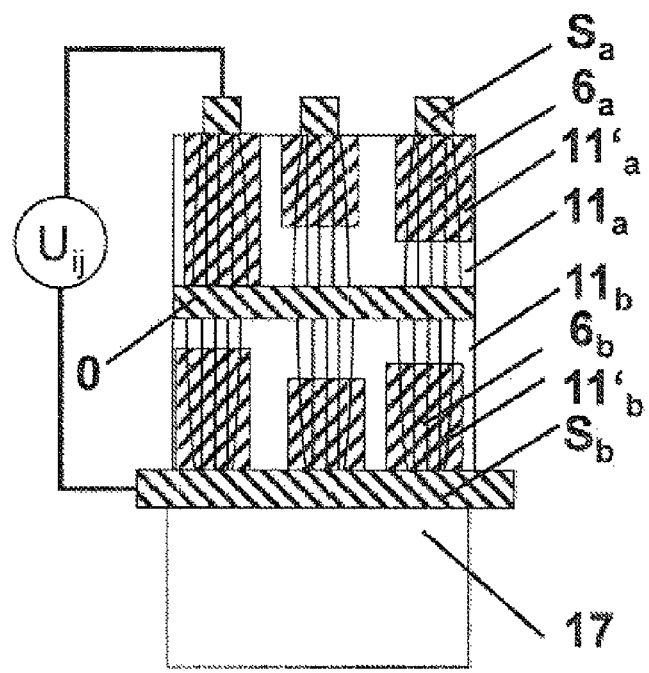
Figure 2C:
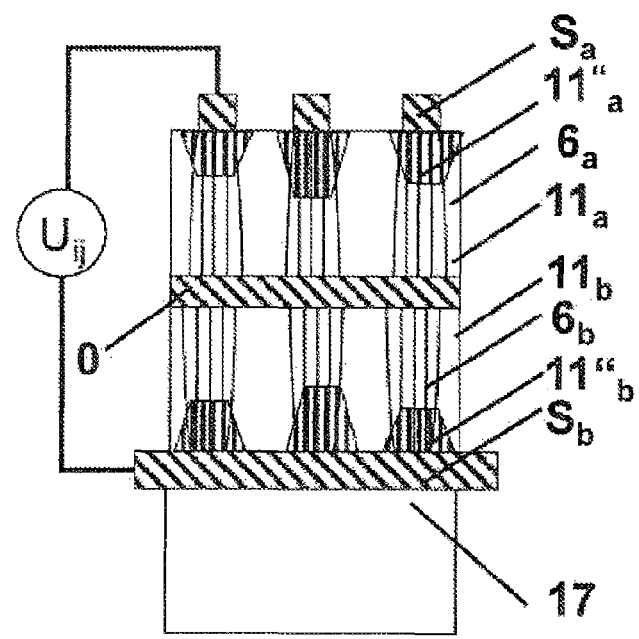
Figure 2D:
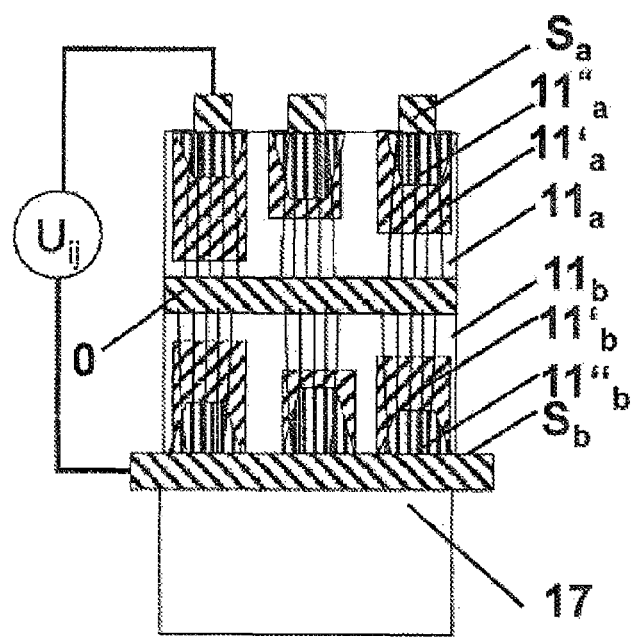
Figures 3, 4A:
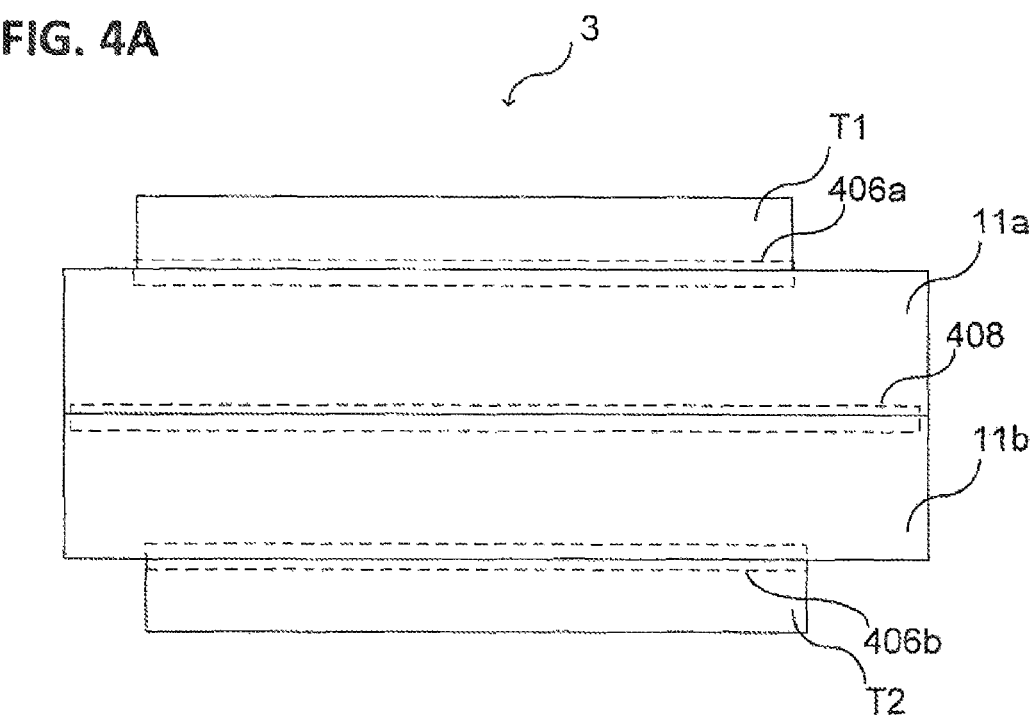
FIG. 3 shows a schematic view for a realization of a Boolean function (XNOR) in the "two-step" method, in accordance with various embodiments.
FIG. 4A shows a complementary resistance switch or a resistance structure in a schematic view, in accordance with various embodiments.

FIG. 2A, FIG. 2B, FIG. 2C and FIG. 2D in each case show the construction of an array comprising complementary resistance switches which contain modified regions 11' (FIG. 2B), modified regions 11" (FIG. 2C) and modified regions 11', 11" (FIG. 2D), from above (FIG. 2A) and from the side (FIG. 2B, FIG. 2C and FIG. 2D). FIG. 3 schematically shows a two-step method for programming the complementary resistance switches for use in integrated, nonvolatile logic components on the basis of the example of the Boolean function XNOR. In this case, p and q can be the two quantities of a Boolean function of two quantities.

FIG. 1A shows the construction of a complementary resistance switch for integration into nonvolatile logic components 3, in accordance with various embodiments. The complementary resistance switch 3 consists of two bipolar resistance switches a, b connected in antiseries relative to one another with a common surface contact O (as illustrated in FIG. 1A) or with a common rear side contact S (as illustrated in FIG. 1B) on a carrier material (or substrate) 17. Illustratively, two (e.g. bipolar) resistance switches can be combined to form a complementary resistance switch. In this case, the two directional components a, b can be interconnected in series (in antiseries, referred to as back-to-back).

The bipolar (the directional) resistance switch a, b can in each case comprise a piezo- or ferroelectric layer a, b, wherein the first piezo- or ferroelectric layer a can comprise a piezo- or ferroelectric material $11a$ and the second piezo- or ferroelectric layer b can comprise a piezo- or ferroelectric material $11b$. Furthermore, the two piezo- or ferroelectric layers a, b can adjoin one another, with physical contact O (in FIG. 1A) and S (in FIG. 1B). The physical contact can also be a contact region O or S. Illustratively, the physical contact O or S between the two piezo- or ferroelectric layers a, b can comprise doped piezo- or ferroelectric material. Each of the two ferroelectric layers a, b (as directional resistance elements) can have a front side and a rear side, which can define the designations front side contact and rear side contact.

In accordance with various embodiments, the bipolar resistance switches can in each case comprise a piezo- or ferroelectric thin-film layer with a rear side contact O and an opposite front side contact $S_a$ and $S_b$ (in FIG. 1A) or with a front side contact S and an opposite rear side contact $O_a$ and $O_b$ (in FIG. 1B). At each resistance switch, one of the two contacts is embodied as a rectifying contact and one of the two contacts is embodied as a non-rectifying contact. Hereinafter, the rectifying contact (e.g. the Schottky contact) is designated by S and the non-rectifying contact (e.g. the ohmic contact) is designated by 0, for the sake of simplicity. All the reference signs in the piezo- or ferroelectric thin-film layer $11_b$, $11_b'$, $11_b''$ on the carrier material 17 (the second piezo- or ferroelectric thin-film layer) bear the additional index b and all the reference signs in the overlying piezo- or ferroelectric thin-film layer $11_a$, $11_a'$, $11_a''$ (the first piezo- or ferroelectric thin-film layer) bear the additional index a.

The regions 11, 11' and 11" (in each case for a and b) in the piezo- or ferroelectric material have a different extent d, d' and d" and different electrical conductivities on account of the modification during layer growth or on account of a modification by means of ion beams, plasma beams, laser beams, thermal beams and/or electron beams 2. Illustratively, the materials in the two piezo- or ferroelectric layers a, b are different, e.g. already on account of the layer growth of the layers a, b during layer production or for example after a subsequent modification of the layers a, b or a simultaneous modification during layer production. By way of example, the first layer can have a first doping, which can be different than a second doping of the second layer. In accordance with various embodiments, the regions 11, 11' and 11" (in each case for a and b) can in each case merely illustrate the fact that the layers a, b can have different physical or chemical properties (e.g. doping, doping profile, structural phase, spatial distribution of the structural phases, etc.).

It may be recommendable to modify the piezo- or ferroelectric layer a, b (e.g. the first and/or the second piezo- or ferroelectric layer) preferably over a large area by means of laser and/or ion beams and to modify the regions 11' (e.g. the first regions 11'a or 11'b of the piezo- or ferroelectric layer a, b) preferably locally by means of ion and/or electron beams. Furthermore, the piezo- or ferroelectric layer a, b (e.g. the first and/or the second piezo- or ferroelectric layer) can be modified preferably locally by means of ion and/or electron beams in the further regions 11" (e.g. in the second regions 11"a or 11"b). In this case, the modification can cause a change in the electrical conductivity of the modified material. Furthermore, by means of a doping, it is also possible to alter for example the structure of the ferroelectric or piezoelectric material, e.g. the crystal structure or the structural phase for a material having more than one possible crystal structure.

In order to achieve an expedient extent of the electric fields 6 in the regions 11, 11', 11", it may be recommendable that the piezo- or ferroelectric material of the layer a, b has a residual electrical conductivity and the concentration of the free charge carriers is in the range of approximately $10^{14}$ to approximately $10^{19}$ cm$^{-3}$, preferably in the range of $10^{15}$ to $10^{18}$ cm$^{-3}$, and/or that the residual electrical conductivity of the modified regions 11' and 11" is changed in comparison with the residual electrical conductivity of the layer (e.g. in the region 11) and the concentration of the free charge carriers of the modified regions 11' and 11" should vary between approximately $10^{12}$ and approximately $10^{23}$ cm$^{-3}$.

For a layer 11 composed of BiFeO$_3$ it may be particularly expedient for the concentration of the free charge carriers before the modification to be in a range of $10^{15}$ to $10^{18}$ cm$^{-3}$ and for the modification to be carried out by means of laser irradiation and ion irradiation. The complementary resistance switch can be used in an integrated logic component 3. Preferably, the electrical conductivity in the regions 11"

and 11' is the lowest near the front side contact S and/or near the rear side contact O, such that an externally applied voltage U is dropped principally in the regions 11" and 11' and causes a structural phase transition when a critical electrical field strength or the threshold voltage $U_{crit}$ is exceeded. The structure boundary 16 separates the regions of high conductivity in a piezo- or ferroelectric phase that is stable without strain from the regions of low conductivity in a piezo- or ferroelectric phase that is stable under strain. The differences in the electronic band structure and in the spontaneous polarization charge of both phases at the structure boundary 16 cause a stepped change in the conduction band and the valence band of the piezo- or ferroelectric material. The stepped change in the conduction band and the valence band causes the localization of spontaneous polarization charge at the structure boundary 16. When the voltage U is switched off, the localized polarization charge, on account of the stepped change in the conduction band and the valence band, cannot drift away or diffuse away from the structure boundary 16. An externally applied voltage U displaces the polarization charge localized at the structure boundary 16 and thus the structure boundary itself.

The resistance of the bipolar resistance memory is dependent on the respective position of the structure boundary 16 and is high if the structure boundary is displaced far into the piezo- or ferroelectric material. In this case, the bipolar resistance memory is in the HRS ("high resistance state"). If the structure boundary is near one of the two opposite contacts, the bipolar resistance memory is in the LRS ("low resistance state").

In accordance with various embodiments, it may be sufficient for the resistances (or the at least two resistance states, e.g. HRS and LRS) of the two layers in each case to differ from one another, or to be distinguishable from one another during read-out of the resistances by means of positive and negative voltages.

FIG. 1C shows the read current I on the logarithmic scale when the read voltage $U_{read}$ is applied to the front side contact $S_a$ as a function of the write voltage $U_{read}$ previously applied to the front side contact $S_a$ of the nonvolatile logic component 3 illustrated in FIG. 1A. The front side contact $S_b$ can for example be grounded or be at a defined electrical potential.

In a bipolar resistance memory, the write voltage $U_{write}$ must be greater than the threshold voltage $U_{crit}$ and can assume values of between $U_{min}$ and $U_{max}$. If the write voltage is less than $U_{min}$, then the resistance value of a bipolar resistance memory is not changed when this small write voltage $U_{write}$ is applied. If the write voltage $U_{write}$ is greater than $U_{max}$, then during writing an excessively high write current $I_{write}$ flows through the piezo- or ferroelectric material and the piezo- or ferroelectric material is destroyed at least between the two contacts at which an excessively high voltage U was applied. For every write voltage $U_{write}$ between $U_{min}$ and $U_{max}$, a low (small) resistance LRSi is set in the bipolar resistance memory. When $U_{min}$ is applied, the low resistance is $R_{LRS1}$, and when $U_{max}$ is applied, the low resistance is $R_{LRSn}$.

In accordance with various embodiments, the definition of the low resistance $R_{LRSi}$ and of the high resistance $R_{HRSi}$ with i from 1 to n as a counting index can in each case result from the relation between the two resistances. Illustratively, at least one region of the ferroelectric layers can be in one of a plurality of resistance states, wherein in each case one of the resistance states can have a relatively low electrical resistance (LRS) and another resistance state can have a relatively high electrical resistance (HRS).

If a positive write voltage $U_{write}$ is applied to the complementary resistance switch (cf. FIG. 1A) (e.g. a more positive voltage is applied to the contact $S_a$ than to the contact Sb), the state HRSn is written to the bipolar resistance switch b and the state LRSa is written in the overlying bipolar resistance switch a. These two states can be combined as a state pair {LRSa, HRSb} (cf. FIG. 1C). If a negative write voltage $U_{write}$ is applied to the complementary resistance switch (cf. FIG. 1A) (e.g. a more positive voltage is applied to the contact Sb than to the contact Sa), the state $L_{RSb}$ is written to the bipolar resistance switch b and the state HRSa is written in the overlying bipolar resistance switch a. These two states can be combined as a state pair {HRSa, LRSb} (cf. FIG. 1C).

The sign of the read pulse $U_{read}$ defines which state of the written state pair {LRSa, HRSb} or of the written state pair {HRSa, LRSb} is read. All states of the complementary resistance switch 3 can be read in the "level read" scheme. The advantage is that, in contrast to the "spike read" scheme, in the "level read" scheme the read voltage is much lower than the write voltage. As a result, during reading, the state pairs are not changed and the rewriting of state pairs is obviated. If a positive (negative) read voltage $U_{read^+}$ ($U_{read^-}$) is applied to a complementary resistance switch 3 in the state {LRSa, HRSb}, the read current is $I_{LRSa}$ ($I_{HRSb}$). If a positive (negative) read voltage $U_{read^+}$ ($U_{read^-}$) is applied to a complementary resistance switch 3 in the state {HRSa, LRSb}, the read current is $I_{HRSa}$ ($I_{LRSb}$). FIG. 1D schematically shows the writing of the state pairs {LRSa, HRSb} with a positive write pulse $U_{write^+}$ and the writing of the state pair {HRSa, LRSb} with a negative write pulse $U_{write^-}$ in the unmodified material, in the modified material (11') and in the multiply modified material (11").

If a positive (negative) read voltage $U_{read^+}$ ($U_{read^-}$) is applied to a complementary resistance switch 3 in the state (LRSa, HRSb), the read current is $I_{LRSa}$ ($I_{HRSb}$). If a positive (negative) read voltage $U_{read^+}$ ($U_{read^-}$) is applied to a complementary resistance switch 3 in the state {HRSa, LRSb}, the read current is $I_{HRSa}$ ($I_{LRSb}$) (cf. FIG. 1D). If a positive (negative) read voltage $U_{read^+}$ ($U_{read^-}$) is applied to a complementary resistance switch 3 in the state {LRSa', HRSb'}, the read current is $I_{LRSa}'$ ($I_{HRSb}'$). If a positive (negative) read voltage $U_{read^+}$ ($U_{read^-}$) is applied to a complementary resistance switch 3 in the state {HRSa', LRSb'}, the read current is $I_{HRSa}'$ ($I_{LRSb}'$) (cf. FIG. 1D).

If a positive (negative) read voltage $U_{read^+}$ ($U_{read^-}$) is applied to a complementary resistance switch 3 in the state {LRSa", HRSb"}, the read current is $I_{LRSa}"$ ($I_{LRSb}"$). If a positive (negative) read voltage $U_{read^+}$ ($U_{read^-}$) is applied to a complementary resistance switch in the state {HRSa", LRSb"}, the read current is $I_{HRSa}"$ ($I_{LRSb}"$) (cf. FIG. 1D).

FIG. 1E schematically shows the writing of the state pairs { LRSai, HRSb} with a positive write pulse and the writing of the state pairs { HRSa, LRSbi} with a negative write pulse. The write pulse is greater than $U_{min}$ and less than $U_{max}$. When $U_{min}$ is applied, the low resistance is $R_{LRS1}$, and when $U_{max}$ is applied, the low resistance is $R_{LRSa}$.

If a positive (negative) read voltage $U_{read^+}$ ($U_{read^-}$) is applied to a complementary resistance switch 3 in the state {LRSa1, HRSb}, the read current is $I_{LRSa1}$ ($I_{HRSb}$). If a positive (negative) read voltage $U_{read^+}$ ($U_{read^-}$) is applied to a complementary resistance switch 3 in the state {HRSa, LRSb1}, the read current is $I_{HRSa}$ ($I_{LRSb1}$).

If a positive (negative) read voltage $U_{read^+}$ ($U_{read^-}$) is applied to a complementary resistance switch 3 in the state {LRSa2, HRSb}, the read current is $I_{LRSa2}$ ($I_{HRSb}$). If a positive (negative) read voltage $U_{read^+}$ ($U_{read^-}$) is applied to a complementary resistance switch 3 in the state { HRSa, LRSb2}, the read current is $I_{HRSa}$ ($I_{LRSb2}$) (cf. FIG. 1E).

If a positive (negative) read voltage $U_{read^+}$ ($U_{read^-}$) is applied to a complementary resistance switch 3 in the state {LRSa3, HRSb}, the read current is $I_{LRSa3}$ ($I_{HRSb}$). If a positive (negative) read voltage $U_{read^+}$ ($U_{read^-}$) is applied to a complementary resistance switch 3 in the state { HRSa, LRSb3}, the read current is $I_{HRSa}$ ($I_{LRSb3}$) (cf. FIG. 1E).

FIG. 2A shows the construction of an array comprising complementary resistance switches (as illustrated in FIG. 1A) containing modified regions 11' (FIG. 2B), 11" (FIG. 2C) and 11', 11" (FIG. 2D), in plan view (FIG. 2A) and in side view (FIGS. 2B to 2D). The complementary resistance switch 3 is structured such that between two contacts $S_a(m)$ and $S_b(n)$, with a voltage U(m,n) applied to the two contacts, an electric field $6_a$ forms between the contact $S_a(m)$ and the contact O and an electric field $6_b$ forms between the contact O and the contact $S_b(n)$ and a current can flow.

On account of the metallizations $S_a(m)$ and $S_b(n)$ running transversely with respect to one another, wherein m and n can be the counting indices of the two-dimensional array, each of the plurality of resistance switches can be driven individually or a plurality or all of the resistance switches can be switched jointly.

In the case of a predefined read voltage $U_{read}$, the read current $I_{read}$ at the crossover point of two contacts (than in the array at m, n) is dependent on the modification of the bipolar resistance switches a and b of the complementary resistance switch 3 in the region of the crossover points of the two contacts. The read current increases with increasing local modification and $|I_{LRS}"|>|I_{LRS}'|>|I_{LRS}|$ and $|I_{HRS}"|>|I_{HRS}'|>|I_{HRS}|$ hold true. The threshold voltage $U_{crit}$ of the individual locally modified regions 11' (FIG. 2B) or 11" (FIG. 2C) or of both regions 11' and 11" (FIG. 2D) can be set by means of modification. The array (FIG. 2A) can be used as hardware for programmable logic (cf. FIG. 3), wherein each crossover point of the array with complementary resistance switches can be used for programming an individual Boolean function. The contact $S_a(m)$ constitutes the terminal T1 and the contact $S_b(n)$ constitutes the terminal T2 for the two input parameters p and q in the second cycle for programming the Boolean function. The read current $I_{read}(m,n)$ after a write voltage $U_{write}(m,n)$ has been applied is used as output parameter of the programmed Boolean function. The parallel and/or serial implementation of Boolean functions is achieved by corresponding logic combination of respectively adjacent crossover points. Temporally variable input parameters can be used as temporally variable write voltage $U_{write}$ in the range of between $U_{min}$ and $U_{max}$ for the temporally variable programming of the output parameters.

FIG. 3 schematically shows a two-step method (1st cycle step C.HV1 and 2nd cycle step C.HV2) for programming the complementary resistance switch 3 (cf. FIG. 1A) for use in integrated, nonvolatile logic components on the basis of the example of the Boolean function XNOR. The contact $S_a$ constitutes the terminal T1 and the contact $S_b$ constitutes the terminal T2. In the first step of the two-step method (C.HV1), the voltage 1 is applied to the terminal T1 and the voltage is applied to the terminal T2 (wherein the voltage value in each case provides the two states for the logic). That corresponds to a positive write voltage $U_{write^+}$, such that the complementary resistance switch 3 is in the state {LRSa, HRSb}.

As seen illustratively, the complementary resistance switch, in the first step of the two-step method, is switched into an output state independently of the combination of the input parameters (p,q) that is to be processed.

In the second step of the two-step method (C.HV2), the voltage 0 is applied to the terminal T1 and the voltage q' is applied to the terminal T2 (e.g. the voltage which represents the value 0 or 1 of the input parameter q). For q equals 0, that corresponds to no voltage drop between T1 and T2 and the complementary resistance switch 3 remains in the state {LRSa, HRSb}. If a positive (negative) read voltage $U_{read^+}$ ($U_{read^-}$) is applied to a complementary resistance switch 3 in the state {LRSa, HRSb}, the read current is $I_{LRSa}$ ($I_{HRSb}$). If q equals 1 in the second step of the two-step method (C.HV2), the voltage 1 is applied to the terminal $T_2$. That corresponds to a negative write voltage $U_{write^-}$, such that after the second step of the two-step method (C.HV2) the complementary resistance switch 3 is in the state {HRSa, LRSb}. If a positive (negative) read voltage $U_{read^+}$ ($U_{read^-}$) is applied to a complementary resistance switch 3 in the state {HRSa, LRSb}, the read current is $I_{HRSa}$ ($I_{LRSb}$). The sign of the read voltage is defined by means of the input parameter p. If p equals 0, then a positive read voltage is applied between the terminals T1 and T2. If p equals 1, then a negative read voltage is applied between the terminals T1 and T2.

It goes without saying that the voltage and states can also be used in an inverted fashion, or that more than two states with different resistance values and write voltages can be processed.

The following tables Tab. 1 to Tab. 16 show the realization of the logic operations, wherein the values are illustrated firstly in the case of positive initialization and secondly in the case of negative initialization of the complementary resistance switch.

TABLE 1

| | | | | C.LV | | | | C.LV |
|---|---|---|---|---|---|---|---|---|
| | | C.HV1 | C.HV2 | T1 | | C.HV1 | C.HV2 | T1 |
| p XNOR q | | T1 T2 | T1 T2 | not T2 | | T1 T2 | T1 T2 | not T2 |
| p | q | s | 1 0 | 0 q | p | p | 0 1 | 1 q | p | p |
| 0 | 0 | 1 | (□,□) | (□,□) | □ | (■,■) | (□,□) | □ |
| 1 | 0 | 0 | (□,□) | (□,□) | □ | (■,■) | (□,□) | □ |
| 0 | 1 | 0 | (□,□) | (■,■) | ■ | (■,■) | (■,■) | ■ |
| 1 | 1 | 1 | (□,□) | (■,■) | ■ | (■,■) | (■,■) | ■ |

TABLE 2

| | | | | C.LV | | | | C.LV |
|---|---|---|---|---|---|---|---|---|
| | | C.HV1 | C.HV2 | T2 | C.HV1 | C.HV2 | T2 |
| p XOR q | | T1 T2 | T1 T2 | T1 not | T1 T2 | T1 T2 | T1 not |
| p | q | s | 1 0 | 0 q | p | p | 0 1 | 1 q | p | p |
| 0 | 0 | 0 | (□,□) | (□,□) | □ | (■,■) | (□,□) | □ |
| 1 | 0 | 1 | (□,□) | (□,□) | □ | (■,■) | (□,□) | □ |
| 0 | 1 | 1 | (□,□) | (■,■) | ■ | (■,■) | (■,■) | ■ |
| 1 | 1 | 0 | (□,□) | (■,■) | ■ | (■,■) | (■,■) | ■ |

TABLE 3

| TRUE | C.HV1 | | C.HV2 | | C.LV T1 not T2 | | C.HV1 | | C.HV2 | | C.LV T1 not T2 | |
|---|---|---|---|---|---|---|---|---|---|---|---|---|
| | T1 | T2 | T1 | T2 | | | T1 | T2 | T1 | T2 | | |
| p q s | 1 | 0 | 0 | p | p | p | 0 | 1 | 1 | p | p | p |
| 0 0 1 | (☐,☐) | (☐,☐) | ☐ | (▓,▓) | (☐,☐) | ☐ | | | | | | |
| 1 0 1 | (☐,☐) | (▓,▓) | ▓ | (▓,▓) | (▓,▓) | ▓ | | | | | | |
| 0 1 1 | (☐,☐) | (☐,☐) | ☐ | (▓,▓) | (☐,☐) | ☐ | | | | | | |
| 1 1 1 | (☐,☐) | (▓,▓) | ▓ | (▓,▓) | (▓,▓) | ▓ | | | | | | |

TABLE 4

| FALSE | C.HV1 | | C.HV2 | | C.LV T2 | | C.HV1 | | C.HV2 | | C.LV T2 | |
|---|---|---|---|---|---|---|---|---|---|---|---|---|
| | T1 | T2 | T1 | T2 | T1 | not | T1 | T2 | T1 | T2 | T1 | not |
| p q s | 1 | 0 | 0 | p | p | p | 0 | 1 | 1 | p | p | p |
| 0 0 0 | (☐,☐) | (☐,☐) | ☐ | (▓,▓) | (☐,☐) | ☐ | | | | | | |
| 1 0 0 | (☐,☐) | (☐,☐) | ☐ | (▓,▓) | (▓,▓) | ▓ | | | | | | |
| 0 1 0 | (☐,☐) | (☐,☐) | ☐ | (▓,▓) | (☐,☐) | ☐ | | | | | | |
| 1 1 0 | (☐,☐) | (▓,▓) | ▓ | (▓,▓) | (▓,▓) | ▓ | | | | | | |

TABLE 5

| p IMP q | C.HV1 | | C.HV2 | | C.LV | | C.HV1 | | C.HV2 | | C.LV | |
|---|---|---|---|---|---|---|---|---|---|---|---|---|
| | T1 | T2 | T1 | T2 | T1 | T2 | T1 | T2 | T1 | T2 | T1 | T2 |
| p q s | 1 | 0 | q | p | 1 | 0 | 0 | 1 | p | q | 0 | 1 |
| 0 0 1 | (☐,☐) | (☐,☐) | ☐ | (▓,▓) | (▓,▓) | ▓ | | | | | | |
| 1 0 0 | (☐,☐) | (▓,▓) | ▓ | (▓,▓) | (☐,☐) | ☐ | | | | | | |
| 0 1 1 | (☐,☐) | (☐,☐) | ☐ | (▓,▓) | (▓,▓) | ▓ | | | | | | |
| 1 1 1 | (☐,☐) | (☐,☐) | ☐ | (▓,▓) | (▓,▓) | ▓ | | | | | | |

TABLE 6

| p NIMP q | C.HV1 | | C.HV2 | | C.LV | | C.HV1 | | C.HV2 | | C.LV | |
|---|---|---|---|---|---|---|---|---|---|---|---|---|
| | T1 | T2 | T1 | T2 | T1 | T2 | T1 | T2 | T1 | T2 | T1 | T2 |
| p q s | 1 | 0 | q | p | 0 | 1 | 0 | 1 | p | q | 1 | 0 |
| 0 0 0 | (☐,☐) | (☐,☐) | ☐ | (▓,▓) | (▓,▓) | ▓ | | | | | | |
| 1 0 1 | (☐,☐) | (▓,▓) | ▓ | (▓,▓) | (▓,▓) | ☐ | | | | | | |
| 0 1 0 | (☐,☐) | (☐,☐) | ☐ | (▓,▓) | (▓,▓) | ▓ | | | | | | |
| 1 1 0 | (☐,☐) | (☐,☐) | ☐ | (▓,▓) | (▓,▓) | ▓ | | | | | | |

TABLE 7

| p AND q | C.HV1 | | C.HV2 | | C.LV T2 | | C.HV1 | | C.HV2 | | C.LV T1 not T2 | |
|---|---|---|---|---|---|---|---|---|---|---|---|---|
| | T1 | T2 | T1 | T2 | T1 | not | T1 | T2 | T1 | T2 | | |
| p q s | 1 | 0 | q | p | p | p | 0 | 1 | p | q | p | p |
| 0 0 0 | (☐,☐) | (☐,☐) | ☐ | (▓,▓) | (▓,▓) | ▓ | | | | | | |
| 1 0 0 | (☐,☐) | (▓,▓) | ▓ | (▓,▓) | (☐,☐) | ☐ | | | | | | |
| 0 1 0 | (☐,☐) | (☐,☐) | ☐ | (▓,▓) | (▓,▓) | ▓ | | | | | | |
| 1 1 1 | (☐,☐) | (▓,▓) | ▓ | (▓,▓) | (▓,▓) | ▓ | | | | | | |

TABLE 8

| p NAND q | C.HV1 | | C.HV2 | | C.LV T1 not T2 | | C.HV1 | | C.HV2 | | C.LV T2 | |
|---|---|---|---|---|---|---|---|---|---|---|---|---|
| | T1 | T2 | T1 | T2 | | | T1 | T2 | T1 | T2 | T1 | not |
| p q s | 1 | 0 | q | p | p | p | 0 | 1 | p | q | p | p |
| 0 0 1 | (☐,☐) | (☐,☐) | ☐ | (▓,▓) | (▓,▓) | ▓ | | | | | | |
| 1 0 1 | (☐,☐) | (▓,▓) | ▓ | (▓,▓) | (☐,☐) | ☐ | | | | | | |
| 0 1 1 | (☐,☐) | (☐,☐) | ☐ | (▓,▓) | (▓,▓) | ▓ | | | | | | |
| 1 1 0 | (☐,☐) | (☐,☐) | ☐ | (▓,▓) | (▓,▓) | ▓ | | | | | | |

TABLE 9

| p OR q | C.HV1 | | C.HV2 | | C.LV T2 | | C.HV1 | | C.HV2 | | C.LV T1 not T2 | |
|---|---|---|---|---|---|---|---|---|---|---|---|---|
| | T1 | T2 | T1 | T2 | T1 | not | T1 | T2 | T1 | T2 | | |
| p q s | 1 | 0 | p | q | p | p | 0 | 1 | q | p | p | p |
| 0 0 0 | (☐,☐) | (☐,☐) | ☐ | (▓,▓) | (▓,▓) | ▓ | | | | | | |
| 1 0 1 | (☐,☐) | (☐,☐) | ☐ | (▓,▓) | (▓,▓) | ▓ | | | | | | |
| 0 1 1 | (☐,☐) | (▓,▓) | ▓ | (▓,▓) | (☐,☐) | ☐ | | | | | | |
| 1 1 1 | (☐,☐) | (☐,☐) | ☐ | (▓,▓) | (▓,▓) | ▓ | | | | | | |

TABLE 10

| p NOR q | C.HV1 | | C.HV2 | | C.LV T2 | | C.HV1 | | C.HV2 | | C.LV T2 | |
|---|---|---|---|---|---|---|---|---|---|---|---|---|
| | T1 | T2 | T1 | T2 | T1 | not | T1 | T2 | T1 | T2 | T1 | not |
| p q s | 1 | 0 | p | q | p | p | 0 | 1 | q | p | p | p |
| 0 0 1 | (☐,☐) | (☐,☐) | ☐ | (▓,▓) | (▓,▓) | ▓ | | | | | | |
| 1 0 0 | (☐,☐) | (☐,☐) | ☐ | (▓,▓) | (▓,▓) | ▓ | | | | | | |
| 0 1 0 | (☐,☐) | (▓,▓) | ▓ | (▓,▓) | (☐,☐) | ☐ | | | | | | |
| 1 1 0 | (☐,☐) | (☐,☐) | ☐ | (▓,▓) | (▓,▓) | ▓ | | | | | | |

TABLE 11

| p | C.HV1 | | C.HV2 | | C.LV | | C.HV1 | | C.HV2 | | C.LV | |
|---|---|---|---|---|---|---|---|---|---|---|---|---|
| | T1 | T2 | T1 | T2 | T1 | T2 | T1 | T2 | T1 | T2 | T1 | T2 |
| p q s | 1 | 0 | p | 1 | 1 | 0 | 0 | 1 | 1 | p | 0 | 1 |
| 0 0 0 | (☐,☐) | (▓,▓) | ▓ | (▓,▓) | (☐,☐) | ☐ | | | | | | |
| 1 0 1 | (☐,☐) | (☐,☐) | ☐ | (▓,▓) | (▓,▓) | ▓ | | | | | | |
| 0 1 0 | (☐,☐) | (▓,▓) | ▓ | (▓,▓) | (☐,☐) | ☐ | | | | | | |
| 1 1 1 | (☐,☐) | (☐,☐) | ☐ | (▓,▓) | (▓,▓) | ▓ | | | | | | |

TABLE 12

| NOT p | C.HV1 | | C.HV2 | | C.LV | | C.HV1 | | C.HV2 | | C.LV | |
|---|---|---|---|---|---|---|---|---|---|---|---|---|
| | T1 | T2 | T1 | T2 | T1 | T2 | T1 | T2 | T1 | T2 | T1 | T2 |
| p q s | 1 | 0 | p | 1 | 0 | 1 | 0 | 1 | 1 | p | 1 | 0 |
| 0 0 1 | (☐,☐) | (▓,▓) | ▓ | (▓,▓) | (☐,☐) | ☐ | | | | | | |
| 1 0 0 | (☐,☐) | (☐,☐) | ☐ | (▓,▓) | (▓,▓) | ▓ | | | | | | |

TABLE 12-continued

|  |  |  | C.HV1 | | C.HV2 | | C.LV | | C.HV1 | | C.HV2 | | C.LV | |
|---|---|---|---|---|---|---|---|---|---|---|---|---|---|---|
| NOT p | | | T1 | T2 | T1 | T2 | T1 | T2 | T1 | T2 | T1 | T2 | T1 | T2 |
| p | q | s | 1 | 0 | p | 1 | 0 | 1 | 0 | 1 | 1 | p | 1 | 0 |
| 0 | 1 | 1 | (□,□) | | (■,■) | | ■ | | (■,■) | | (□,□) | | □ | |
| 1 | 1 | 0 | (□,□) | | (□,□) | | □ | | (■,■) | | (■,■) | | ■ | |

TABLE 13

|  |  |  | C.HV1 | | C.HV2 | | C.LV | | C.HV1 | | C.HV2 | | C.LV | |
|---|---|---|---|---|---|---|---|---|---|---|---|---|---|---|
| q | | | T1 | T2 | T1 | T2 | T1 | T2 | T1 | T2 | T1 | T2 | T1 | T2 |
| p | q | s | 1 | 0 | q | 1 | 1 | 0 | 0 | 1 | 1 | q | 0 | 1 |
| 0 | 0 | 0 | (□,□) | | (■,■) | | ■ | | (■,■) | | (□,□) | | □ | |
| 1 | 0 | 0 | (□,□) | | (■,■) | | ■ | | (■,■) | | (□,□) | | □ | |
| 0 | 1 | 1 | (□,□) | | (□,□) | | □ | | (■,■) | | (■,■) | | ■ | |
| 1 | 1 | 1 | (□,□) | | (□,□) | | □ | | (■,■) | | (■,■) | | ■ | |

TABLE 14

|  |  |  | C.HV1 | | C.HV2 | | C.LV | | C.HV1 | | C.HV2 | | C.LV | |
|---|---|---|---|---|---|---|---|---|---|---|---|---|---|---|
| NOT q | | | T1 | T2 | T1 | T2 | T1 | T2 | T1 | T2 | T1 | T2 | T1 | T2 |
| p | q | s | 1 | 0 | q | 1 | 0 | 1 | 0 | 1 | 1 | q | 1 | 0 |
| 0 | 0 | 1 | (□,□) | | (■,■) | | ■ | | (■,■) | | (□,□) | | □ | |
| 1 | 0 | 1 | (□,□) | | (■,■) | | ■ | | (■,■) | | (□,□) | | □ | |
| 0 | 1 | 0 | (□,□) | | (□,□) | | □ | | (■,■) | | (■,■) | | ■ | |
| 1 | 1 | 0 | (□,□) | | (□,□) | | □ | | (■,■) | | (■,■) | | ■ | |

TABLE 15

|  |  |  | C.HV1 | | C.HV2 | | C.LV | | C.HV1 | | C.HV2 | | C.LV | |
|---|---|---|---|---|---|---|---|---|---|---|---|---|---|---|
| p RIMP q | | | T1 | T2 | T1 | T2 | T1 | T2 | T1 | T2 | T1 | T2 | T1 | T2 |
| p | q | s | 1 | 0 | p | q | 1 | 0 | 0 | 1 | q | p | 0 | 1 |
| 0 | 0 | 1 | (□,□) | | (□,□) | | □ | | (■,■) | | (■,■) | | ■ | |
| 1 | 0 | 1 | (□,□) | | (□,□) | | □ | | (■,■) | | (■,■) | | ■ | |
| 0 | 1 | 0 | (□,□) | | (■,■) | | ■ | | (■,■) | | (□,□) | | □ | |
| 1 | 1 | 1 | (□,□) | | (□,□) | | □ | | (■,■) | | (■,■) | | ■ | |

TABLE 16

|  |  |  | C.HV1 | | C.HV2 | | C.LV | | C.HV1 | | C.HV2 | | C.LV | |
|---|---|---|---|---|---|---|---|---|---|---|---|---|---|---|
| p RNIMP q | | | T1 | T2 | T1 | T2 | T1 | T2 | T1 | T2 | T1 | T2 | T1 | T2 |
| p | q | s | 1 | 0 | p | q | 0 | 1 | 0 | 1 | q | p | 1 | 0 |
| 0 | 0 | 0 | (□,□) | | (□,□) | | □ | | (■,■) | | (■,■) | | ■ | |
| 1 | 0 | 0 | (□,□) | | (□,□) | | □ | | (■,■) | | (■,■) | | ■ | |
| 0 | 1 | 1 | (□,□) | | (■,■) | | ■ | | (■,■) | | (□,□) | | □ | |
| 1 | 1 | 0 | (□,□) | | (□,□) | | □ | | (■,■) | | (■,■) | | ■ | |

In accordance with various embodiments, it is possible to use a nonvolatile complementary resistance switch with "level read" read-out in a passive array. The complementary resistance switch 3 according to the invention can be arranged in parallel and/or serially in a passive grid structure (array) and can be used for the sequential implementation of one or a plurality of programmable logic functions. Each crossover point (m,n) of the array structure having m rows and n columns forms a separately programmable and separately readable logic gate. This arrangement constitutes an improvement relative to a field programmable digital array.

The required number n of columns of the array is at least of the same quantity as the number of logic functions to be implemented sequentially, and the required number m of rows of the array is at least of the same quantity as the logic functions maximally to be implemented simultaneously. At least each crossover point in the array can be driven via a high- and low-voltage source. The high-voltage sources at the crossover point (m,n) generate the initialization signal and the input signals p,q(m,n) at the logic gate (m,n) and the low-voltage sources generate the output signals s(m,n) of the logic gate (m,n). The input signals for logic functions in the column n' which are implemented at the instant t'(n') can be arbitrary output signals of logical functions which were implemented at the instant t(n) where n<n'. The logic combination of the logic gates is realized by means of a passive amplifier circuit which drives the corresponding high-voltage sources m,n. All the output signals s(m,n) of crossover points m,n where n<n' which define the input signal p,q(m',n') at the crossover point (m',n') where n'>n are combined at the crossover point (m',n') to form the input signal p,q(m',n'). It is advantageous to add the input signals $p_i$(m,n) and the input signals $q_i$(m,n). If it holds true, for example, that $p_i$={0,1,1,0} and $p_i$={1,1,0,1}, then p(m,n)=0 is applied to T1(m,n) and q(m,n)=1 is applied to T2(m,n). If it holds true, for example, that $p_i$={1,1,1} and $p_i$={1,0,0}, then p(m,n)=1 is applied to T1(m,n) and q(m,n)=0 is applied to T2(m,n).

The array is programmed at the start by initialization in the cycle step C.HV1. All the crossover points (m,n) are initialized either with a positive or with a negative write voltage of the high-voltage source. Subsequently, in an array arbitrary Boolean basic function can be logically combined with one another in parallel or serially. The corresponding write voltage for the nonvolatile programming of a Boolean basic function is applied to the crossover point (m,n) by the high-voltage source in the second cycle step C.HV2 directly before the first read-out of the respective crossover point (m,n). The individual partial operations are performed sequentially successively at the instant t(n) in the case of series connection, wherein the output state s(m,n) where n<n' of one of the logic functions at crossover points (m,n) where n<n' can be used as input parameter for the crossover point (m,n'). For this purpose, it is necessary to amplify the output state of the preceding partial operation to be used. The individual partial operations within a parallel circuit can be written simultaneously. The Boolean functions presented in the tables Tab. 1 to Tab. 16 can be programmed with this structure in the two-step method (C.VH1, C.VH2) and then read out (C.VL).

It is advantageous that in the first step of the cycle for programming the Boolean functions, the state in all the logic gates of the passive array structure can be set either with a positive or with a negative write pulse. Consequently, only the second step of the cycle for programming the Boolean functions at each crossover point (m,n) of the passive array structure that is used for implementing the logic function is different. The sign of the read voltage, which is low and does not alter the state of the output parameter s of the corresponding logic gates, is defined by one of the two input parameters p or q of the Boolean functions or by a constant input parameter 0 or 1. The sequential and parallel logic combination and successive performance of a plurality of Boolean operations is achieved by means of the sequential programming of crossover points in different columns n and by means of the simultaneous programming of all the crossover points (m,n) in the row m in the same column n'. The amplifier circuits between the low-voltage output signals s(m,n) and the high-voltage input signals p,q(m,n') are preferably hardwired. The advantages when using complementary resistance switches in a passive array are low development costs, short implementation times, high logic density and low power demand. The functionality of complementary resistance switches is available directly after switch-on. The information about the accommodated configuration of the passive array is stored by means of the high-voltage input signals p,q(m,n) and the low-voltage output signals s(m,n) in the crossover points. There is no need for a memory which is situated externally and which can be read illegitimately. It is also advantageous to include the current column number n as a counting variable and to store it sequentially in a nonvolatile fashion, such that during run-up the logic function can be continued without loss of data at the column n.

In accordance with various embodiments, the complementary resistance switch can be used in nonvolatile freely programmable analog circuits in an array.

The complementary resistance switch described herein can be arranged in parallel and/or serially in a passive array structure and can be used for sequentially implementing one or a plurality of programmable analog blocks. Each crossover point (m,n) of the array structure having m rows and n columns forms a separately programmable and separately readable block at the crossover point (m,n). Each block at the crossover point (m,n) is simultaneously a logic gate at the crossover point (m,n). This arrangement constitutes an improvement relative to a field programmable analog array. All the crossover points (m,n) are initialized either with a positive or with a negative write voltage of the high-voltage source. In the complementary resistance switch according to the invention, the LRSi is written in an analog fashion and the HRS is written digitally. In this regard, the state pair {LRSai, HRSb} is written when a positive write pulse is applied, and the state pair {HRSa, LRSbi} is written when a negative write pulse is applied. The write pulse at the crossover point (m,n) is greater than $U_{min}$ and less than $U_{max}$ and does not influence the logic function at the crossover point (m,n), $U_{min}$ must be greater than the voltage of the read pulse and depends for example on the geometry and the production of the complementary resistance switch 3. The read pulse for reading out the state LRSai of the analog block at the crossover point (m,n) is independent of the read pulse for reading the output parameter of the logic function at the crossover point (m,n). Analog high-voltage inputs and analog low-voltage outputs produce the connection to the outside world. The configuration of the analog block and of the logic function at the crossover point (m,n) takes place in the write cycle C.HV2 via analog high-voltage inputs. The reading of the analog block takes place via an analog low-voltage output, wherein the read voltage has the same sign as the write voltage in the write cycle C.VH2. The reading of the logic function at the crossover point (m,n) takes place in the read cycle C.VL with the read voltage via a digital low-voltage output. The states of the analog blocks at the crossover points (m,n) define the input parameters p,q(m,n') for logic functions at crossover points (m,n') where n'>n. Furthermore, the states of the analog blocks at the crossover points (m,n) can weigh the analog high-voltage inputs at crossover points (m,n') where n'>n with the states from sequentially preceding analog low-voltage outputs at crossover points (m,n) and/or use them with a temporal offset in a defined manner.

In accordance with various embodiments, a resistance structure 3 is illustrated in FIG. 4A. The resistance structure can comprise a first electrically conductive contact T1 and a second electrically conductive contact T2. The two electrically conductive contacts T1, T2 can be metal contacts, e.g. comprising aluminum, platinum, titanium, copper, silver and/or gold, or some other metal or a metal alloy.

Analogously to the previous description, a first ferroelectric layer 11a can be arranged between the first electrical contact T1 and the second electrical contact T2, which are in physical contact with one another in a contact region 408. The two ferroelectric layers 11a, 11b can also be two different regions (two differently modified regions 11a, 11b) of a single ferroelectric layer.

In accordance with various embodiments, the first contact T1 together with the first ferroelectric layer 11a can form a Schottky contact and/or the second contact T2 together with the second ferroelectric layer 11b can form a Schottky contact. By way of example, a more positive voltage can be applied to the contact T1 than to the contact T2, i.e. a voltage of a first polarity, or conversely (with polarity reversal) a more positive voltage can be applied to the contact T2 than to the contact T1. In this case, for one polarity of the voltage, in the resistance structure 3 a Schottky contact can form in a region 406a between the first contact T1 and the first ferroelectric layer 11a and an ohmic contact can form in a region 406b between the second contact T2 and the second ferroelectric layer 11b. Furthermore, for an opposite polarity of the voltage, in the resistance structure 3 an ohmic contact can form in the region 406a between the first contact T1 and the first ferroelectric layer 11a and a Schottky contact can form in a region 406b between the second contact T2 and the second ferroelectric layer 11b.

This can make it possible, for example, that the resistance structure 3 can be used as described above (for the complementary resistance switch).

In this case, the first ferroelectric layer 11a and the second ferroelectric layer 11b can have mutually different dopings and/or spatial doping distributions. The first ferroelectric layer 11a can have at least one first layer region 11'a, 11"a, wherein the properties (basic doping, in each case the spatial distribution and/or the absolute value, (e.g. with oxygen vacancies), additional doping, in each case the spatial distribution and/or the absolute value, (e.g. with metal atoms), or structural properties relative to the respective crystal structure or phase of the ferroelectric material of the ferroelectric layer) of the at least one first layer region 11'a, 11"a can differ from those of the first ferroelectric layer 11a, wherein the second ferroelectric layer 11b can have at least one second layer region 11'b, 11"b, wherein the properties of the second layer region 11'a, 11"a differ from those of the second ferroelectric layer 11a.

In accordance with various embodiments, the second ferroelectric layer 11b can be doped with at least one metal, for example by means of partial substitution of $Fe^{3+}$ ions by suitable AII/BIV dopings (e.g. divalent or tetravalent metal atoms in the case of an iron-based ferroelectric material).

In accordance with various embodiments, the first ferroelectric layer 11a can be thicker than the second ferroelectric layer 11b; by way of example, the first ferroelectric layer 11a can be more than twice as thick as the second ferroelectric layer 11b. By way of example, it is thus possible to prevent two Schottky contacts from forming simultaneously in each case at the first contact T1 and at the second contact T2.

Furthermore, the first ferroelectric layer 11a can comprise bismuth ferrite (BiFeO$_3$) and the second ferroelectric layer 11b can comprise titanium-doped bismuth ferrite (Bi(Fe,Ti)O$_3$. In this case, the titanium can be incorporated into the crystal structure at the lattice sites of the iron atoms (ions), wherein this doping for example cannot be altered or shifted within the ferroelectric layers 11a, 11b by means of an electrical voltage in the range of the write voltage (e.g. in a range of approximately 2 V to approximately 20 V). In accordance with various embodiments, this metal doping (e.g. titanium doping) can thermally diffuse or be diffused, such that an electrically conductive contact region or boundary region 408 can be formed in the contact region 408.

In accordance with various embodiments, both ferroelectric layers 11a, 11b can be oxidic (e.g. comprising BiFeO$_3$) and have an oxygen defect n-type doping. In this case, the oxygen defects (or in other words the oxygen vacanies) can be mobile, e.g. on account of the material properties of the ferroelectric material (e.g. BiFeO$_3$), wherein this oxygen defect doping can be altered or shifted within the ferroelectric layers 11a, 11b for example by means of an electrical voltage in the range of the write voltage (e.g. in a range of approximately 2 V to approximately 20 V). The mobility of the mobile dopants can be influenced for example by means of non-mobile dopants. This can cause for example the switching process in the resistance structure.

Illustratively, it may furthermore be necessary for the first ferroelectric layer (11a) and the second ferroelectric layer (11b) to adjoin one another in an electrically conductive contact region. Here the contact region can comprise in each case the layer material of the first ferroelectric layer (11a) and/or of the second ferroelectric layer (11b) with a concentration of free charge carriers of more than $10^{19}$ cm$^{-3}$.

In accordance with various embodiments, the first ferroelectric layer (11a) can be a first piezoelectric layer and/or the second ferroelectric layer (11b) can be a second piezoelectric layer.

In accordance with various embodiments, the contacts T1, T2 can in each case comprise at least one metal and the ferroelectric layers 11a, 11b can have a (e.g. temporally and/or spatially) stable basic doping which can impart a semiconductor character to the ferroelectric layers, as a result of which, for example, the formation of a Schottky contact between the first contact T1 and the first ferroelectric layer 11a and/or between the second contact T2 and the second ferroelectric layer 11b can be caused. Furthermore, the ferroelectric layers 11a, 11b can have a for example temporally and/or spatially variable (mobile) doping which can be altered for example by means of the write voltage being applied (between the contacts T1, T2). Consequently, by means of shifting the mobile doping, it is possible to increase the electrical conductivity of the ferroelectric layers 11a, 11b at the contacts T1, T2 in such a way that an ohmic contact forms instead of a Schottky contact. This can be effected mutually alternately in each case, such that, for example, if the mobile doping is shifted in the direction of the first contact T1 (and also remains shifted thus in the absence of a write voltage), an ohmic contact is formed in the region 406a between the first contact T1 and the first ferroelectric layer 11a and a Schottky contact is formed in the region 406b between the second contact T2 and the second ferroelectric layer b, and conversely that if the mobile doping is shifted in the direction of the second contact T2 (and also remains shifted thus in the absence of a write voltage), a Schottky contact is formed in the region 406a between the first contact T1 and the first ferroelectric layer 11a and an ohmic contact is formed in the region 406b between the second contact T2 and the second ferroelectric layer b.

Figure 4B:
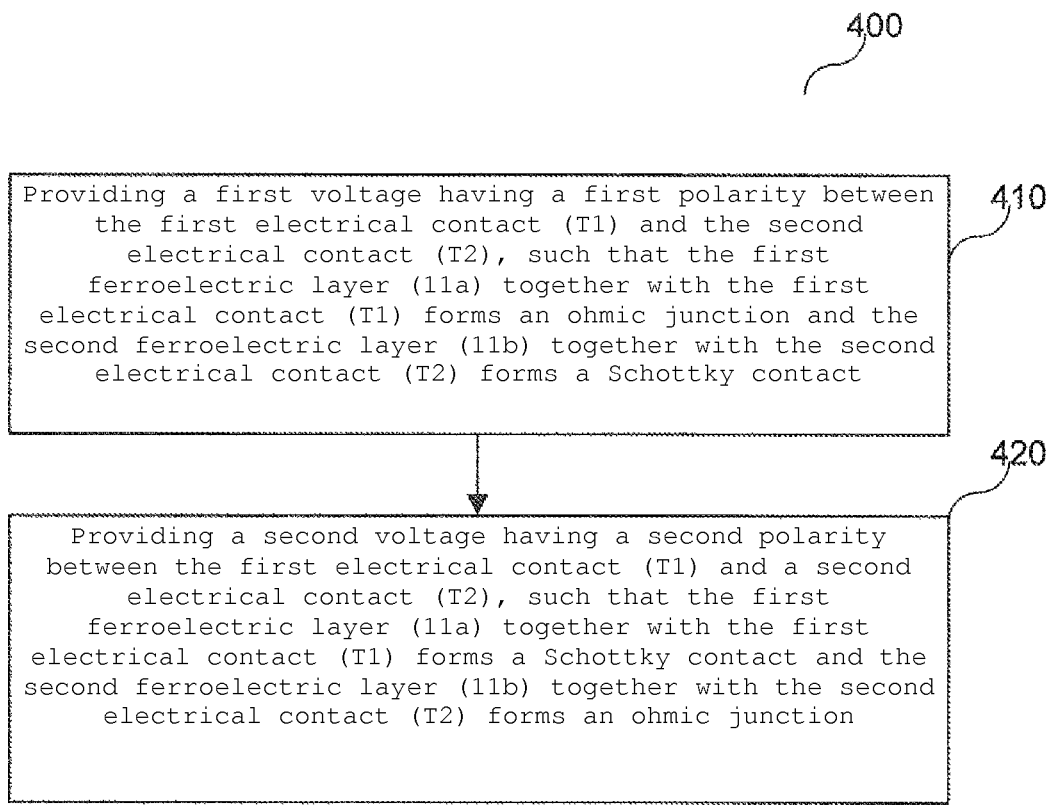
FIG. 4B shows a schematic flowchart for a method for operating a complementary resistance switch or a resistance structure, in accordance with various embodiments.

Consequently, as illustrated in a schematic flowchart in FIG. 4B, for example, a method 400 for operating a resistance structure 3 can comprise; in 410, providing a first voltage having a first polarity between the first electrical contact T1 and the second electrical contact T2, such that the first ferroelectric layer 11a together with the first electrical contact T1 forms an ohmic junction and the second ferroelectric layer 11b together with the second electrical contact T2 forms a Schottky contact; and/or, in 420, providing a second voltage having a second polarity between the first electrical contact T1 and a second electrical contact T2, such that the first ferroelectric layer 11a together with the first electrical contact T1 forms a Schottky contact and the second ferroelectric layer 11b together with the second electrical contact T2 forms an ohmic junction.

In accordance with various embodiments, a polycrystalline, piezo- or ferroelectric thin-film layer (a layer or a thin film) can be provided, wherein the polycrystalline piezo- or ferroelectric thin-film layer are provided with at least two outer (or electrically conductive) contacts. In this case, the polycrystalline, piezo- or ferroelectric thin-film layer can be arranged at least partially between the two electrically conductive contacts. A thin-film layer provided and contact-connected by means of two contacts in this way can be designated as a contact-connected thin-film layer or contact-connected thin film.

Semiconducting, polycrystalline oxidic thin-film layers differ significantly from conventional semiconductors, for example from silicon, germanium and gallium arsenide, with regard to their large band gap and their high temperature stability [R. van de Krol and H. L. Tuller, Electroceramics—the role of interfaces, Solid State Ionics 150 (2002) 167-179]. Non-contact-connected polycrystalline oxidic thin-film layers have interfaces between the grain boundaries of the individual crystallites. Contact-connected polycrystalline thin-film layers have interfaces between the metallically conductive contact materials and the crystallites adjoining the metallically conductive contact materials and between the grain boundaries of the individual crystallites.

The grain boundaries in polycrystalline thin-film layers are reproducibly settable with difficulty in terms of their properties and preferably trap imperfections and defects. The grain boundaries between the crystallites can lead to the degradation of the functionality of components composed of polycrystalline thin-film layers.

Although the semiconducting properties of conventional semiconductors and semiconducting oxidic thin-film layers are identical in many aspects, the defect chemistry can differ greatly. Even without the introduction of dopants, oxidic thin-film layers are often intrinsically n-conducting or intrinsically p-conducting. Oxygen vacancies $v_o$ can lead to an intrinsic n-type conduction and most semiconducting oxidic thin-film layers are intrinsically n-conducting, for example ZnO, TiO$_2$, BiFeO$_3$. A few oxidic thin-film layers are intrinsically p-conducting, for example LaNiO$_3$, La$_{1-x}$Sr$_x$MnO$_3$ and CuAlO$_2$. This intrinsic conductivity limits the production of p-n junctions in oxidic homo-thin-film layer compounds. The electron and hole mobility in oxidic thin-film layers is generally much lower than in conventional semiconductors and is between 0.1 and a few 100 cm$^2$/Vs. In silicon, the electron mobility is 1500 cm$^2$/Vs.

Rectifying and non-rectifying metal-semiconductor contacts can be realized by metallically conductive films being applied to oxidic thin-film layers. The barrier height of rectifying contacts (Schottky contacts) on oxidic thin-film layers (which are in physical contact with a metal or an electrically conductive material) correlates with the value of the work function of the metallically conductive material and indicates a low concentration or an absence of intrinsic surface states in the large band gap of oxidic thin-film layers.

During the production of polycrystalline thin-film layers, electrons and holes can be trapped at the grain boundaries and lead to the depletion of free electrons and holes in the adjoining crystallite material and thus to the formation of a space charge zone which electrically isolates the grain boundaries from the depleted regions of the crystallites in polycrystalline thin-film layers. The instances of band bending of the conduction and valence bands are parallel to one another and are all the greater, the greater the extent of the depleted regions in the crystallites.

This band bending is referred to as a double Schottky barrier. The band bending in an n-conducting oxidic thin-film layer with negatively charged grain boundaries points upward and the band bending in a p-conducting oxidic thin-film layer with positively charged grain boundaries points downward. In n-conducting ZnO, the values for the barrier height, the extent of the space charge zone, the interface density and the doping concentration are 1 eV, 50 to 100 nm, $10^{12}$ cm$^{-2}$ and $10^{18}$ cm$^{-3}$ [G. Blatter and F. Greuter, Carrier transport through grain boundaries in semiconductors, Phys. Rev. B 33 (1986) 3952-3966].

The conductivity of ZnO varistors can be increased for example by up to seven orders of magnitude if the oxygen coating at the grain boundaries is reduced from 1.2 monolayers to 0.9 monolayer [F. Greuter, G. Blatter, M. Rosseinelli, F. Stucki, Conduction mechanism in ZnO-varistors: an overview, in: L. M. Levinsoon (ed.), Ceramic Transactions, Advances in Varistor technology, vol. 3, Amercian Ceramic Society, Westerville, Ohio, 1998, pp. 31-35]. This increase in conductivity is based on a lowering of the height of the double Schottky barrier. In Schottky diodes or photodiodes on the basis of polycrystalline thin-film layers, grain boundaries having a small height of the double Schottky barrier lead to the degradation of the diode functionality. Such double Schottky barriers can be formed by segregation of inadequate defects from the crystallites into the grain boundaries of the polycrystalline thin-film layers.

In comparison with microcrystalline thin-film layers, for nanocrystalline thin-film layers having the same initial concentration of mobile defects, the effective density of the defects segregated to the outer surface of the crystallites, i.e. to the grain boundaries, is lower. Furthermore, the defect-specific segregation in nanocrystalline thin-film layers depends on the crystallite size, the total concentration of all the defects and the partial concentration of the defects of a species. In this regard, it has been found that calcium in CaO-stabilized $ZrO_2$ segregates very effectively together with silicon [Makoto Aoki, Yet-Ming Chiang, Igor Kosacki, Jong-Ren Lee, Harry Tuller and Yaping Liu, Solute Segregation and Grain-Boundary Impedance in High-Purity Stabilized Zirconia, J. Am. Ceram. Soc. 79 (1996) 1169-1180].

Grain boundaries are bad for the efficiency in thin-film solar cells composed of crystalline silicon since a high surface recombination velocity can be observed at the grain boundaries. By way of example, the efficiency increases from 8% for nanocrystalline silicon having a crystallite size of 10 nm to 11.7% for microcrystalline silicon having a crystallite size of 1 μm [M. Green, K. Emery, D. L. King, S. Igari, W. Warta, Progress in Photovoltaics, Research and Applications (2005) 1349-1354]. Polycrystalline $CuIn_{1-x}Ga_xSe_2$ (CIGS) solar cells have an efficiency of 11%.

In accordance with various embodiments, one or a plurality of contact-connected polycrystalline piezo- or ferroelectric thin-film layers can be provided, in which the crystallites are electrically isolated from one another. Furthermore, the intension is to specify the downscaling of the contacts and the processing of crossbar array structures with polycrystalline thin-film layers and the use of such thin-film layers for effectively separating photogenerated charge carriers.

A modification of a polycrystalline, piezo- or ferroelectric thin-film layer on a contact is carried out by means of beams 2 which impinge on the surface of the thin-film layer or are directed onto the surface thereof. The properties of the beams 2, for example the flux, the current density and the energy (e.g. of ion beams), are chosen such that the atomic species of the piezo- or ferroelectric thin-film layer are sputtered differently and that principally anion or cation vacancies are formed as a result primarily in the near-surface region of the crystallites and along the grain boundaries GB to be modified and modified grain boundaries GB' are present as a result. The majority vacancy type is determined as a result of whether the anions or the cations are the lighter atomic species of the polycrystalline material. The anion or cation vacancies, designated as vacancies hereinafter, can be singly or multiply charged or neutral. During and after the modification, the charged vacancies drift in the intrinsic electrical field of each crystallite of a polycrystalline ferroelectric thin-film layer or in the electric field of each crystallite of a polycrystalline piezoelectric thin-film layer with an electrical voltage applied to the outer surface of the respective crystallite. On account of the drift and diffusion of the vacancies and of other mobile defects present in the crystallite, it is possible to produce grain boundaries GB" having changed properties in comparison with the grain boundaries GB before the modification or in comparison with the grain boundaries GB' during the modification. On account of the formation of a space charge zone in the crystallites on both sides of the modified grain boundaries GB", when a voltage is applied to the contacts of the polycrystalline thin-film layer the current flows in electrically separated conduction paths, i.e. along the grain boundaries GB" and within the crystallites, but not in the regions 11' situated at the grain boundaries GB", or not through the grain boundaries GB". By means of corresponding setting of the degree of modification of the grain boundaries GB", for example extent or chemical composition of the grain boundaries GB", the proportion of the current which flows through the grain boundaries GB" when an external voltage is applied can be set (e.g. exactly). That is of importance for the downscaling of the size of the contacts and the order of magnitude of the current signal. Typically, the evaluatable current in components having downscaled contacts must exceed approximately $10^{-9}$ A.

In accordance with various embodiments, the contact-connected, polycrystalline piezo- or ferroelectric thin-film layer can comprise the following: at least one piezo- or ferroelectric crystallite having regions 11", 11' and 11, wherein at least two outer contacts are fitted to the crystallite or to the crystallites and the crystallites of a modified polycrystalline piezo- or ferroelectric thin-film layer are electrically isolated from one another in the region of the grain boundaries GB", and wherein the physical and/or chemical properties of the regions 11" differ from the physical and/or chemical properties of the regions 11 and insulating (e.g. strained) regions 11' form between the regions 11" and the remaining (e.g. unstrained) region 11 of the crystallites.

In accordance with various embodiments, in the case of a contact-connected polycrystalline piezo- or ferroelectric thin-film layer, the boundary between a strained phase 11' and an unstrained phase 11 in each crystallite can be shifted within the crystallite by a voltage being applied between the outer contacts. Furthermore, in the case of a contact-connected polycrystalline piezo- or ferroelectric thin-film layer, the vacancies can be shifted within the crystallite by a voltage being applied between the outer contacts.

The outer contacts can be rectifying (e.g. Schottky contacts) or non-rectifying (e.g. ohmic contacts) in the embodiment variants. Furthermore, it is possible to provide individual crystallites with separate outer contacts.

In accordance with various embodiments, the thin-film layer can be produced by a procedure in which a first metal layer (a metal film) is applied to a carrier material (substrate); afterward, a polycrystalline, piezo- or ferroelectric material is applied to the first metal layer; afterward, the regions 11" and the grain boundaries GB" at the outer surface of the crystallites are formed by modification of the polycrystalline thin-film layer, and, afterward, a further metal layer is applied to the polycrystalline thin-film layer as a further contact.

In this case, the modification of the polycrystalline thin-film layer leads to the formation and subsequent drift and/or diffusion of vacancies to the outer surface of the individual crystallites and to the change in the valence of the vacancies in the outer surface of the crystallites and thus to the formation of the regions 11" and the grain boundaries GB". This modification can then be maintained, for example not be destroyed by a voltage applied at the contacts.

The modification can be carried out by means of ion implantation, by means of plasma-based ion implantation PIII, by means of laser irradiation or by means of electron beams, wherein preferably noble gas ions, for example $Ar^+$ ions having a fluence in the range of $5 \times 10^{15}$ $cm^{-2}$ to $5 \times 10^{18}$ $cm^{-2}$, preferably, in the range of $1 \times 10^{16}$ $cm^{-2}$ to $1 \times 10^{18}$ $cm^{-2}$, particularly preferably in the range of $5 \times 10^{16}$ $cm^{-2}$ to $5 \times 10^{17}$ $cm^{-2}$, and an ion energy of less than 1 keV, are used during the ion implantation.

The polycrystalline piezo- or ferroelectric thin-film layer can be used for transporting charge carriers between two outer contacts, wherein charge carriers are transported through the mutually electrically isolated crystallites of the polycrystalline thin-film layer and in the grain boundaries GB". In this case, the order of magnitude of the current signal in contact-connected polycrystalline, piezo- or ferroelectric thin-film layers is determined by the proportion of the current which flows through the grain boundaries GB".

Furthermore, it is possible to use the contact-connected polycrystalline piezo- or ferroelectric thin-film layer described herein as a resistance switch having high retention and endurance and a high current signal. Preferably, the outer contact S is rectifying and the outer contact O is non-rectifying. This can be effected for example, as described above, by means of application of an electrical voltage and a voltage-driven diffusion of the vacancies V, $V_o$.

A further possibility for the use of the contact-connected polycrystalline piezo- or ferroelectric thin-film layer is in a solar cell for separating photogenerated charge carriers in the polycrystalline thin-film layer with crystallites electrically isolated from one another. The separation here takes place in each case in the crystallite in which the charge carriers were generated by absorption of light. Preferably, in this case, the two outer contacts S and O are embodied as two non-rectifying contacts. By way of example, Pt, Ag, Au, Ti, Ni and Al can be used as metals for the contacts.

Figure 5A:
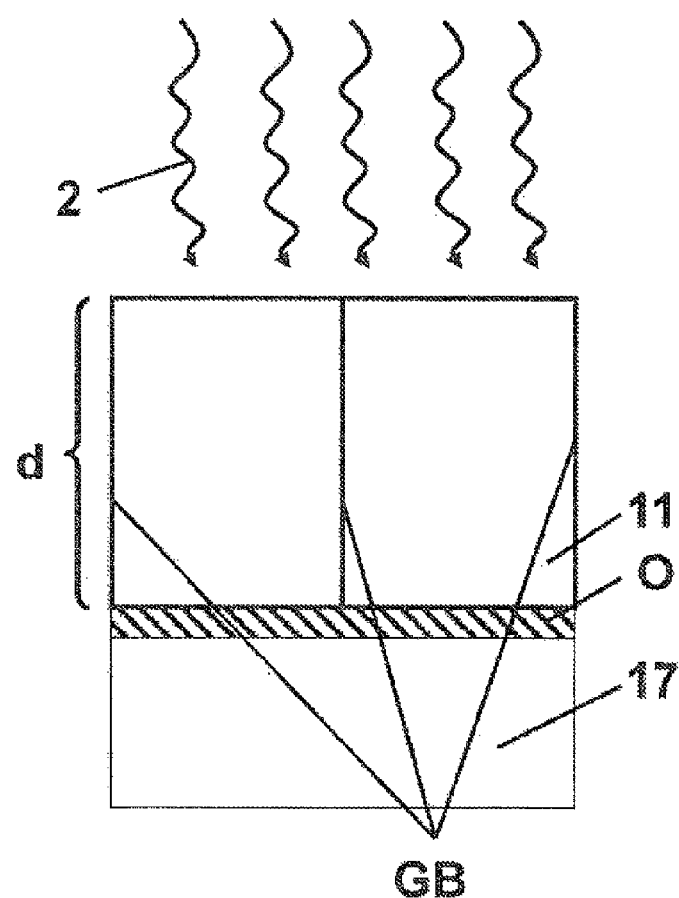
Figure 5B:
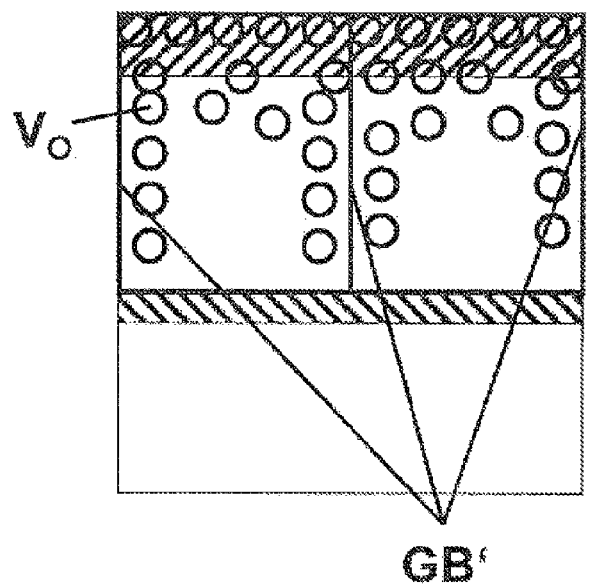
Figure 5C:
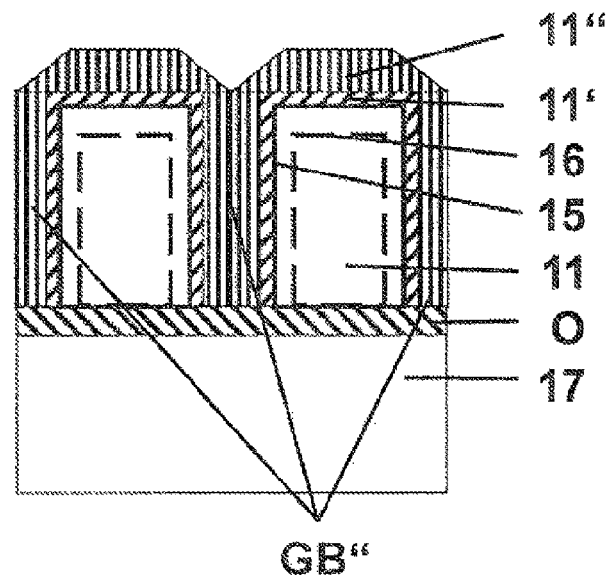

FIGS. 5A to 5C in each case schematically illustrate production steps for contact-connecting a polycrystalline, piezo- or ferroelectric thin-film layer.

Figure 5D:
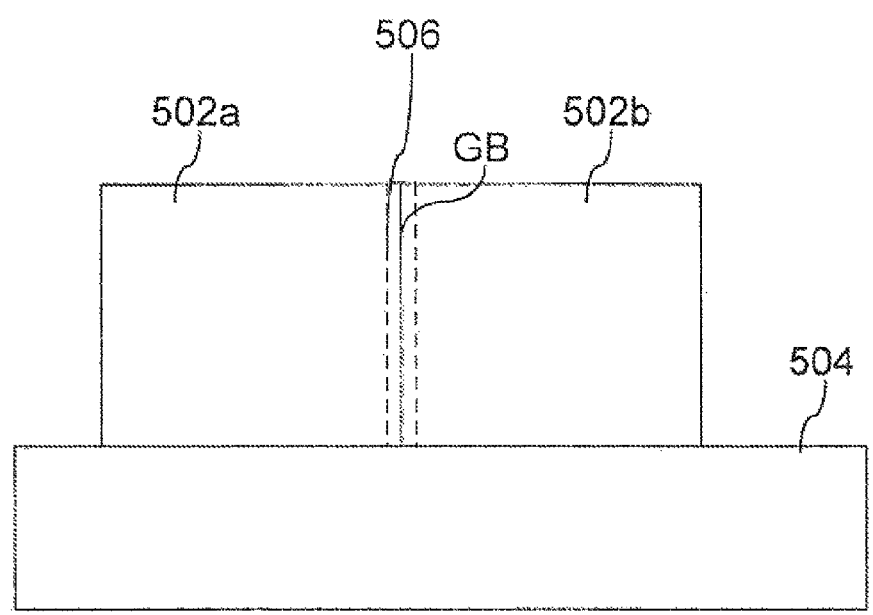

FIG. 5D illustrates a modified polycrystalline, piezo- or ferroelectric thin-film layer, in accordance with various embodiments.

FIGS. 6A to 6C in each case schematically illustrate a contact-connected polycrystalline, piezo- or ferroelectric thin-film layer when an external voltage is applied.

FIG. 5A shows the schematic construction of a polycrystalline, piezo- or ferroelectric thin-film layer on a non-rectifying contact O in cross section before (FIG. 5A), during (FIG. 5B), and after (FIG. 5C) of the modification by means of beams 2, e.g. by means of laser, thermal, plasma, ion or electron beams. The non-rectifying contact O is applied to a carrier material 17 over a large area, for example. Afterward, by means of a thin-film method, e.g. by means of pulsed laser plasma deposition (PLD), magnetron sputtering, metal organic vapor phase epitaxy, molecular beam epitaxy, the polycrystalline, piezo- or ferroelectric thin-film layer where the thickness d is applied to the (non-rectifying) (e.g. metallic) contact O. The crystallite size of the crystallites in the polycrystalline, piezo- or ferroelectric thin-film layer is between a plurality of micrometers and a few nanometers and is 10 nm to 1000 nm, for example. Individual crystallites are separated from one another by grain boundaries GB.

The modification of the polycrystalline, piezo- or ferroelectric thin-film layer is carried out by means of beams 2 (e.g. particle beams) which impinge on the surface of the thin-film layer (cf. FIG. 5A). The properties of the beams 2, for example the flux, the current density and the energy of ion beams, are chosen such that the atomic species of the piezo- or ferroelectric thin-film layer are sputtered differently and that principally anion or cation vacancies are formed as a result primarily in the near-surface region of the crystallites and along the grain boundaries GB to be modified and modified grain boundaries GB' are present as a result. The majority vacancy type is determined as a result of whether the anions or the cations are the lighter atomic species of the polycrystalline material (cf. FIG. 5B). The anion or cation vacancies, designated as vacancies hereinafter, can be singly or multiply charged or neutral. During and after the modification, the charged vacancies drift in the intrinsic electrical field of each crystallite of a polycrystalline ferroelectric thin-film layer or in the electric field of each crystallite of a polycrystalline piezoelectric thin-film layer with an electrical voltage applied to the outer surface of the respective crystallite. On account of the drift and diffusion of the vacancies and of other mobile defects (a mobile doping) present in the crystallite, it is possible to produce grain boundaries GB" having changed properties (cf. FIG. 5C) in comparison with the grain boundaries GB before the modification (cf. FIG. 5A) or in comparison with the grain boundaries GB' during the modification (cf. FIG. 5B). On account of the formation of a space charge zone on both sides of the modified grain boundaries GB", when a voltage is applied to the contacts of the polycrystalline thin-film layer the current flows in electrically separated conduction paths, i.e. along the grain boundaries GB" and within the crystallites, but not in the regions 11' situated at the grain boundaries GB". By means of corresponding setting of the degree of modification of the grain boundaries GB", for example extent or chemical composition of the grain boundaries GB", the proportion of the current which flows through the grain boundaries GB" when an external voltage is applied can be set exactly. That is of importance for the downscaling of the size of the contacts and the order of magnitude of the current signal. Typically, the evaluatable current in components having downscaled contacts must exceed approximately $10^{-9}$ A.

The near-surface region 11" is partly amorphized at the outer surfaces as a result of the modification and can be partly recrystallized. In the crystallite, a space charge zone with an electric field forms below the modified region 11" and below the grain boundaries GB", the end of said space charge zone being identified by 16, i.e. the space charge zone covers the modified region 11' and outer regions of the remaining crystallite 11, i.e. the end of the space charge zone 16 lies further within a crystallite than the structure boundary 15. In accordance with various embodiments, the structure boundary 15 can be optional.

The space charge zone does not contain any freely mobile charge carriers, but rather only non-mobile, ionized defects. In the event of a critical electric field strength or the threshold voltage $U_{crit}$ being exceeded in the space charge zone, a structural phase transition can be caused in the piezo- or ferroelectric material. The structure boundary 16 separates the regions of high conductivity in a piezo- or ferroelectric phase that is stable without strain from the regions of low conductivity in a piezo- or ferroelectric phase that is stable under strain. The differences in the electronic band structure and in the spontaneous polarization charge of both phases at the structure boundary 16 cause a stepped change in the conduction band and the valence band of the piezo- or ferroelectric material. The stepped change in the conduction band and the valence band causes the localization of spontaneous polarization charge at the structure boundary 16 (cf. FIG. 5C).

In accordance with various embodiments, a layer structure, as illustrated in FIG. 5D, can comprise the following: a layer comprising a plurality of ferroelectric crystallites 502a, 502b embodied such that they are at least partly electrically insulating at the boundaries 506 between the ferroelectric crystallites 502a, 502b, such that a current flow between the ferroelectric crystallites 502a, 502b is inhibited through the boundary 506. Furthermore, the layer can be arranged between two electrically conductive contact elements. The layer structure can be arranged on a substrate 504, for example. In this case, the substrate can comprise a metallization (as electrical contact-connection of the ferroelectric crystallites) or the substrate itself can be electrically conductive.

The grain boundary GB can be electrically conductive, e.g. caused by production of vacancies in the ferroelectric crystallites 502a, 502b by means of irradiation. Furthermore, a metallic or electrically conductive region can be formed in the grain boundary region 506 by means of the modification (e.g. selective sputtering), such that the grain boundary region 506 has one or a plurality of Schottky junctions which suppress or prevent or inhibit a lateral current flow between the ferroelectric crystallites 502a, 502b.

FIGS. 6A to 6C show a contact-connected modified polycrystalline, piezo- or ferroelectric thin-film layer having a rectifying contact S and a non-rectifying contact O in cross section without an externally applied voltage U (in FIG. 6A), upon application of an external voltage U<0 V (in FIG. 6B) and upon application of an external voltage U>0 V (in FIG. 6C). The thickness of the modified near-surface region is d", and the thickness of the region of the strained phase of the crystallite 11' results from the difference between d' and d".

If the non-rectifying contact O is grounded and if a negative voltage U<0 V is applied to the rectifying contact S, then the boundary 15 between the strained and unstrained phases shifts into the corresponding crystallites (FIG. 6B). Furthermore, the vacancies can also shift in accordance with the applied electric field.

If the non-rectifying contact O is grounded and if a positive voltage U>0 V is applied to the rectifying contact S, then the boundary 15 between the strained and unstrained phases shifts in the direction of outer regions of the crystallite (FIG. 6C). Furthermore, the vacancies can also shift in accordance with the applied electric field.

On account of the formation of a space charge zone at both sides of the modified grain boundaries GB", when a voltage is applied between the rectifying contact S and the non-rectifying contact O, the current flows in electrically separated conduction paths, i.e. along the grain boundary GB" and within the crystallites, but not in the outer regions of the crystallites. By means of corresponding setting of the degree of modification of the grain boundaries GB", for example extent or chemical composition of the grain boundaries GB", the proportion of the current which flows through the grain boundaries GB" when an external voltage is applied can be set exactly. That is of importance for the downscaling of the size of the contacts and the order of magnitude of the current signal. Typically, the evaluatable current in components must exceed approximately $10^{-9}$ A.

The current flow in the individual crystallites is separated from the current flow through the grain boundaries GB" on account of the electrical isolation of the grain boundaries GB" from the crystallites. That is of importance for example for the realization of polycrystalline resistance or photovoltaic components.

In accordance with various embodiments, passive arrays comprising polycrystalline piezo- or ferroelectric thin-film layers can be processed. The contacted polycrystalline piezo- or ferroelectric thin-film layer can be processed in a passive grid structure (array). In this case, the crystallites at each crossover point (m,n) of the array structure having m rows and n columns are separately controllable and electrically isolated from the crystallites at every other crossover point of the array structure. In order to produce the passive array, firstly a metal layer is applied to a carrier material and structured in m rows. In this case, particular attention must be paid to the arrangement of the individual contact pads of the m rows. Afterward, the polycrystalline piezo- or ferroelectric material is applied to the metal layer in thin-film layer form. Afterward, the thin-film layer is modified in the region of the crossover points of the array structure so as to form regions 11" and grain boundaries GB" at the outer surfaces of the crystallites of the piezo- or ferroelectric thin-film layer, wherein the modification of the polycrystalline thin-film layer leads to the formation of vacancies, subsequent drift and/or diffusion to the outer surfaces of the individual crystallites and to the change in the valence of the vacancies in the outer regions of the crystallites and thus to the formation of the regions 11" and the grain boundaries GB". Afterward, the thin-film layer is opened lithographically in the region of the contact pads of the m rows, the opened area being smaller than the contact pad area. It is also possible firstly to open the regions of the contact pad and then to modify the thin-film layer at the crossover points of the passive array. Finally, the metal layer in thin-film layer form is applied to the polycrystalline thin-film layer and structured in n columns.

This processing constitutes an improvement relative to the standard processing of passive arrays since the polycrystalline piezo- or ferroelectric thin-film layer does not have to be structured in the region of the crossover points. Furthermore, the surface of the thin-film layer—apart from the reduction in thickness on account of the modification by means of beams 2—remains planar to the greatest possible extent and applying a metal layer to the polycrystalline thin-film layer does not presuppose the covering of high edges of a polycrystalline thin-film layer structured completely between top side and underside. In the case of a completely structured polycrystalline thin-film layer, the height of the edges and thus the thickness of the contact-connectable polycrystalline thin-film layer are limited to approximately 100 nm. The achievable minimum structure size of passive arrays comprising polycrystalline piezo- or ferroelectric thin-film layers is determined by the crystallite size and is in the range of a few nanometers.

In accordance with various embodiments, in the case of an asymmetrical form of the crystallites, the crystallite size can be an averaged size representing for example the average distance between the crystallite surface and the center of gravity of the crystallites.

The modification can be carried out by means of ion implantation, by means of plasma-based ion implantation PIII, by means of laser irradiation or by means of electron beams, wherein preferably noble gas ions, for example $Ar^+$ ions having a fluence in the range of $5 \times 10^{15}$ $cm^{-2}$ to $5 \times 10^{18}$ $cm^{-2}$, preferably, in the range of $1 \times 10^{16}$ $cm^{-2}$ to $1 \times 10^{18}$ $cm^{-2}$, particularly preferably in the range of $5 \times 10^{16}$ $cm^{-2}$ to $5 \times 10^{17}$ $cm^{-2}$, and an ion energy of less than 1 keV, are used during the ion implantation. In the case of a fluence of $10^{17}$ $cm^{-2}$ of the $Ar^+$ ions which are used for modifying a polycrystalline $BiFeO_3$ thin-film layer having a thickness of approximately 600 nm, the thickness d" of the modified region is approximately 3-20 nm and the difference between the thickness of the unmodified and modified $BiFeO_3$ thin-film layer is approximately 100 nm.

In accordance with various embodiments, a polycrystalline piezo- or ferroelectric thin-film layer can be used for use as an absorber material in photovoltaics. Contact-connected modified polycrystalline piezo- or ferroelectric thin-film layers can be used as absorber material with reduced surface recombination in a pn heterostructure having two non-rectifying contacts in photovoltaics. Free electrons and holes are generated in the crystallites by absorption of light. On account of the electrical isolation between the crystallites and the grain boundaries GB" in modified polycrystalline piezo- or ferroelectric thin-film layers, the photogenerated charge carriers separated in an intrinsic electric field at the pn junction of the pn heterostructure are transported to the corresponding non-rectifying contacts to the greatest possible extent without surface recombination. By way of example, the crystallites in the two thin-film layers of the pn heterostructure are arranged in a columnar fashion. By way of example, $CuInSe_2$ (CIGS) thin-film layers are p-conducting, grow in a columnar fashion, have a band gap of 1.05 eV and can be used with polycrystalline, n-conducting $BiFeO_3$: Ti (BFTO) in p+n heterostructures glass/Mo/CIGS/BFTO/Pt. The BFTO can be modified by means of beams before the application of the surface contacts, in order to increase the electrical isolation between the grain boundaries GB" and the crystallites of the BFTO.

In accordance with various embodiments, a ferroelectric material or a ferroelectric layer can comprise a ternary, ferroelectric oxide, for example. In this case, a fixed basic doping (or a first immobile doping distribution) and a mobile doping e.g. on account of oxygen vacancies can be provided. The dopings can be carried out or produced for example by means of diffusion, during growth or by means of implantation.

In the case of ternary, ferroelectric oxides (e.g. in the perovskite structure), the local conductivity can be increased by means of substitutional introduction of impurity atoms having a different valence than that of the host atoms in conjunction with reduction of the local formation of oxygen vacancies, e.g. on the basis of the replacement (substitution) of the $Fe^{3+}$ at a B lattice site in a $BiFeO_3$ perovskite by means of $Ti^{4+}$ at the B lattice site in the $BiFeO_3$ perovskite.

Furthermore, by way of example, the $Ba^{2+}$ at a Ba lattice site in a $BaTiO_3$ Perovskite can also be replaced by means of $Gd^{3+}$ at the Ba lattice site in the $BaTiO_3$.

Furthermore, by way of example, the $Sr^{2+}$ at an Sr lattice site in an $SrTiO_3$ Perovskite can also be replaced by $Gd^{3+}$ at the Sr lattice site in $SrTiO_3$.

In accordance with various embodiments, the impurity atoms can have similar ion radii to the substitutionally replaced host atoms. Moreover, the impurity atoms can have a higher number of valence electrons than the replaced host atom.

On account of the increase in complexity in data processing and/or data communication, new solutions may be required in order to enable data protection to be maintained by means of cryptographic algorithms. In this case, in order to develop an improved (more secure) cryptographic algorithm, it is possible to utilize the nonvolatile and/or nonlinear resistance change in resistance switches (memristors) by means of the application of a voltage (and the current resulting therefrom) for the efficient generation of a second (or higher) harmonic (of a fundamental frequency) (e.g. with a favorable ratio of the power of the higher harmonic to the first harmonic, e.g. with a power ratio of greater than approximately 0.1%). Illustratively, by means of a memristive system (also designated as memristor arrangement, memristor circuit, circuit arrangement, or memristor circuit arrangement), data which are intended to be stored, processed and/or transmitted can be protected against unauthorized access by third parties.

By way of example, the use of cloud stores in data processing makes it possible to realize advantages in comparison with conventional storage methods. By way of example, cloud stores may require no installation of additional software or manage without maintenance or additional capital expenditure and afford the possibility of reducing the total storage costs by virtue of scaling effects (e.g. the shared use of storage space). However, the use of cloud stores may still be associated with some challenges when transmitting large amounts of data, e.g. with long transmission times, security risks and difficulties in synchronizing data. In order to ensure or improve security during the processing or transmission of data, a so-called "on-the-wire" encryption can be used, for example. This includes technologies such as SFTP and FTPS, for example. Cognitive systems based on memristors can be used for processing data.

As illustrated in schematic illustrations in FIGS. 7A to 7C, the high resistance state (also designated by HRS in FIG. 7A) and the low resistance state (also designated by LRS in FIG. 7A) of a single-layer memristor, as illustrated in FIG. 7A and FIG. 7B, can be used to generate two mutually distinguishable sets of first, second (and/or higher) harmonics. By way of example, the power ratio of the respective second or third harmonic relative to the first harmonic in a memristor circuit arrangement (in a memristive system or in a circuit arrangement having at least one memristor) with an asymmetrical current-voltage hysteresis (cf. FIG. 7A) may be greater than the corresponding power ratio of a memristor circuit arrangement having a symmetrical current-voltage hysteresis (hysteresis of the U-I characteristic curves). A current-voltage hysteresis may occur, for example, if a periodic input signal or a signal having a periodic amplitude (e.g. having a periodic current intensity and/or having a periodic voltage) in a component leads to different resistances, depending on whether the current intensity increases or decreases. In other words, different U-I pairs may be established along the branch of the U-I characteristic curve having rising current intensity and along the branch of the U-I characteristic curve having falling current intensity, such that a different voltage may be dropped across the component with identical current intensity (cf. FIG. 7A).

In accordance with various embodiments, by way of example, input data can be coded (encrypted) by means of a memristor circuit arrangement, wherein the memristor (at least in one of its states) can have an asymmetrical current-voltage hysteresis, such that the encrypted or coded data have for example a low correlation or an autocorrelation factor (correlation with respect to one another) of approximately 0 (or with an autocorrelation factor in a range of approximately −0.3 to approximately 0.3, e.g. in a range of approximately −0.2 to approximately 0.2, e.g. in a range of approximately −0.1 to approximately 0.1 or of 0 to 0.1). Illustratively, data having low correlation or an autocorrelation factor of close to zero can be distinguished from correlated random data only with difficulty, as a result of which conclusions about the original data can be drawn only with difficulty or the properties of the coding data can be analyzed only with difficulty, which can increase the security of the communicated data, cf. FIG. 8E, for example.

By way of example, the mode of operation of a biological brain can be emulated by means of the functionality of memristors. By way of example, memristors can be used as nonvolatile resistance memories, artificial neural networks, chaotic circuits and/or nonvolatile multiply configurable (or configuration-variable) logic blocks.

Cryptography based on a memristor can afford advantages here when using cognitive systems based on memristors. Hardware-based encryption, in which authentication can be carried out for example within the hardware and/or can be part of the hardware, in contrast to software-based encryption, may be only slightly susceptible to brute force attacks, malware and/or so-called hacking. Software-based encryption (or a software-based encryption method) can cause bottlenecks and/or may be less able to encrypt data rapidly and efficiently since it may be tied to hardware that is provided. An alternative for data processing or data protection may be the use of memristors, by means of which data can be processed more rapidly and with a lower current consumption than by means of conventional systems.

A memristive $BiFeO_3$ (BFO) thin-film layer can be produced on an industrial scale for example on an $SiO_2/Si$ substrate and with the use of Pt/Ti electrodes for making electrical contact with the thin-film layer, e.g. by means of pulsed laser deposition (PLD) or by some other vapor deposition. Furthermore, gold contacts can be sputtered onto the $BiFeO_3$ (BFO) thin-film layer by means of an (e.g. circular) magnetron. In accordance with various embodiments, a $BiFeO_3$ (BFO) layer can be deposited on a substrate, comprising silicon, and/or silicon oxide, wherein an electrically conductive layer or at least electrically conductive structures were previously deposited onto the substrate, e.g. a metal electrode or a plurality of metal electrodes, comprising titanium and/or platinum, for example.

The current-voltage hysteresis (the I-U characteristic curves) of a memristive $BiFeO_3$ thin-film layer can be measured by means of a suitable circuit, for example, wherein the Au/BFO/Pt/Ti structure can be connected directly to the current source, for example. FIG. 7A shows by way of example an I-U characteristic curve of a BFO memristor, wherein the hysteretic bipolar switching of the resistance states between a high resistance state (HRS) and a low resistance state (LRS) can be carried out repeatably or reproducibly by means of a for example sinusoidal input voltage having a voltage amplitude of 7 V, for example, wherein a voltage amplitude of 5 V for example may not suffice to switch the memristor completely between an HRS and an LRS, and for a low voltage amplitude (for example of 3 V or in a range of approximately 1 V to 3 V approximately) the memristor may have the properties of a resistor having a high resistance, having a resistance value in the giga-ohms range, e.g. in a range of approximately $10^8 \Omega$ to approximately $10^{10} \Omega$.

In accordance with various embodiments, a resistance state for a memristor can be written by means of a voltage pulse, that is to say by means of a positive or negative voltage pulse (e.g. having a pulse height of 7 V). In this case, the voltage pulse can have a pulse length in the nanoseconds range, in the microseconds range, in the milliseconds range, or in the seconds range, or can be longer than approximately one second or shorter than one nanosecond.

The high resistance state (HRS) and the low resistance state (LRS) of a memristor 700 (cf. FIGS. 7A to 7C, for example) can be defined for example as resistance values in the profile of the U-I characteristic curve, such as can be generated with a sinusoidal input voltage having a voltage amplitude of 7 V, at a voltage value of 2 V. Illustratively, the HRS and the LRS of a memristor can be defined as resistance value at a constant voltage, wherein a voltage amplitude of 7 V may be necessary to switch the memristor into an HRS and an LRS. In other words, the U-I pair at 2 V is used for determining the resistance resulting from the quotient of voltage and current, such that the resistance value of an HRS or LRS can be (e.g. unambiguously) defined.

By way of example, the resistance values of a BFO memristor 700 having a contact surface having a size of $0.217$ mm$^2$ can be $1188*10^6$ $\Omega$ in the HRS and $13*10^6$ $\Omega$ in the LRS, wherein the ratio of the resistance value in the HRS ($R_{HRS}$) and of the resistance value in the LRS ($R_{LRS}$) can be 91.4. It goes without saying that the electrical properties and characteristic variables of the memristor can be correspondingly adapted. Furthermore, the different resistance states can also be generated by means of a plurality of memristors or by means of a resistance circuit having a plurality of resistances, wherein at least one nonlinear resistance can be used, for example. Illustratively, a resistance element can be used which can provide at least two different resistance states, wherein at least one resistance state of the resistance element can have corresponding properties in order to efficiently generate higher harmonics.

FIG. 7C illustrates a complementary resistance switch (a memristor), which can comprise two memristor elements a, b or two ferroelectric layers a, b, wherein this memristor can be used in a memristor circuit arrangement, as illustrated in FIG. 7D, for example.

FIG. 7D illustrates a circuit (or a memristor circuit arrangement) which can be used for example for generating and/or characterizing the first, second (or higher) harmonics. This circuit can comprise for example a current source (e.g. a Keithley current source) or for example a lock-in amplifier as input voltage source, and also a load resistance ($R_L$). The corresponding Keithley construction (KL) and the lock-in amplifier construction (LA) can be used to determine or to analyze the amplitude dependence and frequency dependence of the power conversion efficiency (PCE). Illustratively, the power conversion efficiency can represent a proportion of the total power which is converted at the load resistance $R_L$. The power converted at the load resistance can result from the product of the current intensity and the voltage dropped across the memristor, and can be a function of the resistance value of the memristor for a given load resistance. In other words, conclusions about the circuit state of the memristor (HRS or LRS) can be drawn on the basis of the PCE.

In accordance with various embodiments, the memristor 700 can be a simple resistance switch (a single-layer memristor), as illustrated in FIG. 7B, or a complementary resistance switch (a two-layer memristor), as illustrated in FIG. 7C and described above.

As illustrated in FIG. 7D, a series interconnection of a memristor (or of a resistance element comprising a memristor) with the load resistance $R_L$ can be used, wherein a current/voltage source (e.g. Keithley 2400), for example, can be used to generate a sinusoidal input voltage and to measure the voltage dropped across the load resistance, or wherein a lock-in amplifier (e.g. Stanford Research Systems—SR 830), for example, can be used to generate a sinusoidal input voltage and to measure or to analyze the current flow through the load resistance depending on different harmonics.

FIG. 7D shows a circuit comprising a memristor M, to which a sinusoidal input voltage $V_{in}$ is fed or can be fed. In this case, the memristor M can be a nonlinear resistor with memory and generate higher harmonics depending on its resistance state (HRS or LRS) and the load resistance $R_L$. As described, by way of example, two different modes of construction can be used, the KL construction, in which the voltage across the load resistance $R_L$ is tapped off, and the LA construction, using a current measurement.

On account of the limited pulse length that can be provided by a Keithley 2400, for example, an LA construction may be useful for the analysis of the frequency dependence of the PCE for relatively high fundamental frequencies f1. In accordance with various embodiments, the load resistance can function as a voltage divider, wherein and the power conversion efficiency can be dependent on the load resistance.

In accordance with various embodiments, it is possible to characterize the power conversion efficiency (PCE) of a memristor circuit depending on the load resistance for different orders of the harmonics (e.g. of the second harmonic in relation to the first harmonic, e.g. of the third harmonic in relation to the first harmonic, etc.; or of the higher harmonics with respect to one another).

Figure 8A:
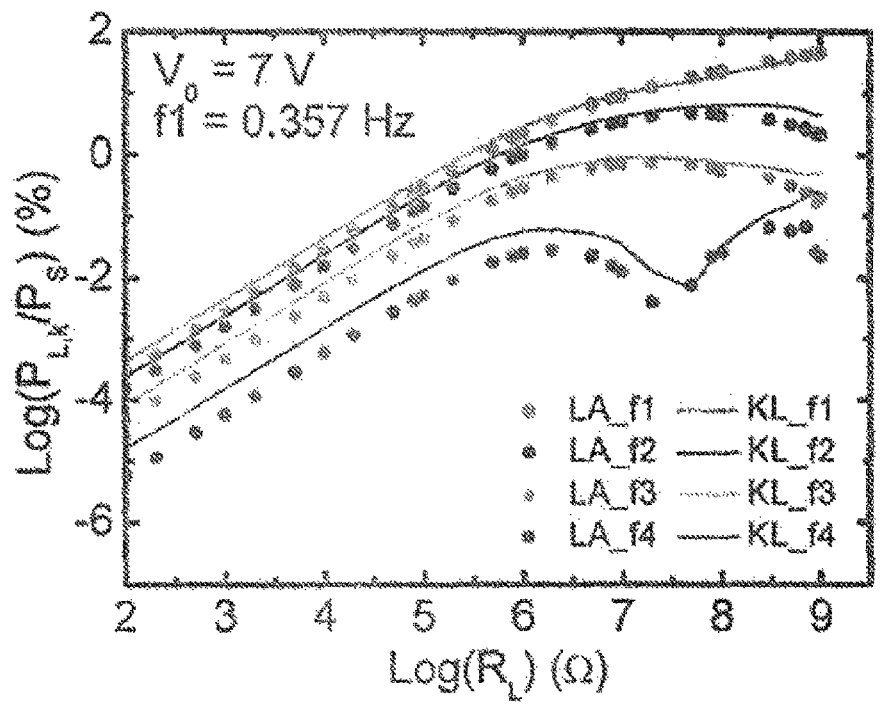

By way of example, illustratively, it is possible to characterize the logarithmic power ratio ($\log(P_L(k)/P_S)$) depending on the load resistance $R_L$ for different amplitudes of the input voltage V0 at a frequency of 0.375 Hz, as is illustrated by way of example in FIG. 8A, with the total power (the introduced power or power of the first harmonic) $P_S$ and the power $P_L$ converted at the load resistance. In this case, f1 corresponds to the first order of the harmonics (fundamental frequency), f2 corresponds to the second order of the harmonics, f3 corresponds to the third order of the harmonics and f4 corresponds to the fourth order of the harmonics.

In accordance with various embodiments, the power conversion efficiency (PCE) can represent the power ratio of the harmonics and/or the logarithmic power ratio ($\log(P_L(k)/P_S)$), wherein $P_S$ can be the total power of the current-voltage source.

In accordance with various embodiments, the logarithmic power ratio $\log(P_L(k)/P_S)$ (wherein k=1, 2, 3, 4 denotes the order (frequency) of the harmonics f1, f2, f3, f4) can have a linear dependence for different amplitudes of the sinusoidal input signal (for example 7 V, 5 V or 3 V) on the logarithmic load resistance $\log(R_L)$ in a lower value range of the $R_L$ (e.g. 100 Ω to $10^5$ Ω).

In accordance with various embodiments, the voltage-controlled resistance state (for example HRS or LRS) of the memristor can influence the power ratio ($P_L(k)/P_S$) for a given load resistance $R_L$ and a given amplitude in the lower value range of the $R_L$. Furthermore, the maximum power ratio for an amplitude of $V_0$=7 V can be greater than for an amplitude of $V_0$=5 V.

In accordance with various embodiments, for cryptography and/or cryptoanalysis, the use of an amplitude in the range of 1 V to 3 V, which is comparable to the bias voltage for reading $BiFeO_3$ resistance memories, may suffice to distinguish between the two sets of the second (or higher) harmonics generated by a memristor in the HRS and LRS.

The logarithmic power ratio $\log(P_L(k)/P_S)$ can be a linear function of $\log(R_L)$ in a lower value range of the $R_L$ (e.g. 100 Ω to $10^5$ Ω) and can saturate in an upper value range (e.g. greater than $10^5$ Ω). Illustratively, the increase in the logarithmic power ratio increases as the load resistance increases, as illustrated for example in FIG. 8A and FIG. 8B.

This saturation of the logarithmic power ratio in an upper value range of the load resistance value of the load resistance can arise on account of a large part of the input voltage being dropped across the load resistance, wherein the BFO memristor then cannot switch completely.

The transition point (TRP) of PCE curves from HRS to LRS can be defined as the average of the logarithmic resistance values $R_{HRS}$ and $R_{LRS}$, wherein:

$$\mathrm{Log}_{10}(R_L)=(\mathrm{Log}_{10}(R_{HRS})+\mathrm{Log}_{10}(R_{LRS}))/2.$$

One example of corresponding resistance values of the second-, third- and fourth-order harmonics and the fundamental frequency is summarized in table 17 below.

| V0 (V) | Log (RLTRP (Ω)) | PL, 1 (%) | PL, 2 (%) | PL, 3 (%) | PL, 4 (%) | Σ |
|---|---|---|---|---|---|---|
| 7 | 8.100 | 17.990 | 6.330 | 0.725 | 0.001 | 25.046 |
| 5 | 8.360 | 20.130 | 4.320 | 0.470 | 0.002 | 24.922 |
| 3 | 8.699 | 21.110 | 2.810 | 0.330 | 0.002 | 24.252 |

In accordance with various embodiments, in a circuit, comprising a BFO memristor having an asymmetrical U-I characteristic curve (as shown in FIG. 7D, for example), within a half-cycle (of the sinusoidal input voltage), the average value of the power can be converted (e.g. converted into heat) by the load resistance.

Therefore, the sum Σ of the $P_L(k)$ at the TRP can be approximately 25%. By way of example, given an amplitude of the input voltage of 7 V, the TRP can be 8.1, wherein the sum of all four PCEs can be 25.046% (see Tab. 17).

The maximum value of the PCE of the second harmonic can be 6.67% given a load resistance of approximately 300 MΩ (ratio $R_L/R_{HRS}$=0.253). In this case, the maximum value of the PCE of the second harmonic can be greater than that of a diode bridge frequency doubler.

FIG. 8A illustrates a power conversion efficiency (PCE) of a single-layer memristor depending on the load resistance $R_L$ comparatively measured with the LA construction and the KL construction. In this case, the fundamental frequency f1 of the input voltage $V_{in}$ can have the amplitude $V_0$. In this case, the amplitude of the input voltage $V_{in}$ can be large, e.g. 7 V and the memristor can be switched continuously between HRS and LRS in this case.

In accordance with various embodiments, the PCE values for $P_L$, $P_{L2}$, and $P_{L3}$ at the TRP can increase as the amplitude of the input voltage increases and the fundamental frequency decreases (Tab. 17). At larger amplitudes, for a given fundamental frequency, less power can be converted at the load resistance since more harmonic oscillation power is generated.

In accordance with various embodiments, a fully switching memristor which is operated with an input voltage having an amplitude of 7 V, for example, can generate more harmonic oscillation power than an incompletely switching memristor operated for example with an input voltage having an amplitude of 5 V or 3 V. Furthermore, the hysteresis of the U-I characteristic curves of the memristors can be asymmetrical, as illustrated in FIG. 7A, or symmetrical (e.g. figure eight or almond-shaped). If the U-I characteristic curves intersect for example at the coordinate origin, this can be referred to as symmetrical figure eight. Illustratively, the symmetrical figure eight profile is characterized by the fact that U-I pairs of identical type (including negative value pairs; for example, 1V/1A are of identical type to −1A/−1V) respectively occur on the branches of the U-I characteristic curve with rising voltage.

TABLE 18

| Type | Log (RLTRP (Ω)) | PL, 1 (%) | PL, 2 (%) | PL, 3 (%) | PL, 4 (%) | Σ |
| --- | --- | --- | --- | --- | --- | --- |
| Asymmetrical | 8.100 | 17.990 | 6.330 | 0.725 | 0.001 | 25.046 |
| Figure eight | 8.100 | 43.700 | 0.360 | 2.350 | 0.030 | 46.440 |
| Almond-shaped | 8.100 | 43.700 | 0.360 | 2.470 | 0.003 | 46.533 |

The resistance values $R_{HRS}$ and $R_{LRS}$ of a figure eight U-I characteristic curve or almond-shaped U-I characteristic curves can be defined as resistance values at +2 V of the U-I characteristic curve. If, for example, the profile of an asymmetrical and symmetrical (e.g. figure eight or almond-shaped) U-I characteristic curve is then identical to the first half period of the sinusoidal input voltage, the transition point is likewise identical and can be 8.1, for example, in accordance with various embodiments (see Tab. 18).

The PCE of the fundamental frequency (first-order harmonic), of the second-, third- and fourth-order harmonics are shown by way of example in Tab. 18. In memristive systems having symmetrical current-voltage hysteresis (U-I characteristic curves having a symmetrical profile) a large part of the power of a cycle or period of the sinusoidal input voltage can be converted at the load resistance, wherein the sum of the individual PCEs at the transition point can be 50%, for example.

In accordance with various embodiments, the PCE of the second harmonic of a memristor, having a symmetrical figure eight or symmetrical almond-shaped hysteresis, can be approximately ⅛ of the PCE of the second harmonic of a memristor having an asymmetrical hysteresis. Furthermore, the PCE of the third harmonic of a memristor having a symmetrical figure eight or a symmetrical almond-shaped hysteresis can be approximately three times the third harmonic PCE of a memristor having an asymmetrical hysteresis. This difference can result a from the suppression of the even-order harmonics by the symmetries of the odd quarter-cycles and symmetries of the half-cycles, wherein more power can be distributed in odd-order harmonics.

In accordance with various embodiments, the power ratio of different-order harmonics of a memristor having symmetrical figure eight hysteresis may deviate for example only insignificantly from the power ratio of the different-order harmonics of a memristor having an almond-shaped hysteresis (e.g. may have only a relative deviation of less than 10%).

For the application of BFO memristors in cryptography and cryptoanalysis, it may be of importance whether the higher-order harmonics generated by means of a memristor in the HRS differ from those in the LRS. In accordance with various embodiments, a BFO memristor or a memristor circuit can be switched between an LRS and an HRS by application of a write voltage (for example 7 V or −7 V). The power ratios can be measured or read out by means of a sinusoidal input voltage (read-out voltage) having a lower amplitude (for example of 3 V) while the memristor remains in an LRS or an HRS.

In accordance with various embodiments, for a given value of the load resistance $R_L$, the power ratios (of the harmonics) of a memristive structure that is in an LRS can be greater than the power ratios of a memristive structure that is in the HRS.

In accordance with various embodiments, the highest PCE value (the maximum power ratio) of a second-order harmonic of a memristive structure that is in an LRS can be 4.072%, for example, and can be at a load resistance of 800 kΩ for example, wherein the maximum power ratio of a second-order harmonic of a memristive structure that is in an HRS can be 0.353%, for example, and can be at a load resistance of 5 MΩ, for example. Illustratively, the maximum of the power ratio of the second-order harmonic generated by a memristor for an LRS can be greater than that for an HRS and furthermore occur at different load resistances, as is illustrated for example in FIG. 8B.

Figure 8B:
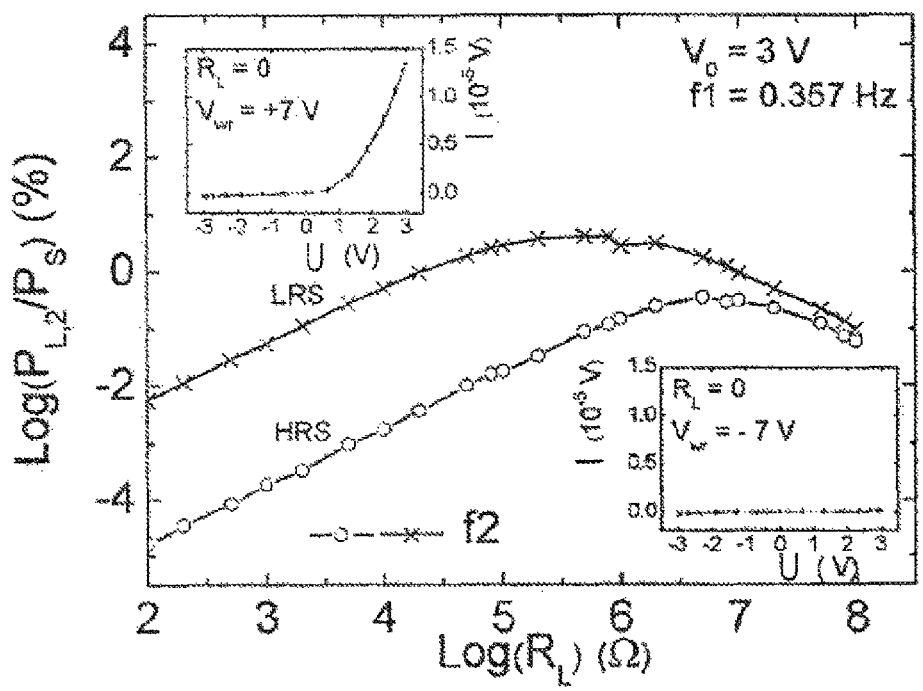

FIG. 8B schematically illustrates the PCE of higher harmonics of a single-layer memristor (only the second harmonic being illustrated) depending on the load resistance (or the resistance value of the load resistance) (e.g. measured in the LA construction), wherein the memristor was switched into the HRS state before the measurement, e.g. with a write voltage of −7 V, or was switched into an LRS, e.g. with a write voltage of +7 V. In this case, the write voltage can consist of a single pulse having an amplitude of e.g. ±7 V or can be pulsed. The fundamental frequency f1 of the input voltage $V_{in}$ can comprise 0.357 Hz, for example, with an amplitude V0 of the input voltage of 3 V, for example. In this case, the input voltage is small, with the memristor remaining in the previously switched (written) resistance state HRS or LRS. A sequence of data (bit sequence) can be coded, for example, by a positive or negative write voltage being applied to the memristor and by the higher harmonics being transferred. For a predefined load resistance, the PCE can be greater if the memristor is in the LRS.

In accordance with various embodiments, a memristor that is in the LRS can have the properties of a diode and of a resistor, and if it is in the HRS, it can have the properties of a resistor. In order to read out the mutually distinguishable sets of PCE for a given load resistance $R_L$, the memristor can be switched into an LRS or an HRS by means of a write voltage VW (for example of +7 V or −7 V) and can subsequently be read by means of a sinusoidal input voltage (for example having an amplitude of 3 V). Furthermore, the amplitude of the sinusoidal read-out voltage can be chosen in such a way that it does not influence or change the circuit state of the memristor (LRS or HRS).

Figure 8C:
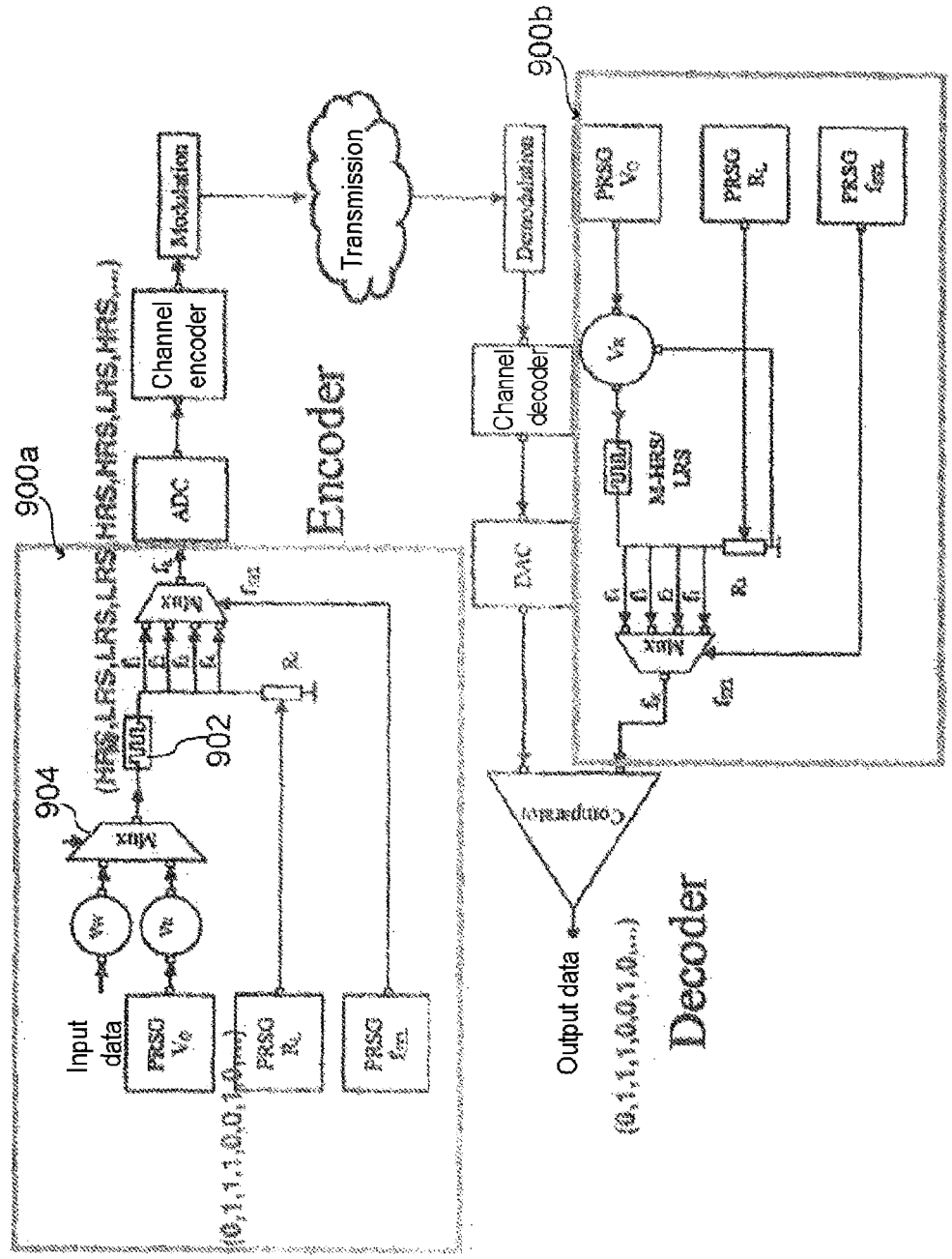

FIG. 8C (or else FIG. 9) illustrates by way of example a schematic construction of a circuit arrangement, in accordance with various embodiments, for coding and/or encrypting input data. The input data can be coded in a binary form (for example as "0" and/or "1") by means of the memristor 902 being correspondingly switched (into an HRS or an LRS). Furthermore, as described above, the PCE can depend on the circuit state of the memristor and the load resistance. In accordance with various embodiments, the PCE values can be represented in the form of 14-bit binary data. Furthermore, a write voltage VW of ±7 V can be used to change the state of the memristor 902 in relation to the input data (or to switch the memristor arrangement into an HRS or an LRS). Furthermore, a multiplexer (Mux) 904 can ensure that either the resistance state of a memristor is switched (in accordance with the bit sequence) (that the resistance state is written) or a sinusoidal (or other periodic) input voltage having an amplitude $V_R$ (or $V_0$) for reading the memristor (or for generating the higher harmonics) is present. Furthermore, the value of the load resistance $R_L$ can be generated by means of a pseudo-random sequence generator (PRSG) for each individual data bit. Illustratively, each data bit to be encrypted can be assigned a respective load resistance (having a load resistance value) by means of a PRSG. In this case, a selection can be effected in such a way that a load resistance having a corresponding load resistance value that is provisionally selected for a bit value (0 or 1) is rejected if the selected load resistance value is not in a load resistance value range which is assigned to the bit value (cf. FIG. 8D).

In accordance with various embodiments, the electrical signal $V_R$ having an input voltage (amplitude $V_R$ (or $V_0$)) can be fed to the selected load resistance $R_L$ and the memristor 902, such that for example the harmonics f1, f2, f3, f4 are generated, depending on the selected load resistance and the switched state (HRS or LRS) of the memristor 902. In this case, the amplitude $V_R$ (or $V_0$) of the input voltage can be chosen randomly (for example by means of a PRSG), e.g. in accordance with a predefined sequence of amplitudes $V_R$ (or $V_0$) of the input voltage. Furthermore, the harmonics which are used to generate or provide the quantity fk describing the bit value (e.g. the PCE or a ratio of two or more harmonics with respect to one another) can be chosen randomly (for example by means of a PRSG), e.g. in accordance with a predefined sequence of relations (e.g. quotients in the simplest case) of the generated harmonics f1, f2, f3, 4.

In accordance with various embodiments, the random choice of the load resistances, of the input voltages and/or of the harmonics used can represent a key of the encryption since these can influence for example the quantity fk describing the bit value. Furthermore, a respective used memristor from a plurality of different memristors can also be used, wherein the used memristor can then be selected randomly or can be selected in accordance with a key sequence. Furthermore, the memristor 902 can also have a plurality of different contacts (metal contacts), e.g. having a different contact area, which can then be selected randomly or can be selected in accordance with a key sequence.

Furthermore, the memristor 902 can also be used at a plurality of different temperatures since the temperature, for example, can have an influence on the harmonics generated, wherein the temperature actually used for encryption can then be selected randomly or can be selected in accordance with a key sequence.

In general, the generation of the signal fk describing the bit value can be dependent on a multiplicity of parameters, wherein the parameters can for example influence the memristor or influence a quantity generated using the memristor, such that additional possibilities of encryption can result. In order to decrypt the encrypted bit sequence again, it may be necessary to possess a circuit construction identical to that used for encryption, and to know the multiplicity of parameters.

In accordance with various embodiments, the resulting data (for example the PCE values generated from the data) can be converted or modified by the receiver for digital transmission (for example by means of a PCE mapper, an analog-to-digital converter (ADC) or a channel encoder) in order for example to increase the transmission security, and can be modulated. Furthermore, the transmitted data can be treated again according to the inverted process by the receiver before their decryption, in order to obtain the original resulting data (for example the PCE values generated from the data).

Figure 8D:
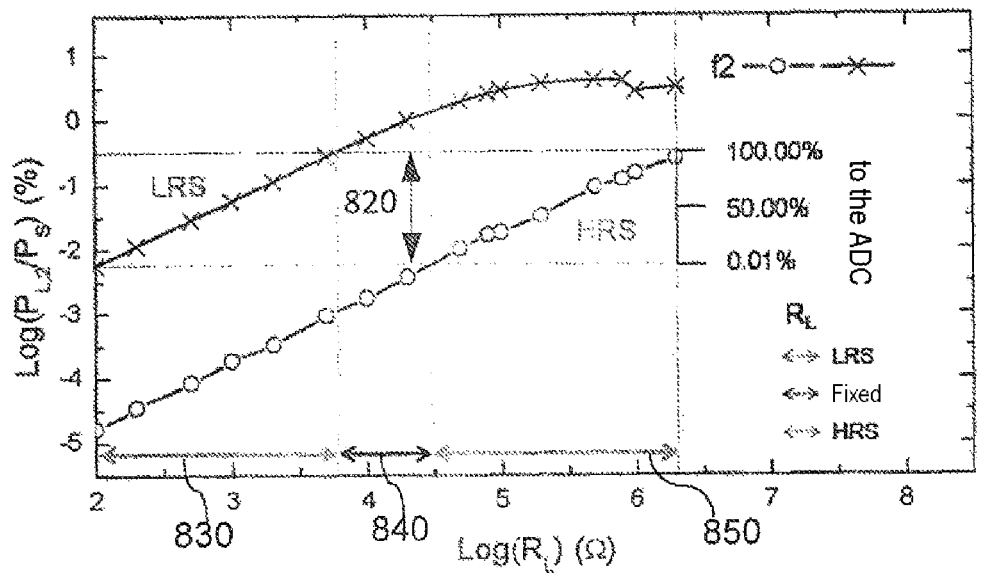

In accordance with various embodiments, the receiver can decrypt the encrypted bit sequence by means of hardware technology or software technology. Generating a so-called look-up table, which assigns the quantity describing the bit values (e.g. PCE or a standardized power ratio of the harmonics, as illustrated in FIG. 8D) to the respective bit values, may necessitate a memristor circuit identical to that used for encryption, and the knowledge of the multiplicity of parameters. Furthermore, by means of an identical memristor circuit and by means of the known parameters, reference quantities for the decryption can be generated, which can then be used for the comparison with the transmitted quantity describing the bit values (for example the PCE values generated from the data).

In accordance with various embodiments, it may be necessary for the load resistance $R_L$ of a memristor circuit, if the memristor is in an LRS, to be in a range of between 100 Ω and 4.375 kΩ (or log($R_L$) in a range of between 2 and 4.361), as is identified by means of the arrow (LRS) in FIG. 8D. Furthermore, the load resistance $R_L$ for the memristor circuit, if the memristor is in an HRS, may be in a range of between 27.164 kΩ and 1.897 MΩ (or log($R_L$) in the range between 4.434 and 6.278), as is identified by an arrow (HRS) in FIG. 8D.

In the figures, the circuit construction and the schematic for encryption 900a can be designated by Encoder and the circuit construction and the schematic for decryption 900b can be designated by Decoder. The transmission of the encrypted bit sequence can be carried out in arbitrary known ways (by means of a transmission medium).

During encryption, the PRSG can be used to generate a load resistance in a load resistance range 840 (designated by Fixed) which can lie between the two load resistance ranges (850 for HRS and 830 for LRS), as is illustrated for example in FIG. 8D, for example in a range of between 4.375 kΩ and 27.164 kΩ (or log($R_L$) in a range of between 4.361 and 4.434). In this case, this may be unsuitable for use for encrypting the bit values in an HRS or LRS and can be skipped (not selected) and/or marked (e.g. transmitted separately or additionally) in order to ensure that no uncertainty as to whether or not an element from the sequence of load resistances was skipped arises at a receiver. Illustratively, elements ("fixed points") from the sequence of load resistances which lie in a specific range are rejected for the encryption of the bit values since they may be suitable neither for coding in an LRS nor for coding in an HRS. Furthermore, it is possible to generate additional data for transmission using the fixed points (FIXED), for example randomly distributed values, which can be taken into account during decryption.

In accordance with various embodiments, selected load resistances may be unsuitable for encrypting the bit values if the quantity (describing the bit values) generated by means of the load resistance are outside the value range 820 (e.g. a normalizable range or normalized range of 0% to 100% for the power ratios), as is illustrated in FIG. 8D. The value range 820 for a quantity describing the bit values (e.g. the power ratio of the harmonics) can illustratively be defined by the fact that it is a common value range containing the generated quantity describing the first bit value, which quantity was generated using a load resistance from the first load resistance range 830 for the first resistance state (LRS), and containing the generated quantity describing the second bit value, which quantity was generated using a load resistance from the second load resistance range 850 for the second resistance state (HRS).

Figure 8E:
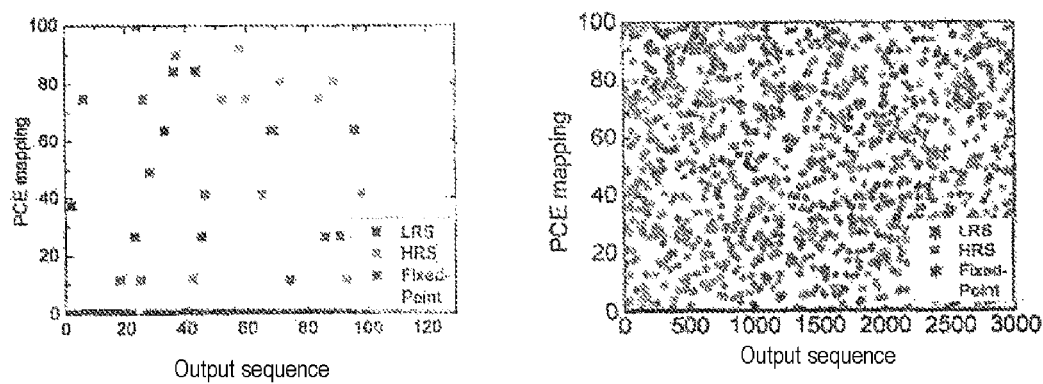

Illustratively, the encrypted bits can in each case be present in a quantity which can be uncorrelated or only weakly correlated, as illustrated for example in FIG. 8E.

Furthermore, a load resistance from the sequence of load resistances generated by means of the PRSG can be skipped or rejected during the encryption of the bit values if the load resistance from the sequence of load resistances is suitable for the transmission of a power ratio from an HSR, but a power ratio from an LRS is intended to be transmitted.

Furthermore, a load resistance from the sequence of load resistances generated by means of the PRSG can be skipped or rejected during the encryption of the bit values if the load resistance from the sequence of load resistances is suitable for the transmission of a power ratio from an LRS, but a power ratio from an HRS is intended to be transmitted.

Illustratively, for the encryption of the first bit value, a first load resistance value range 830 can be defined and accordingly only selected load resistances having load resistance values from the first load resistance value range 830 can be used and, for the encryption of the second bit value, a second load resistance value range 850 can be defined and accordingly only selected load resistances having load resistance values from the second load resistance value range 850 can be used.

The load resistance can be rejected in such a way that a provisional load resistance $R_L$ is selected and checked as to whether the load resistance value of the provisionally selected load resistance is in the resistance range defined for encrypting the respective bit value to be encrypted, that is to say is suitable for encryption, cf. FIG. 8D, wherein correspondingly then a suitable load resistance is used for encrypting the bit value or an unsuitable load resistance is not used (is omitted or rejected).

In accordance with various embodiments, the selection of the load resistance ranges respectively used (for HRS, LRS and/or FIXED) can serve as parameters of the encryption. Furthermore, the mapping (e.g. the normalization of the quantity describing the bit values) can also serve as a parameter of the encryption. Generally, the mapping is intended to be carried out in such a way that the output data are uncorrelated with one another.

The rejection of selected load resistances on the (e.g. random) sequence of load resistances can furthermore have the effect that approximately 40% of the selected load resistances from the sequence of load resistances are used for the coding of LRS and HRS (and 60% of the selected load resistances from the sequence of load resistances are rejected). In accordance with various embodiments, the sequence of the load resistances can be represented by means of 21-bit binary data.

Furthermore, the modulated encrypted data (e.g. the values of the quantity describing the bit values) can be transmitted wirelessly or in a cable-based manner.

In accordance with various embodiments, the transmitted data can be demodulated, decoded and converted by the receiver, such that illustratively their original analog form can be recovered. The receiver can furthermore comprise a memristor or a plurality of memristors or a memristor circuit, wherein the memristor can be switched analogously to the encryption or one of the memristors can be in the HRS and another of the memristors can be in the LRS (see FIG. 9). Furthermore, the at least one memristor or the plurality of memristors of the receiver can be used to generate by means of a sequence of load resistances corresponding reference values (reference PCE values or reference power ratios) with respect to the bit values (e.g. 0 and 1), which can be compared with received data or can be fed to a PCE mapper in order to be able to compare them with received data or modified received data (e.g. modified by a digital-to-analog converter).

Furthermore, the PRSG of the receiver can be synchronized with the PRSG of the transmitter, such that for example the PRSG of the receiver generates the same sequence of load resistances as the PRSG of the transmitter. Illustratively, in accordance with various embodiments, the same sequence of pseudo-random load resistance values as is available to the transmitter (which encrypted the data) can be available to the receiver. Analogously, it is also possible to use other parameters or keys which have to be exchanged between the transmitter and the receiver. Illustratively, the reference quantities for decryption have to be available to the receiver, wherein the receiver can generate them if the corresponding memristor and the parameters for generating the harmonics and/or the resultant quantity (designated by fk) (e.g. PCE) are available to the receiver.

In accordance with various embodiments, the received data can be compared with an output signal of a PCE mapper (for normalization in accordance with a specification) by means of at least one comparator (for example by means of an HRS comparator and an LRS comparator), such that the encrypted or coded data can be deduced. By way of example, the transmitted bit value can be "1" if the HRS comparator outputs a first signal (e.g. HIGH), and can be "0" if the LRS comparator outputs a first signal (e.g. HIGH). If both comparators output a different signal (for example LOW) or an identical signal (for example HIGH), then no bit value can have been transmitted. Illustratively, a comparison between the received data and possible encrypted data can be carried out by means of the comparators, such that the coded data can be decoded.

In accordance with various embodiments, additional securities can be obtained by means of a pseudo-random generation of the orders of the harmonics that are used for coding a bit or a bit sequence and/or a pseudo-random generation of the read-out voltage $V_0$ used for coding a bit or a bit sequence by means of a PRSG.

If, by way of example, a data sequence comprising 3000 bits (elements) (data to be communicated, which can form the input data of the ADC) is generated from a random sequence of input data (data to be coded) by means of a memristor-based encoder (or coded or encrypted by means of a memristor circuit), the mapping efficiency can be 42.167%, for example. Illustratively, of the 3000 bits communicated, 42.167% (corresponding to 1265 bits) correlate with the data to be coded and 1735 bits correlate with bits rejected for the reasons presented above (cf. FIG. 8E).

FIG. 8E illustrates by way of example an output signal (an output sequence) at the channel decoder, wherein a sequence (1, 0, 0, 1, 0, 0, . . . ) of 100 bits (left-hand part of FIG. 8E) and of 3000 bits (right-hand part of FIG. 8E) was encrypted by means of a single-layer memristor. These output data are randomly distributed and are therefore of no use if the data stream is intercepted or detected without authorization.

A higher efficiency of the encrypted data transmission can be achieved for example by rejecting and excluding from the transmission the selected elements from the sequence of load resistances which are suitable for none of the resistance states (e.g. HRS or LRS) of the memristive system (e.g. "fixed points"). Illustratively, a higher mapping efficiency can be achieved for example by restricting the value range of the PRSG (e.g. to values suitable for encrypting the bit values).

In accordance with various embodiments, a random generator integrated in each case in transmitter (encoder) and receiver (decoder), which random generator can be distinguished by its simple implementation and high speeds, or a software-based implementation using a linearly congruent method, for example, can be used for generating a sequence of pseudo-random elements (e.g. of load resistances or input voltages, etc.).

In accordance with various embodiments, the autocorrelation coefficient (the correlation) of the data to be communicated (of the values of the quantity describing the bit values) (which can form the input data of the ADC) which were coded without the use of unsuitable elements from the sequence of load resistances ("fixed points") by means of a memristor can be virtually 0 (cf. FIG. 8E). Illustratively, an autocorrelation coefficient describes the correlation of elements of a sequence or of a sequence, for example of a bit sequence, with themselves/itself (for example whether the data are randomly distributed or whether they are correlated with one another, as is the case for a periodic sequence), and can assume values of between −1 and 1 (or between 0 and 1), wherein for a vanishing autocorrelation coefficient (identical to zero) the sequence has no correlations whatsoever and is completely random in nature.

A sequence having an autocorrelation coefficient in the range of 0 to 0.3 can be designated as slightly correlated, in the range of 0.3 to 0.8 as significantly correlated and in the range of 0.8 to 1.0 as strongly correlated. In accordance with various embodiments, a hardware implementation can have a chaos-based PRSG in order to achieve an even smaller correlation and to have a greater reliability for the encryption system (or security of the encrypted data).

If, by way of example, a data sequence comprising 3000 bits (elements) (data to be communicated, which can form the input data of the ADC) is generated from a random sequence of input data (data to be coded) by means of a memristor-based encoder, a distribution of the generated elements can be visualized by a value that represents the elements (for example the PCE or the input signal of an ADC generated therefrom) being plotted according to the transmission sequence, as is illustrated in FIG. 8E. The input signal of the ADC is represented on the ordinate, the number of the generated element being plotted on the abscissa (corresponding to 1 to 3000). The symbols illustrated distinguish between elements coded in the HRS and LRS, that is to say for example elements of the data to be coded which were encrypted, and data FP generated from the elements of the sequence of load resistances that are unsuitable for the transmission. FIG. 8E illustrates the random distribution of the encrypted quantity, no elements occurring in large numbers. Illustratively, from a sequence of discrete elements (for example "0" and "1" which e.g. can form the data to be coded or represent the information to be communicated) by means of a memristor a sequence of approximately randomly distributed elements (for example the PCE values obtained therefrom) is generated, the lack of correlation of which can offer better protection against access by third parties compared with the original sequence of discrete elements, and which may therefore be suitable for protected communication of information. In other words, the approximately random distribution of the coded data makes it more difficult to reconstruct the original information without a matching receiver.

In accordance with various embodiments, the values of the PCE of a fundamental frequency and the harmonic of higher orders (e.g. second, third or fourth or higher) of a memristor circuit depend not only on the sinusoidal input voltage but likewise on the symmetry of the hysteresis of the current-voltage characteristics (U-I characteristic curves). Furthermore, a memristor switched by means of a sinusoidal input amplitude of 7 V can generate a higher power ratio than a memristor switched by means of a sinusoidal input voltage of less than 7 V.

For a given load resistance and a sinusoidal input voltage, the power ratio of a memristor circuit having asymmetrical hysteresis properties of the U-I characteristic curves (asymmetric hysteresis) may be greater than the power ratio of a memristor circuit having symmetrical hysteresis properties of the U-I characteristic curve.

Furthermore, in accordance with various embodiments, two mutually distinguishable second-order harmonics can be generated by means of a memristor circuit comprising a memristor based on $BiFeO_3$, as described above. Furthermore, a memristor circuit can be suitable for a data transfer system having high security for the data transmission.

In accordance with various embodiments, each load resistance can have a load resistance value.

As illustrated in FIG. 9, a circuit arrangement for encrypting a bit sequence can comprise the following: at least one resistance element M (e.g. a memristor or a nonlinear resistor) which can be switched at least into a first resistance state (e.g. LRS) with a first resistance value and into a second resistance state (HRS) with a second resistance value (the electrical resistance of the resistance element can be higher in the HRS state than in the LRS state), wherein the first resistance state is assigned to a first bit value (e.g. 0) of a bit of the bit sequence and the second resistance state is assigned to a second bit value (e.g. 1) of a bit of the bit sequence, wherein the second resistance value is different than the first resistance value; at least one load resistance element (e.g. a variable resistor or a resistance device having a multiplicity of selectable resistances) for providing a plurality of load resistances having different load resistance values; at least one signal generator for generating an electrical signal (e.g. $V_{in}$ or $V_R$), wherein the signal generator is coupled to the at least one resistance element and to the at least one load resistance element in such a way that an electrical signal generated by means of the at least one signal generator (e.g. of a periodic electrical signal) can be fed to the load resistance element and to the resistance element and at least one harmonic (a plurality of harmonics) of the electrical signal can be generated; an analysis element for analyzing the electrical signal and the at least one harmonic (the harmonics) of the electrical signal and for providing a quantity describing the first bit value (e.g. "0") or the second bit value (e.g. "1") (e.g. a power ratio of the harmonics or a normalized power ratio of the harmonics).

In accordance with various embodiments, can a load resistance sequence generator (PRSG $R_L$) coupled to the load resistance element and serving for generating a sequence of different load resistance values ($R_L$), and for example an actuating device for the load resistance element, such that different load resistances can be set at the load resistance element.

In accordance with various embodiments, a circuit arrangement for decrypting an encrypted bit sequence can comprise the following: at least one resistance element (e.g. a memristor or a nonlinear resistance), which can be switched at least into a first resistance state with a first resistance value and into a second resistance state with a second resistance value (e.g. HRS or LRS), wherein the first resistance state is assigned to a first bit value of a bit of the bit sequence (e.g. data or input data to be encrypted) and the second resistance state is assigned to a second bit value of a bit of the bit sequence, wherein the second resistance value is different than the first resistance value; at least one load resistance element for providing a plurality of load resistances having different load resistance values; at least one signal generator for generating an electrical signal, wherein the signal generator is coupled to the at least one resistance element and to the at least one load resistance element in such a way that an electrical signal generated by means of the at least one signal generator can be fed to the load resistance element and to the resistance element and at least one harmonic of the electrical signal can be generated; an analysis element for analyzing the electrical signal and the at least one harmonic of the electrical signal and for providing a reference quantity describing the first bit value or the second bit value; a receiving element for receiving an encrypted bit sequence and for providing a quantity representing an encrypted bit value of a bit of the bit sequence; a comparison element coupled to the analysis element and to the receiving element and serving for comparing the quantity with the reference quantity and for determining the respective bit value of the bit of the received encrypted bit sequence.

In accordance with various embodiments, a quantity which is generated by the encoder and describes the first bit value or the second bit value can be transmitted by means of conventional signal transmission, e.g. using an ADC (analog-to-digital converter); or DAC (digital-to-analog converter; a channel encoder and/or channel decoder, a modulator and/or demodulator for modulation and/or demodulation of the transmitted/communicated (encrypted) data.

Furthermore, the data can also be stored on hardware and transmitted by means of the hardware. The decrypted bit sequence can then be output as output data.

In accordance with various embodiments, the decoder can comprise in each case one or in each case a plurality of PCE mappers and comparators (comparator LRS and comparator HRS).

In accordance with various embodiments, an electrical signal having a plurality of harmonics can be evaluated by means of signal analysis or a corresponding signal analysis unit 912 (e.g. by means of a Fourier transformation) and the quantity describing the bit values can be generated on the basis thereof.

FIG. 10A illustrates a method 100a for encrypting a bit sequence in a schematic flowchart, wherein the method 100a can comprise: in 110, switching a resistance element (e.g. a memristor) in accordance with a bit sequence, wherein the resistance element is switched into a first resistance state with a first resistance value in the case of first bit value of a bit of the bit sequence, and wherein the resistance element is switched into a second resistance state with a second resistance value in the case of a second bit value of a bit of the bit sequence, wherein the second resistance value is different than the first resistance value; in 120, selecting a load resistance from a plurality of load resistances having different load resistance values; in 130, generating an electrical signal which is fed to the selected load resistance and to the switched resistance element, such that at least one harmonic of the electrical signal is generated; and, in 140, determining a quantity that describes the at least one harmonic as a quantity describing the first bit value or the second bit value.

As illustrated in FIG. 9, for example, the resistance element can comprise at least one of the following elements: at least one memristor M; and a circuit having at least two resistances, wherein at least one resistance of the at least two resistances is a nonlinear resistance.

Furthermore, the plurality of load resistances can comprise a plurality of ohmic resistances. The load resistance can be an adjustable resistance or a variable resistance by means of which a resistance value in a range of approximately 100 Ω to approximately $10^7$ Ω can be set or provided.

In accordance with various embodiments, a quantity describing the at least one harmonic can be used, wherein the quantity can be, for example: a quantity representing the electrical power of the harmonic; or a quantity representing the electrical power of the harmonic in relation to the electrical power of the electrical signal that generates the harmonic, or a quantity representing the electrical power of a plurality of harmonics in relation to one another.

Selecting the load resistance for encrypting a bit can comprise, for example: checking a provisionally selected load resistance to determine whether its load resistance value is in a predefined load resistance value range (in the HRS range or LRS range, as illustrated in FIG. 8D, for example) of a plurality of load resistance value ranges (830, 840, 850) which is assigned to a resistance state (HRS or LRS) which is assigned to the bit value (0 or 1) of the bit to be encrypted, and selecting the provisionally selected load resistance as the load resistance $R_L$ if this is the case.

In accordance with various embodiments, the plurality of load resistance value ranges 830, 840, 850 can comprise a first load resistance value range 830 and a second load resistance value range 850, wherein the first load resistance value range 830 and the second load resistance value range 850 are predefined relative to one another in such a way that the quantity (e.g. $\log(P_L(k)/P_S)$ or the power ratio of the harmonics) for the first load resistance value range 830 for the first resistance state (e.g. LRS) and the quantity for the second load resistance value range (e.g. $\log(P_L(k)/P_S)$ for the second resistance state (e.g. HRS) are in a predefined value range 820 for the quantity (e.g. $\log(P_L(k)/P_S)$).

Illustratively, by way of example, on account of the superposition of the generated quantities in the quantity range 820, for the HRS and LRS encrypted bit values, the quantity describing the bit values can be transmitted in an uncorrelated manner. The quantity describing the bit values can be transmitted in a normalized manner, for example, as a percentage of the normalization range 820.

In accordance with various embodiments, the plurality of load resistance value ranges can furthermore comprise a third load resistance value range 840, wherein the third load resistance value range 840 (Fixed) is predefined between the first load resistance value range 830 and the second load resistance value range 850, wherein an additional quantity (a quantity which represents the fact that the load resistance was selected from the third load resistance value range 840) that is in the predefined value range for the quantity (the additional quantity can be assigned for example a random value that is in the range 820 of the quantity) is generated, which represents none of the bit values if a load resistance value from the third load resistance value range is selected as provisional load resistance during the process of selecting a load resistance.

Furthermore, the provisionally selected load resistance can be selected in accordance with the predefined sequence of load resistances having different load resistance values. The sequence of load resistances can furthermore also be a value range for selectable load resistances or for selectable load resistance values. The knowledge of the selectable load resistances or the knowledge of the value range of the selectable load resistance values (used during encryption) may be necessary for decrypting the encrypted data or for generating an assignment table for the decryption.

As is illustrated in a block diagram in FIG. 8C and/or in FIG. 9, a circuit or circuit arrangement based on a memristor (or on a resistance element having a nonlinear U-I characteristic) can be used for cryptography application, e.g. in an encoder and decoder. In accordance with various embodiments, a memristor-based encryption and decryption is illustrated. Further circuit components such as ADC, DAC, so-called channel encoder/decoder, comparators, and/or modulators/demodulators may be conventional components, as used for example in hardware-based cryptography.

Illustratively, an attempt may be made, for example, to detect the encrypted data during the transmission, but these data may be uncorrelated, and so decryption may not be possible without the key (e.g. without a corresponding memristor for decryption), as is illustrated in FIG. 8E, for example, wherein the quantity describing the bit value (e.g. normalized) of the encrypted output sequence is illustrated.

FIG. 10A illustrates a method 100b for decrypting an encrypted bit sequence in a schematic flowchart, wherein the method 100b can comprise: in 150, generating a first reference quantity (for example for comparison with the quantity representing the encrypted bit values), comprising, for a respective bit of the encrypted bit sequence, selecting a load resistance R1 in accordance with a predefined sequence composed of a plurality of load resistances having different load resistance values (or from a value table for load resistance values) and feeding an electrical signal (e.g. a temporally and/or spatially periodic electrical signal) to a resistance element (e.g. to a memristor or a memristor circuit) and to the selected load resistance, wherein the resistance element is in a first resistance state (for example LRS, without restricting the generality), in which it represents a first bit value (for example 0, without restricting the generality); in 160, generating a second reference quantity, comprising feeding an electrical signal to a further resistance element and to the selected load resistance, wherein the further resistance element is in a second resistance state (for example HRS, without restricting the generality), in which it represents a second bit value (for example 1, without restricting the generality); in 170, determining from the encrypted bit sequence for each bit an associated bit quantity (e.g. the power ratio of the harmonics, which describes the encrypted bit values); in 180, comparing the first reference quantity with the respective bit quantity; in 190, comparing the second reference quantity with the respective bit quantity; and, in 200, determining a bit value for the respective bit taking account with the comparison results.

In accordance with various embodiments, it is also possible for only one resistance element to be used for decryption, which resistance element is then switched into the corresponding resistance state. In other words, the resistance element and the further resistance element can be the same memristor or can be realized by means of two identical memristors.

In accordance with various embodiments, a plurality of different memristors can also be used for encrypting the bit values.

In accordance with various embodiments, a method for generating reference quantities for decrypting an encrypted bit sequence can comprise: generating a first reference quantity, comprising selecting a load resistance in accordance with a predefined sequence composed of a plurality of load resistances having different load resistance values and feeding an electrical signal to a resistance element and to the selected load resistance, wherein the resistance element is in a first resistance state, in which it represents a first bit value; generating a second reference quantity, comprising feeding an electrical signal to a further resistance element and to the selected load resistance, wherein the further resistance element is in a second resistance state, in which it represents a second bit value; storing the first reference quantity and the second reference quantity in a decryption unit for decrypting an encrypted bit sequence. In this case, by way of example, all necessary (load resistances used for encryption) the corresponding values for the quantity describing the bit value can be determined, and the corresponding bit value with respect to the quantity can thus be determined again by means of the comparison of the quantity with the reference quantities.

Furthermore, generating a first reference quantity and generating a second reference quantity can comprise: generating a first reference quantity, comprising selecting a load resistance in accordance with a predefined sequence composed of a plurality of load resistances having different load resistance values and feeding an electrical signal to a resistance element and to the selected load resistance, wherein the resistance element is in a first resistance state, in which it represents a first bit value; generating a second reference quantity, comprising feeding an electrical signal to the resistance element and to the selected load resistance, wherein the further resistance element is in a second resistance state, in which it represents a second bit value.

In accordance with various embodiments, the resistance element and/or the further resistance element can be the same as for encryption or, in accordance with an assignment specification, the resistance elements for encryption can be matched with the resistance elements for decryption or calibrated with respect to one another.

The invention claimed is:

1. A method for encrypting a bit sequence, the method comprising:
    switching a resistance element in accordance with a bit sequence, wherein the resistance element is switched into a first resistance state with a first resistance value in the case of a first bit value of a bit of the bit sequence, and wherein the resistance element is switched into a second resistance state with a second resistance value in the case of a second bit value of a bit of the bit sequence, wherein the second resistance value is different than the first resistance value;
    selecting a load resistance from a plurality of load resistances having different load resistance values;

generating an electrical signal which is fed to the selected load resistance and to the switched resistance element, such that at least one harmonic of the electrical signal is generated;

determining a quantity that describes the at least one harmonic as a quantity describing the first bit value or the second bit value.

2. The method as claimed in claim 1,
wherein the resistance element comprises at least one of the following elements:
at least one memristor; and
a circuit having at least two resistances, wherein at least one resistance of the at least two resistances is a nonlinear resistance.

3. The method as claimed in claim 1,
wherein the plurality of load resistances are ohmic resistances.

4. The method as claimed in claim 1,
wherein at least one of the following quantities is determined as the quantity that
describes the at least one harmonic:
a quantity that represents the electrical power of the at least one harmonic;
a quantity that represents the electrical power of the at least one harmonic in relation to the electrical power of the electrical signal that generates the at least one harmonic.

5. The method as claimed in claim 1,
wherein selecting a load resistance for encrypting a bit comprises:
checking for a provisionally selected load resistance whether its load resistance value is in a predefined load resistance value range of a plurality of load resistance value ranges which is assigned to a resistance state assigned to the bit value of the bit to be encrypted, and
selecting the provisionally selected load resistance as the load resistance if this is the case.

6. The method as claimed in claim 5,
wherein the plurality of load resistance value ranges comprise a first load resistance value range and a second load resistance value range, wherein the first load resistance value range and the second load resistance value range are predefined relative to one another in such a way that the quantity for the first load resistance value range for the first resistance state and the quantity for the second load resistance value range for the second resistance state are in a predefined range of values for the quantity.

7. The method as claimed in claim 6,
wherein the plurality of load resistance value ranges furthermore comprise a third load resistance value range,
wherein the third load resistance value range is predefined between the first load resistance value range and the second load resistance value range,
wherein an additional quantity which is in the predefined range of values for the quantity is generated, which represents none of the bit values, if, during the process of selecting a load resistance, a load resistance value from the third load resistance value range is chosen as the provisionally selected load resistance.

8. The method as claimed in claim 5,
wherein the provisionally selected load resistance is chosen in accordance with a predefined sequence of load resistances having different load resistance values.

9. A method for decrypting an encrypted bit sequence, the method comprising:
generating a first reference quantity, comprising, for a respective bit of the encrypted bit sequence, selecting a load resistance in accordance with a predefined sequence composed of a plurality of load resistances having different load resistance values and feeding an electrical signal to a resistance element and to the selected load resistance, wherein the resistance element is in a first resistance state, in which it represents a first bit value;
generating a second reference quantity, comprising feeding an electrical signal to a further resistance element and to the selected load resistance, wherein the further resistance element is in a second resistance state, in which it represents a second bit value;
determining an associated bit quantity from the encrypted bit sequence for each bit;
comparing the first reference quantity with the respective bit quantity;
comparing the second reference quantity with the respective bit quantity;
determining a bit value for the respective bit taking account of the comparison results.

10. A method for generating reference quantities for decrypting an encrypted bit sequence, the method comprising:
generating a first reference quantity, comprising, for a respective bit of the encrypted bit sequence, selecting a load resistance in accordance with a predefined sequence composed of a plurality of load resistances having different load resistance values and feeding an electrical signal to a resistance element and to the selected load resistance, wherein the resistance element is in a first resistance state, in which it represents a first bit value;
generating a second reference quantity, comprising feeding an electrical signal to a further resistance element and to the selected load resistance, wherein the further resistance element is in a second resistance state, in which it represents a second bit value;
storing the first reference quantity and the second reference quantity in a decryption unit for decrypting an encrypted bit sequence.

11. The method as claimed in claim 10,
wherein the resistance element and/or the further resistance element comprise(s) at least one of the following elements:
at least one memristor; and
a circuit having at least two resistances, wherein at least one resistance of the at least two resistances is a nonlinear resistance.

12. The method as claimed in claim 10,
wherein the predefined sequence composed of the plurality of load resistances having different load resistance values corresponds to a key for the encryption and decryption.

13. A circuit arrangement for encrypting a bit sequence, the circuit arrangement comprising:
at least one resistance element which can be switched at least into a first resistance state with a first resistance value and into a second resistance state with a second resistance value, wherein the first resistance state is assigned to a first bit value of a bit of the bit sequence and the second resistance state is assigned to a second bit value of a bit of the bit sequence, wherein the second resistance value is different from the first resistance value;

at least one load resistance element for providing a plurality of load resistances having different load resistance values;

at least one signal generator for generating an electrical signal, wherein the signal generator is coupled to the at least one resistance element and the at least one load resistance element in such a way that an electrical signal generated by means of the at least one signal generator can be fed to the load resistance element and the resistance element and at least one harmonic of the electrical signal can be generated;

an analysis element for analyzing the electrical signal and the at least one harmonic of the electrical signal and for providing a quantity describing the first bit value or the second bit value.

14. The circuit arrangement as claimed in claim 13, further comprising:

a load resistance sequence generator for generating a sequence of different load resistance values, said generator being coupled to the load resistance element.

15. A circuit arrangement for decrypting an encrypted bit sequence, the circuit arrangement comprising:

at least one resistance element which can be switched at least into a first resistance state with a first resistance value and into a second resistance state with a second resistance value, wherein the first resistance state is assigned to a first bit value of a bit of the bit sequence and the second resistance state is assigned to a second bit value of a bit of the bit sequence, wherein the second resistance value is different from the first resistance value;

at least one load resistance element for providing a plurality of load resistances having different load resistance values;

at least one signal generator for generating an electrical signal, wherein the signal generator is coupled to the at least one resistance element and the at least one load resistance element in such a way that an electrical signal generated by means of the at least one signal generator can be fed to the load resistance element and the resistance element and at least one harmonic of the electrical signal can be generated;

an analysis element for analyzing the electrical signal and the at least one harmonic of the electrical signal and for providing a reference quantity describing the first bit value or the second bit value;

receiving element for receiving an encrypted bit sequence and for providing a quantity that represents an encrypted bit value of a bit of the bit sequence;

a comparison element coupled to the analysis element and the receiving element and serving for comparing the quantity with the reference quantity and for determining the respective bit value of the bit of the received encrypted bit sequence.

16. The method as claimed in claim 9, wherein the resistance element and/or the further resistance element comprise(s) at least one of the following elements:

at least one memristor; and a circuit having at least two resistances, wherein at least one resistance of the at least two resistances is a nonlinear resistance.

17. The method as claimed in claim 9, wherein the predefined sequence composed of the plurality of load resistances having different load resistance values corresponds to a key for the encryption and decryption.

* * * * *

UNITED STATES PATENT AND TRADEMARK OFFICE
CERTIFICATE OF CORRECTION

PATENT NO. : 9,812,640 B2  
APPLICATION NO. : 14/800785  
DATED : November 7, 2017  
INVENTOR(S) : Tiangui You et al.

Page 1 of 1

It is certified that error appears in the above-identified patent and that said Letters Patent is hereby corrected as shown below:

In the Specification

Column 22, Line 10: Please write "$S_b$" between the words "contact" and "than", and "$S_a$" between the words "contact" and "the"

Column 22, Line 57: Please delete the last word of the line "$R_{LRSa}$" and write "$R_{LRSn}$" in place thereof Signed and Sealed this  
Eighth Day of May, 2018

Andrei Iancu  
*Director of the United States Patent and Trademark Office*